(12) United States Patent
Uehara

(10) Patent No.: US 7,897,865 B2
(45) Date of Patent: Mar. 1, 2011

(54) MULTIMEDIA PLATFORM FOR RECORDING AND/OR REPRODUCING MUSIC SYNCHRONOUSLY WITH VISUAL IMAGES

(75) Inventor: Haruki Uehara, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1622 days.

(21) Appl. No.: 10/339,854

(22) Filed: Jan. 10, 2003

(65) Prior Publication Data
US 2003/0133700 A1 Jul. 17, 2003

(30) Foreign Application Priority Data

Jan. 15, 2002 (JP) ................................. 2002-006634
Jan. 16, 2002 (JP) ................................. 2002-007871

(51) Int. Cl.
*A63H 5/00* (2006.01)
(52) U.S. Cl. .................. 84/645; 84/602; 84/609; 84/622
(58) Field of Classification Search ............... 84/645, 84/600–607, 609–618, 622, 666–669, 634–638, 84/647–653, 659, 13, 16–25
See application file for complete search history.

(56) References Cited

U.S. PATENT DOCUMENTS

| 4,970,928 | A | * | 11/1990 | Tamaki | 84/21 |
| 5,410,100 | A | | 4/1995 | Kim | |
| 5,506,932 | A | * | 4/1996 | Holmes et al. | 704/205 |
| 5,523,525 | A | * | 6/1996 | Murakami et al. | 84/602 |
| 5,541,781 | A | * | 7/1996 | Barr et al. | 386/66 |
| 5,557,423 | A | * | 9/1996 | Phillips et al. | 386/96 |
| 5,602,356 | A | * | 2/1997 | Mohrbacher | 84/609 |
| 5,745,637 | A | * | 4/1998 | Phillips et al. | 386/46 |
| 6,134,379 | A | * | 10/2000 | LaMacchia | 386/54 |
| 6,393,198 | B1 | * | 5/2002 | LaMacchia | 386/54 |
| 6,512,884 | B1 | * | 1/2003 | Sawada | 386/96 |

FOREIGN PATENT DOCUMENTS

| JP | 05-297867 | | 11/1993 |
| JP | 05297867 | A * | 11/1993 |
| JP | 6-161439 | | 6/1994 |
| JP | 07-134586 | | 5/1995 |
| JP | 07-219569 | | 8/1995 |
| JP | 2001-357609 | | 12/2001 |

OTHER PUBLICATIONS

European Search Report dated Oct. 16, 2008, for Application No. EP03000880.

* cited by examiner

*Primary Examiner* — Elvin G Enad
*Assistant Examiner* — Christopher Uhlir
(74) *Attorney, Agent, or Firm* — Morrison & Foerster LLP

(57) ABSTRACT

A multimedia platform records a performance on a keyboard synchronously with a picture by periodically regulating an internal clock, which is indicative of the lapse of time, with time codes inserted into the set of video data codes representative of the picture, and reproduces the performance through an automatic player piano also synchronously with the picture by periodically regulating the internal clock with the time codes, whereby the user enjoys himself or herself in the performance as if he or she feels himself or herself performing in a convert hall.

6 Claims, 37 Drawing Sheets

MULTIMEDIA PLATFORM FOR RECORDING AND/OR REPRODUCING MUSIC SYNCHRONOUSLY WITH VISUAL IMAGES

FIELD OF THE INVENTION

This invention relates to a multimedia platform and, more particularly, to a multimedia platform for synchronously recording and reproducing visual images and music and a recorder/reproducer incorporated therein.

DESCRIPTION OF THE RELATED ART

One of the desires of amateur music players is to play in a concert hall. However, it is a dream for most of the amateur music players. An amateur music player projects a picture on a monitor screen such as, for example, a liquid crystal display panel during his or her performance, and enjoys himself or herself by performing a piece of music in a virtual concert hall. While he or she is performing the piece of music, a video cassette player may read out the video data from a videotape cassette for reproducing the picture on the monitor screen. If an amateur music player wishes to record and, thereafter, reproduce his or her performance, he or she fingers the piece of music on a musical instrument with an automatic recording/playing system. The automatic recording/playing system, by way of example, converts the key actions to MIDI (Musical Instrument Digital Interface) data codes, and stores them in a suitable information storage medium such as a floppy disc. The MIDI data codes are broken down into event codes and delta-time codes. The event codes are representative of tones to be produced, and the delta-time codes are representative of the lapse of time from the initiation of the performance. A note-on event and a note-off event are typical examples of the event code. When he or she instructs the automatic recording/playing system to reproduce the tones, the automatic recording/playing system starts to sequentially read out the MIDI data codes from the floppy disc. The automatic recording/playing system moves the keys without any fingering of a human player, and produces the tones.

However, the picture and performance are respectively recorded in the videotape cassette and floppy disc, and the video cassette player and automatic recorder/player system are independent of each other. For this reason, even if the user concurrently starts the video cassette player and automatic recording/player system, the synchronization is not guaranteed. The video cassette player reproduces the picture on the monitor screen asynchronously with the reproduction of the tones, and a time lag may take place between the picture and the tones.

Another amateur player wishes to perform a piece of the music on a musical instrument in ensemble with a part of the music reproduced by a compact disc player in the virtual concert hall. The amateur player prepares a videotape cassette storing video data representative of an orchestral accompaniment and a compact disc storing audio data codes representative of tones of a part of the music. While a video cassette player and a compact disc player are reproducing the picture and the electronic tones, he or she performs another part of the music on a musical instrument in the virtual concert hall. If the amateur player wishes to record his or her performance and reproduce it, he or she fingers the piece of music on a musical instrument with an automatic recording/playing system. The automatic recording/playing system, by way of example, converts the key actions to MIDI data codes, and stores them in a floppy disc. When he or she instructs the automatic recording/playing system to reproduce the tones, the automatic recording/playing system starts to sequentially read out the MIDI data codes from the floppy disc. The automatic recording/playing system moves the keys without any fingering of a human player, and produces the tones.

However, the picture, electronic tones and performance are respectively recorded in the videotape cassette, compact disc and floppy disc, and the video cassette player, compact disc player and automatic recorder/player system are independent of one another. For this reason, even if the user concurrently starts the video cassette player, compact disc player and automatic recording/player system, the synchronization is not guaranteed. The video cassette player and compact disc player reproduce the picture on the monitor screen and the electronic tones from a sound system asynchronously with the reproduction of the acoustic tones, and a tine lug may take place among the picture, electronic tones and acoustic tones.

SUMMARY OF THE INVENTION

It is therefore an important object of the present invention to provide a multimedia platform, which records a performance in synchronization with at least video images.

It is also an important object of the present invention to provide a recorder forming a part of the multimedia platform.

It is another important object of the present invention to provide a player forming another part of the multimedia platform.

In accordance with one aspect of the present invention, there is provided a multimedia platform for recording at least first music sounds in an information storage medium synchronously with a picture comprising a first data source producing a first sort of data containing pieces of first music data information representative of the first music sounds, a second data source producing a second sort of data containing pieces of video data information representative of visual images of the picture and pieces of first time data information representative of a first time defined from a first viewpoint, a third data source incrementing a second time defined from the first viewpoint and represented by pieces of second time data information, connected to the second data source so as to compare the second time with the first time to see whether the second time is consistent with the first time, modifying the pieces of second time data information with the negative answer so as to eliminate a time difference from between the first time and the second time and converting the pieces of second time data information to pieces of third time data information representative of a third time defined from a second viewpoint different from the first viewpoint, a recorder connected to the first data source and the third data source so as to store the pieces of first music data information and the pieces of third time data information in the information storage medium, and an image generator connected to the second data source for producing the visual images.

In accordance with another aspect of the present invention, there is provided a multimedia platform for reproducing at least first music sounds synchronously with a picture comprising a first data source outputting a first sort of data containing pieces of first music data information representative of the first music sounds and pieces of first time data information representative of a first time defined from a first viewpoint, a second data source outputting a second sort of data containing pieces of video data information representative of visual images of the picture and pieces of second time data information representative of a second time defined from a second viewpoint different from the first viewpoint, an image generator connected to the second data source so as to produce the picture from the pieces of video data information, a sound generator connected for generating the first music sounds from the pieces of first music data information, and a timing controller incrementing a third time defined from the second viewpoint and represented by pieces of third time data information, connected to the second data source so as to compare the pieces of third time data information with the pieces of second time data information to see whether or not the third time is consistent with the second time, further connected to the first data source so as to modify the pieces of said first time data information with the negative answer for eliminating a time difference from between the second time and the third time, converting the pieces of first time data information to pieces of fourth time data information representative of a fourth time defined from said second viewpoint, comparing the pieces of fourth time data information with the pieces of third time data information to see whether or not the third time catches up the fourth time and further connected to the sound generator so as to transfer the pieces of first music data information to the sound generator when the third time catches up the fourth time.

BRIEF DESCRIPTION OF THE DRAWINGS

The features and advantages of the multimedia platform, recorder and player will be more clearly understood from the following description taken in conjunction with the accompanying drawings, in which.

DESCRIPTION OF THE PREFERRED EMBODIMENTS

The present invention contains four technical concepts shown in FIGS. 1A to 1D, and the first to eighth embodiments are based on these technical concepts.

Figure 1:
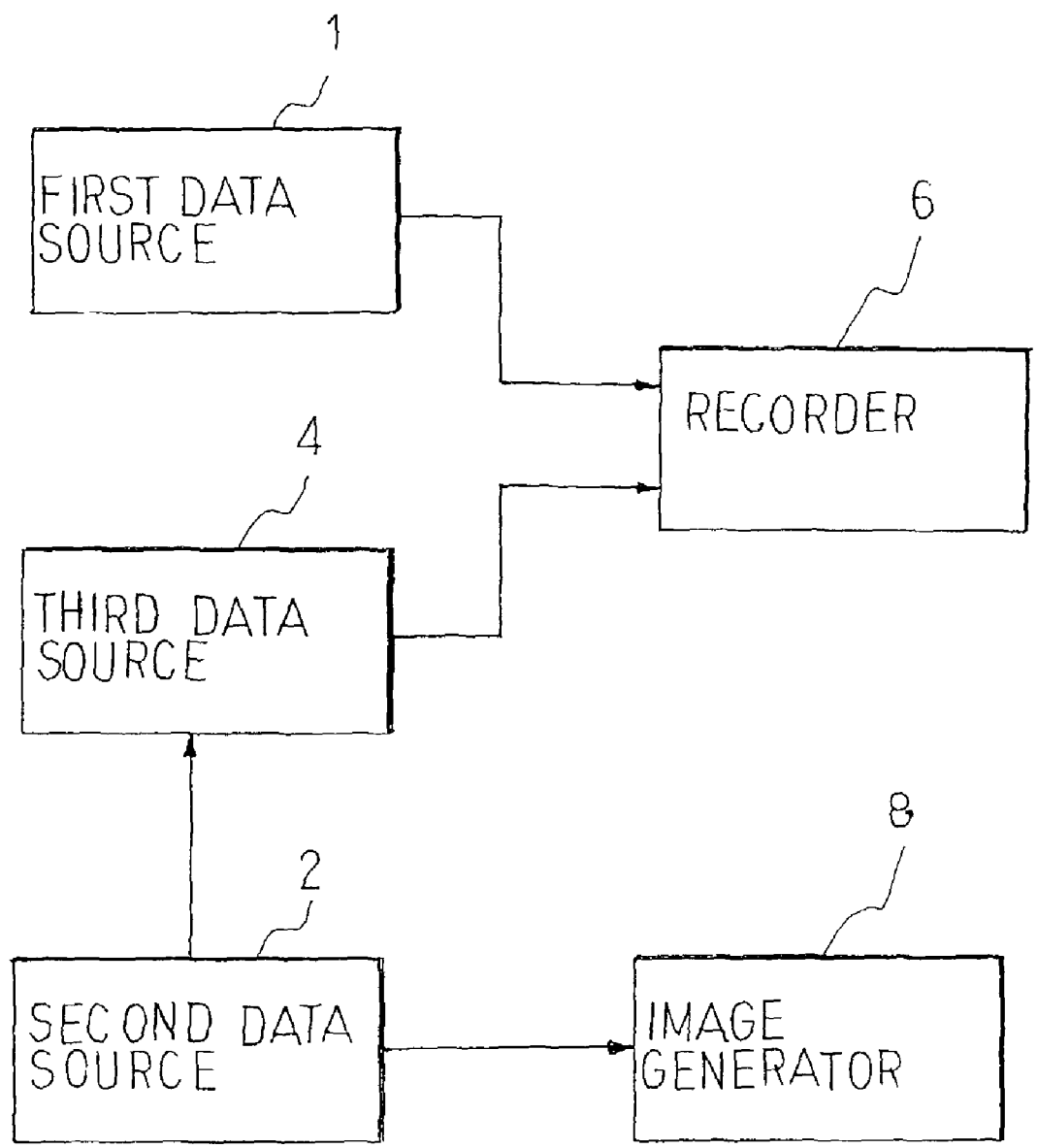
FIGS. 1A to 1D are block diagrams showing technical concepts of preferred embodiments.
Figure 1:
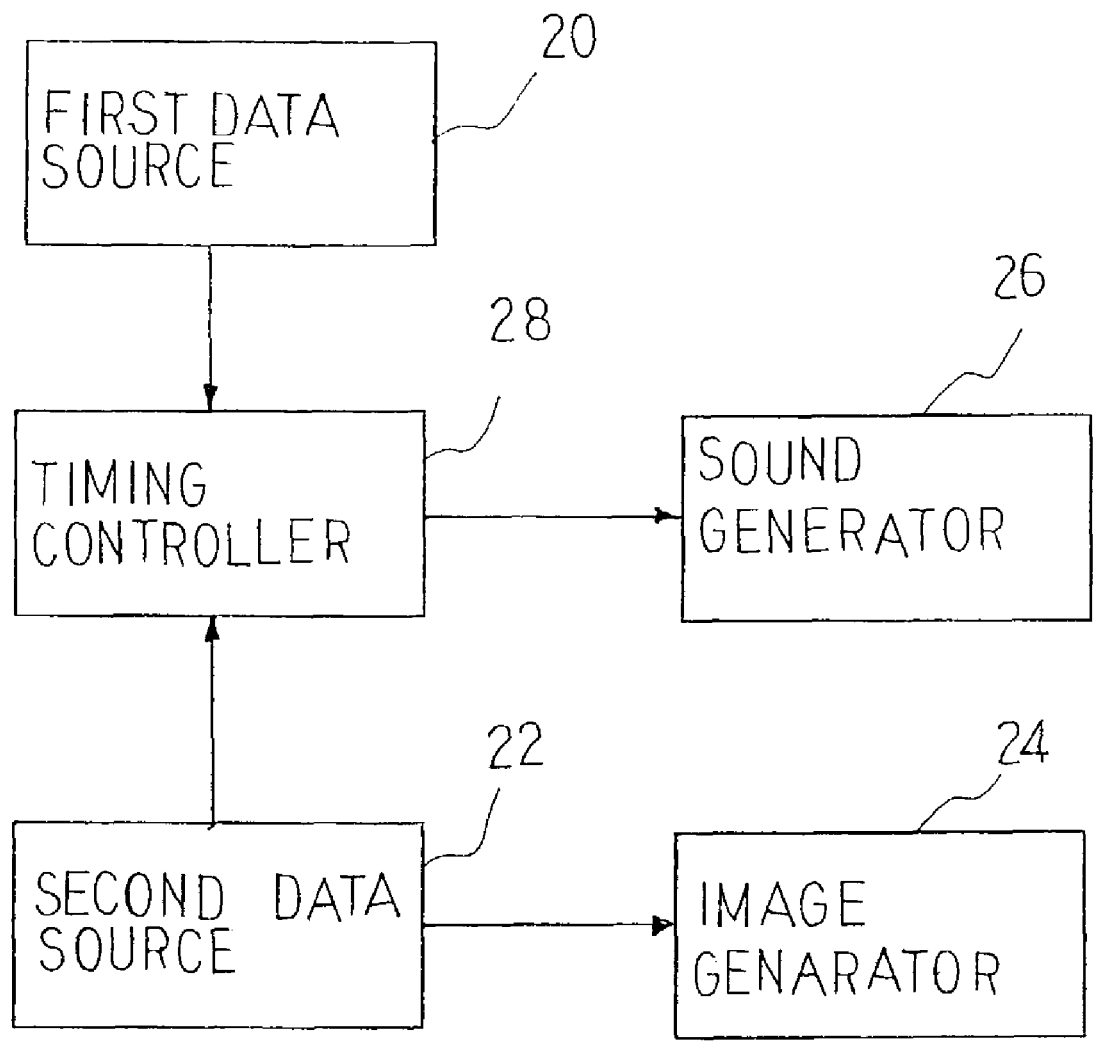
Figure 1:
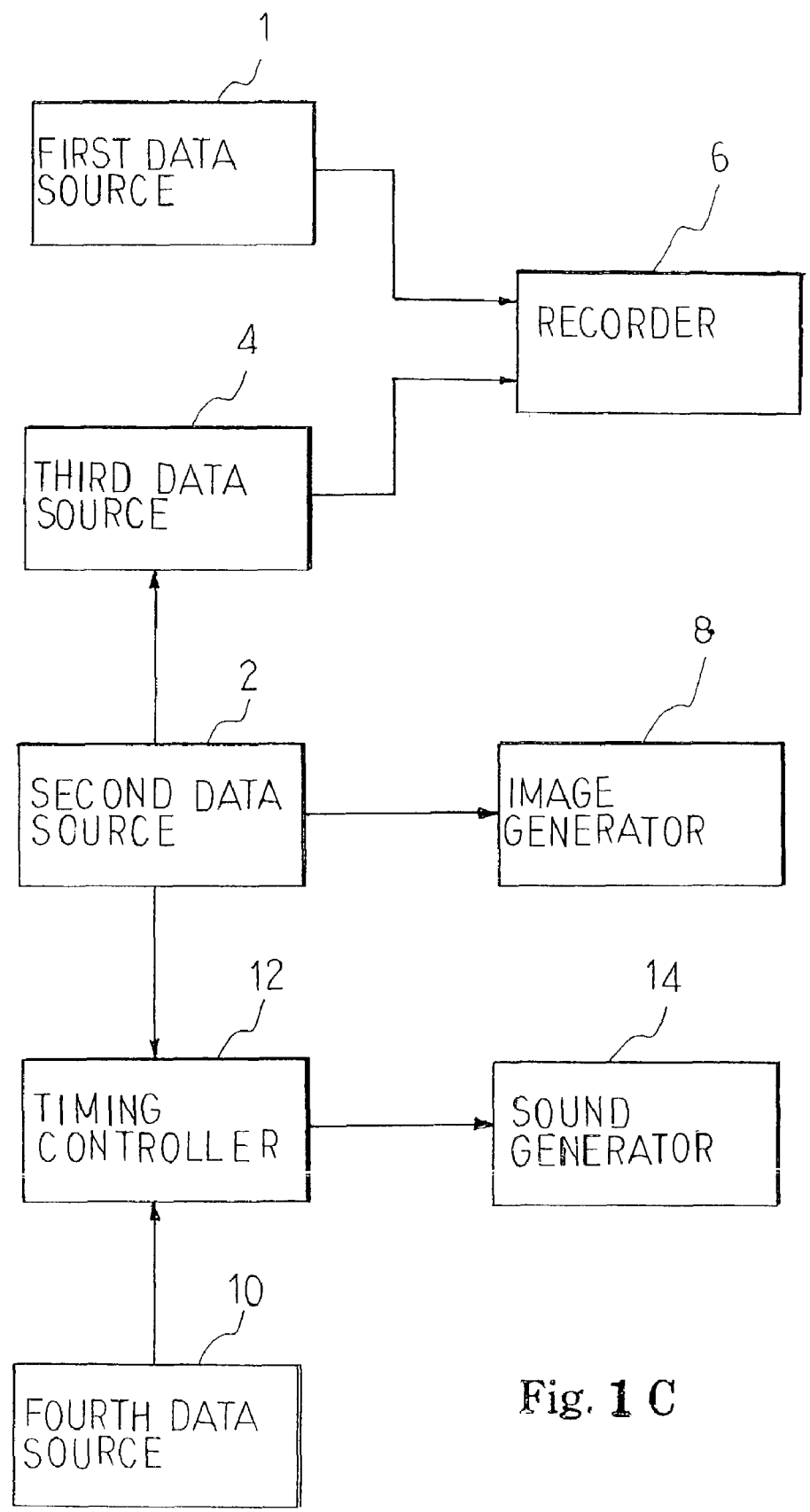
Figure 1:
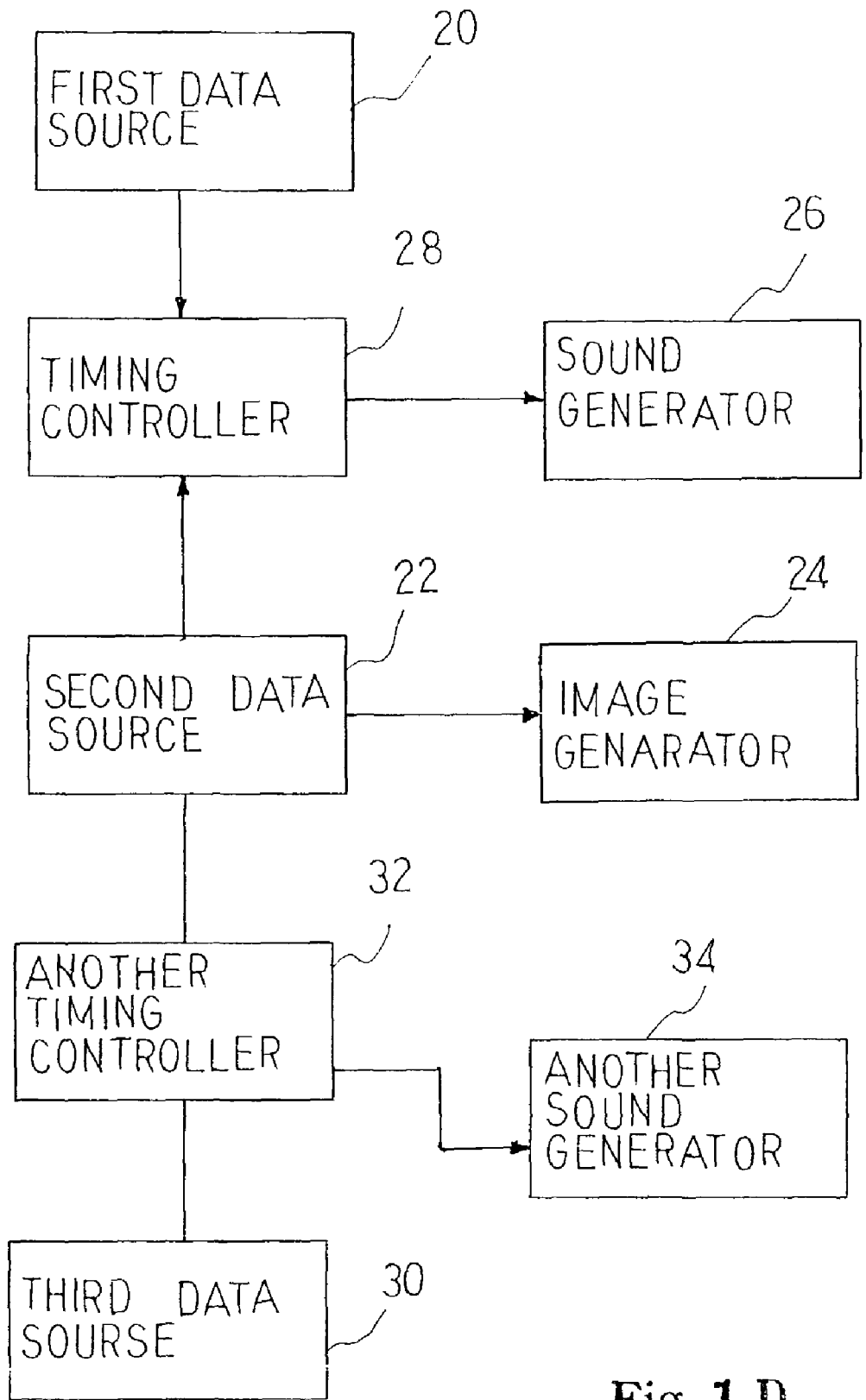

The first technical concept is illustrated in FIG. 1A. The first and second embodiments are based on the first technical concept. A multimedia platform based on the first technical concept comprises a first data source 1, a second data source 2, a third data source 4 connected to the second data source 2, a recorder connected to the first and third data sources 1/4 and an image generator 8 connected to the second data source.

The first data source 1 produces a first sort of data containing pieces of first music data information representative of first music sounds. In the first and second embodiments, an automatic player piano serves as the first data source 1, and the first music data information and first music sounds are corresponding to music data information stored in MIDI event codes and acoustic piano tones, respectively. The second data source 2 produces a second sort of data containing pieces of video data information representative of visual images of the picture and pieces of first time data information representative of a first time defined from a first viewpoint. In the first and second embodiments, a video camera serves as the second data source 2, and the pieces of video data information and the pieces of first time data information are stored in video data codes and video time codes, respectively. In the first and second embodiments, a lapse of time is measured from the first viewpoint.

The third data source 4 internally increments a second time defined from the first viewpoint. The second time is represented by pieces of second time data information. The pieces of first time data information are intermittently supplied to the third data source, and the third data source 4 compare the second time with the first time to see whether the second time is consistent with the first time. When the answer is given negative, the third data source 4 modifies the pieces of second time data information so as to eliminate a time difference from between the first time and the second time. If the answer is given affirmative, the third data source 4 does not modify the pieces of second time data information. Thus, the internal clock incorporated in the third data source 4 is periodically regulated with the first time. The third data source 4 is further operative to convert the pieces of second time data information to pieces of third time data information representative of a third time defined from a second viewpoint different from said first viewpoint. In the first and second embodiments, time intervals are defined from the second viewpoint.

The pieces of first music data information and pieces of third time data information are transferred to the recorder 6 so that the recorder 6 stores the pieces of first music data information and pieces of third time data information in an information storage medium such as, for example, a floppy disc.

The pieces of video data information are transferred to the image generator 8 so that the image generator 8 produces the visual images. The multimedia platform based on the first technical concept makes the pieces of first music data information synchronous with the pieces of video data information, because the pieces of third time data information are produced from the pieces of second time data information periodically modified with the pieces of first time data information.

The second technical concept is illustrated in FIG. 1B, and the third and fourth embodiments are based on the second technical concept. A multimedia platform based on the second technical concept comprises a first data source 20, a second data source 22, a timing controller 28 connected to the first and second data sources 20/22, an image generator 24 connected to the second data source 22 and a sound generator 26 connected to the timing controller 28. In the third and fourth embodiments, a disc player and a video camera serves as the first data source 20 and second data source 22, respectively.

The first data source 20 outputs a first sort of data containing pieces of first music data information representative of first music sounds and pieces of first time data information representative of a first time defined from a first viewpoint. On the other hand, the second data source 22 outputs a second sort of data containing pieces of video data information representative of visual images of a picture and pieces of second time data information representative of a second time defined from a second viewpoint different from the first viewpoint. In the third and fourth embodiments, time intervals are defined from the first viewpoint, and a lapse of time is defined from the second viewpoint.

The pieces of video data information are supplied to the image generator 24 so that the image generator 24 produces the picture from the pieces of video data information. The sound generator 26 generates the first music sounds from the pieces of first music data information synchronously with the picture with the assistance of the timing controller 28.

The timing controller 28 internally increments a third time defined from the second viewpoint and represented by pieces of third time data information. The timing controller 28 compares the pieces of third time data information with the pieces of second time data information to see whether or not the third time is consistent with the second time. When the answer is given negative, the timing controller 28 modifies the pieces of said first time data information so as to eliminate a time difference from between the second time and the third time. Thereafter, the timing controller 28 converts the pieces of first time data information to pieces of fourth time data information representative of a fourth time defined from the second viewpoint, and compares the pieces of fourth time data information with the pieces of third time data information to see whether or not the third time catches up the fourth time. When the answer is given positive, the timing controller 28 transfers the pieces of first music data information to the sound generator 26, and the sound generator 26 produces the first music sounds. The pieces of first time data information are modified through the comparison between the third time and the second time, and are converted to the pieces of fourth time data information from the second viewpoint, which is same as the pieces of second time data information. For this reason, the first music sounds are produced synchronously with the picture.

The third technical concept is illustrated in FIG. 1C, and the fifth and sixth embodiments are based on the third technical concept. The third technical concept relates to the first technical concept, and a multimedia platform based on the third technical concept comprises all the elements of the multimedia platform based on the first technical concept, and further comprises a fourth data source 10, a timing generator 12 and a sound generator 14. In the fifth and sixth embodiments, a compact disc unit serves as the fourth data source 10, and the sound generator 14 produces second music sounds from pieces of third music information synchronously with the picture.

In detail, the fourth data source outputs a third sort of data containing the pieces of third music data information representative of third music sounds and pieces of fourth time data information representative of a fourth time defined from the first viewpoint. The timing controller 12 internally increments a fifth time defined from the first viewpoint and represented by pieces of fifth time data information, and compares the pieces of fifth time data information with the pieces of first time data information to see whether or not the fifth time is consistent with the first time. If the answer is given negative, the timing controller 12 modifies the pieces of fifth time data information so as to eliminate a time difference from between the first time and the fifth time, and waits for a time at which each of the pieces of second music data information is to be transferred to the sound generator 14. When the fifth time catches up the fourth time represented by each of the pieces of fourth time data information, the timing controller 12 produces an audio signal from the pieces of third music data information, and supplies the audio signal to the sound generator 14. Since the pieces of fifth time data information are modified with the pieces of first time data information, the sound generator 14 generates the second music sounds synchronously with the picture.

The fourth technical concept is illustrated in FIG. 1D, and the seventh and eighth embodiments are based on the fourth technical concept. The fourth technical concept relates to the second technical concepts, and a multimedia platform based on the fourth technical concept comprises all the elements of the multimedia platform based on the second technical concept, and further comprises a third data source 30, another timing controller 32 and another sound generator 34. In the seventh and eighth embodiments, a compact disc unit serves as the third data source 30. The third data source 30, timing controller 32 and sound generator 34 are corresponding to the fourth data source 10, timing controller 12 and sound generator 14. The third data source 30, timing controller 32 and sound generator 34 makes the music sounds radiated from the sound generator 34 synchronous with the picture, and no further description is incorporated hereinafter for avoiding repetition.

First Embodiment

Figure 2A:
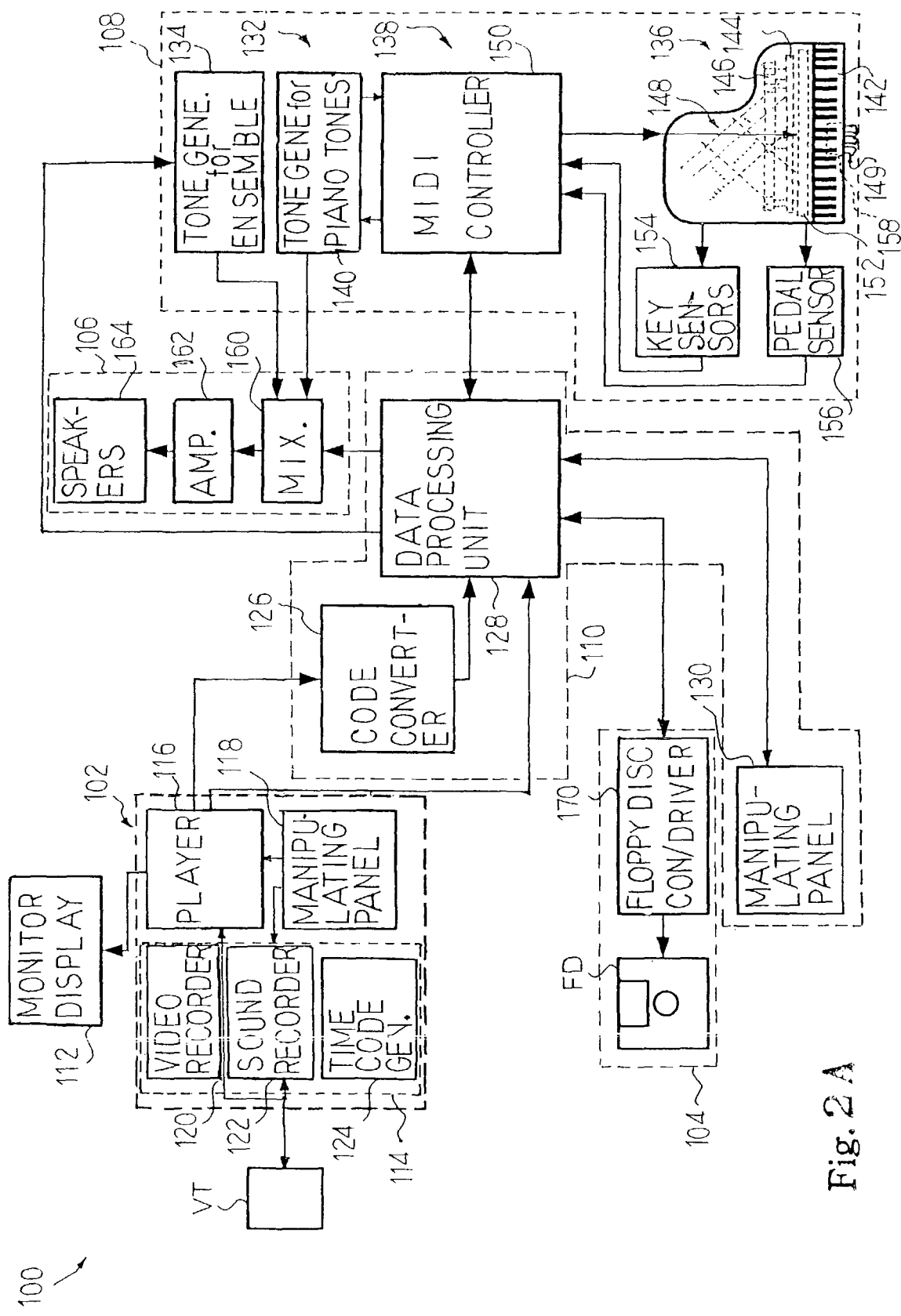
FIG. 2A is a block diagram showing the system configuration of a multimedia platform according to the present invention.

Referring first to FIG. 2A of the drawings, a multimedia platform embodying the present invention is shown and generally indicated at 100. The multimedia platform 100 largely comprises a video camera 102, a disc recorder 104, a sound system 106, a sound source 108, a controller 110 and a monitor display 112. The controller 110 is connected to the video camera 102, disc recorder 104, sound system 106 and sound source 108, and controls these components 102/104/106/108 for recording a piece of music. The video camera 102 is further connected to the monitor display 112, and the picture is reproduced on the monitor display 112 during the performance of a piece of music.

Video Camera

The video camera 102 includes a recorder 114, a player 116 and a manipulating panel 118. A videotape cassette VT is loaded into and unloaded from the video camera 102, and the recorder 114 and player 116 are responsive to instructions of a user given through the manipulating panel 118 so as to record visual images and sound into and reproduces them from the videotape cassette VT. In other words, video data codes representative of the visual images and audio data codes representative of the sound are stored into and read out from the videotape cassette VT. A picture, i.e., a series of visual images and the sound are produced from the video data codes on the monitor display 112 and the audio data codes through the sound system 106.

The recorder 114 includes a video recorder 120, a sound recorder 122 and a time code generator 124. The video recorder 120 has an image pick-up device (not shown), and the sound recorder 122 is equipped with a microphone (not shown). When the user wishes to record his or her performance in the videotape cassette VT, he or she instructs the recorder 114 to record the performance. The image pickup device (not shown) converts the visual images to a video signal, and the video recorder 120 produces the video data codes from the video signal. On the other hand, the microphone (not shown) converts the sound to an audio signal, and the sound recorder 122 produces the sound data codes from the audio signal. The sound may be tones generated from another musical instrument such as, for example, violin performed concurrently with the sound source 108, and the visual images may represent the violinist, who is playing the violin. The time code generator 114 periodically produces a time code representative of the lapse of time after the initiation of the recording the visual images. The time code is hereinbelow referred to as "video time code". RC time codes may be used as the video time codes. The video data codes are stored in a video track of the videotape, and the audio data codes are stored in a sound track of the videotape. The video time codes are also stored in the videotape together with the video data codes and sound data codes.

The player 116 is responsive to user's instructions so as to read out the video data codes and sound data codes from the videotape VT. The player 116 selectively supplies the video data codes and sound data codes to the monitor display 112 and the controller 110. The monitor display 112 is, by way of example, implemented by a liquid crystal display panel. A cathode ray tube is also available for the reproduction of visual images. The monitor display 112 reproduces the picture or the series of visual images from the video data codes on the screen. The player 116 separately supplies the audio data codes and video time codes to the controller 110.

Controller

The controller 110 includes a code converter 126, a data processing unit 128 and a manipulator 130. The code converter 126 is connected between the player 116 and the data processing unit 128, and the player 116 is directly connected to the data processing unit 128. A suitable cable may be used for the connection between the video camera 102 and the controller 110. The video time codes are supplied to the code converter 126, and the code converter 126 converts the video time codes to music time codes. The music time codes are hereinbelow referred to as "MIDI time codes". The MIDI time codes are used for calibrating a clock as will be described hereinlater, and also represent a lapse of time from the initiation of production of the picture and frames. The lapse of time is defined by hours, minutes and seconds. The MIDI time codes are supplied from the code converter 126 to the data processing unit 128. The manipulating panel 130, disc recorder 104, sound system 106 and sound source 108 are connected to the data processing unit 128.

User's instructions are given through the manipulating panel 130 to the data processing unit 128 so that the data processing unit 128 controls the video camera 102, disc recorder 104, sound system 106 and sound source 108 for synchronous recording. One of the main tasks of the data processing unit 126 is to record a performance on the sound source 108 synchronously with the playback of a picture. The task is hereinbelow referred to as "synchronous recording".

The outline of the synchronous recording is as follows. While the video camera is reproducing a picture on the monitor display 112, the player 116 supplies the video time codes to the code converter 126. The code converter 126 converts the video time codes to the MIDI time codes, and supplies the MIDI time codes to the data processing unit 128. The data processing unit 128 receives the MIDI time codes, and immediately transfers the MIDI time codes to the disc recorder 104. The player 116 further transfers the audio data codes to the data processing unit 128. The data processing unit 128 produces an audio signal from the audio data codes, and supplies the audio signal to the sound system 106. Electronic tones are radiated from the sound system 106. The user is assumed to start his or her performance. The sound source 108 intermittently produces the event codes representative of the key actions, and supplies the event codes to the data processing unit 128. The data processing unit 128 immediately transfers the event codes to the disc recorder 104. The disc recorder 104 produces the delta-time codes from the MIDI time codes, and stores the event codes and delta-time codes in an information storage medium such as, for example, a floppy disc FD.

Sound Source

The sound source 108 is broken down into an automatic player piano 132 and a tone generator for ensemble 134. The tone generator for ensemble 134 is connected to the data processing unit 128, and the event codes are supplied from the data processing unit 128 to the tone generator for ensemble 134. The tone generator for ensemble 134 produces digital tone signal on the basis of the event codes, and converts the digital tone signal to an analog tone signal. The analog tone signal is supplied from the tone generator for ensemble 134 to the sound system 106 so that electronic tones are radiated from the sound system 106. If the data processing unit supplies the audio signal to the sound system concurrently with the event codes, the parts of the piece of music are reproduced in ensemble.

The automatic player piano 132 includes an acoustic piano 136 and an automatic playing system 138 and a tone generator for piano tones 140. In this instance, a standard grand piano is used as the acoustic piano 136, and includes a keyboard 142, action units 144, hammers 146, strings 148, dampers (not shown) and pedals 149. Black keys and white keys are laid on the well-known pattern, and form parts of the keyboard 142. The action units 144 are linked with the black/white keys so that the depressed keys actuate the associated action units 144. The actuated action units 144 drive the associated hammers 146 for free rotation, and the hammers strike the associated strings 148 at the end of the free rotation for generating acoustic piano tones. The pedals 149 are called as "damper pedal", "sustain pedal" and "soft pedal". When a player steps on the damper pedal, the damper pedal keeps the dampers spaced from the strings, and the acoustic piano tones are prolonged. The soft pedal is used for lessening the strings struck with the hammers, and the acoustic piano tones are reduced in loudness. The player steps on the sustain pedal after depressing a black/white key or keys. Then, the sustain pedal keeps the associated damper or dampers spaced from the strings, and the acoustic piano tone or tones are prolonged.

The automatic playing system 138 includes a MIDI controller 150, solenoid-operated key actuators 152, key sensors 154, pedal sensors 156 and solenoid-operated pedal actuators 158. The MIDI controller 150 is connected to the data processing unit 128, and event codes are supplied from and to the data processing unit 128. The MIDI controller is responsive to user's instructions given through the manipulating panel 130 for selecting one of the tone generator for piano tones 140 and the automatic playing system 138.

If the user wishes to generate the electronic tones, he or she instructs the MIDI controller 150 to transfer the event codes to the tone generator for piano tones 140. The MIDI controller 150 transfers the event codes to the tone generator for piano tones 140, and the tone generator for piano tones 140 produces the digital tone signal on the basis of the event codes, and converts the digital tone signal to the analog tone signal. The analog tone signal is supplied from the tone generator for piano tones 140 to the sound system 106, and electronic tones are radiated from the sound system 106.

On the other hand, if the user instructs the MIDI controller 150 to actuate the black/white keys, the MIDI controller 150 determines target trajectories for plungers of the solenoid-operated key actuators 152. The MIDI controller 150 further determines target trajectories for plungers of the solenoid-operated pedal actuators 149, if necessary. The MIDI controller 150 selectively supplies driving signals to the solenoid-operated key actuators 152 and the solenoid-operated pedal actuators 158 so that the plungers project from the solenoid-operated key/pedal actuators 152/158 along the target trajectories. The plungers give rise to the actions of the black/white keys 142 and pedals 149. For this reason, the automatic playing system 138 performs a piece of music without any fingering and step of a human player. The key sensors 154 and pedal sensors 156 are used in the synchronous recording. While a user is fingering a piece of music on the keyboard 142, the key sensors 154 report current key positions to the MIDI controller 150 through key position signals, and the pedal sensors 156 report current pedal positions to the MIDI controller 150.

The MIDI controller 150 periodically fetches pieces of positional data information representative of the current key/pedal positions, and analyzes the pieces of positional data information to see whether or not the user depresses or releases any one of the black/white keys or a pedal 149. When the MIDI controller 150 acknowledges that the black/white keys and/or pedals 149 move, the MIDI controller 150 stores the key action such as a note-on/note off, the note number representative of the pitch of a tone to be reproduced and a velocity representative of the loudness of the tone and the pedal action in the event codes. The event codes are supplied from the MIDI controller 150 to the data processing unit 128.
Sound System The sound system 106 includes a mixer 160, an amplifier 162 and speakers 164. The data processing unit 128, tone generator for ensemble 134 and tone generator for piano tones 140 are connected to the mixer 160, and the audio signal and analog tone signals are selectively supplied to the mixer 160. The audio signal and analog tone signals are mixed with one another, and the mixed signal is supplied to the amplifier 162. The mixed signal is equalized and amplified by the amplifier 162, and the amplified signal is supplied from the amplifier 162 to the speakers 164. The speakers 164 convert the amplified signal to the electronic tones. A mixer with an input port for digital signals may be used in the sound system 106. In this instance, the audio data codes and digital tone signals are directly supplied to the mixer.
Disc Recorder/Player The disc recorder/player includes a floppy disc controller/driver 170, and the floppy disc controller/driver 170 has an information processing capability. The floppy disc controller/driver 170 creates a standard MIDI file in a floppy disc FD during the synchronous recording under the control of the data processing unit 128.

Figure 2B:
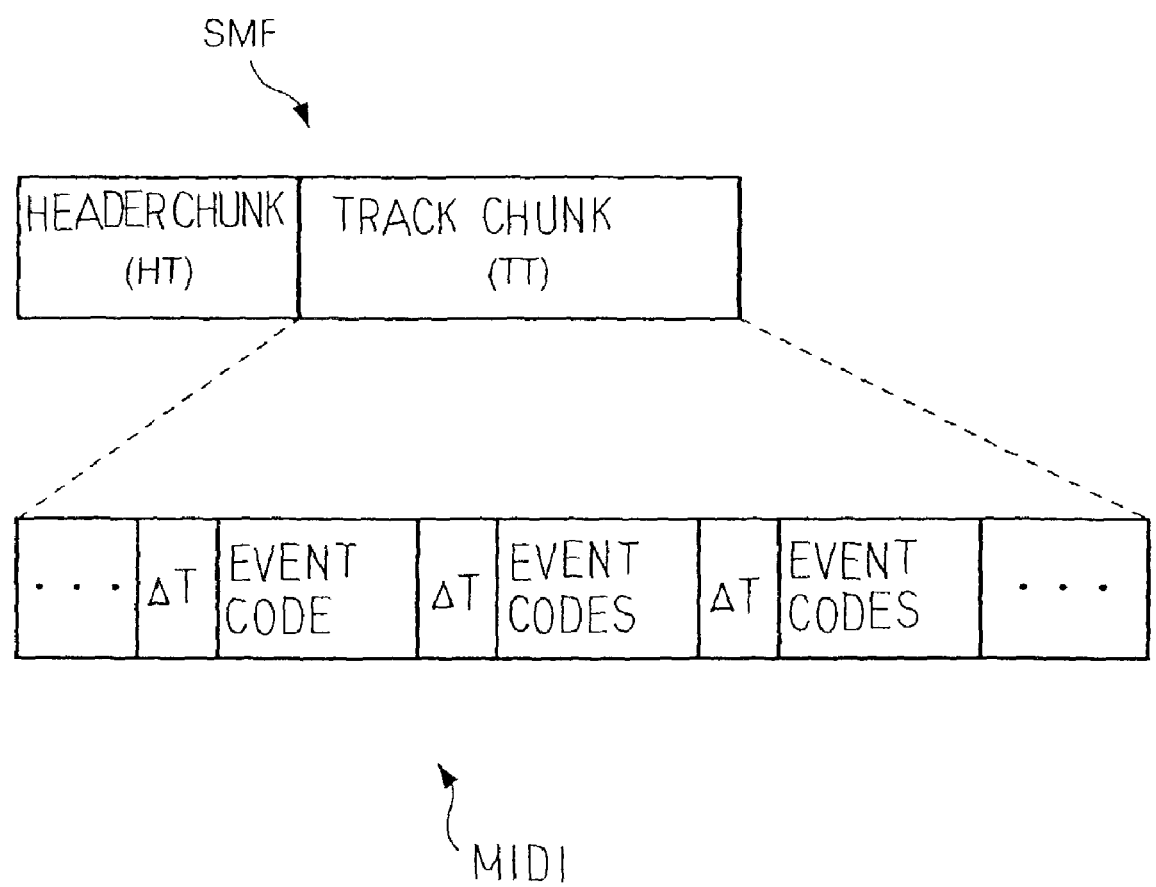
FIG. 2B is a view showing an example of a standard MIDI file.

FIG. 2B shows an example of the standard MIDI file SMF. The standard MIDI file SMF is broken down into a header chunk HT and a track chunk TT. Fundamental information such as a chunk type and a videotape identification code V-ID are stored in the header chunk HT. The videotape identification codes V-ID have been assigned to videotape cassettes, and make each videotape discriminative from the others. On the other hand, the track chunk TT is assigned to the MIDI data codes MIDI representative of pieces of music recorded in the floppy disc FD. A set of MIDI codes MIDI includes event codes and delta time codes. The event codes are representative of the tones to be reproduced and the system messages such as a system exclusive event, metaevent and so forth. The event codes representative of the tones are produced by the MIDI controller 150, and the event codes representative of the system messages are produced by the data processing unit 128. The delta time codes, which are abbreviated as "$\Delta T$" in FIG. 2B, are representative of the time intervals between events and the previous events. The floppy disc controller/driver 170 determines the time intervals between the events and the previous events, and stores the delta time codes in the track chunk together with the event codes.

When a control signal representative of the initiation of synchronous recording reaches the floppy disc controller/driver 170, the floppy disc controller/driver 170 starts a clock. The event codes are intermittently supplied to the floppy disc controller/driver 170. When an event code or codes reach the floppy disc controller/driver 170, the floppy disc controller/driver 170 checks the clock for the arrival time, and determines the time interval. In order to record the event codes synchronously with the playback of the picture, the floppy disc controller/driver 170 compares the lapse of time indicated by the clock with the lapse of time represented by the MIDI time codes transferred through the data processing unit 128 to see whether or not any time lug takes place. When the answer is given affirmative, the floppy disc controller/driver 170 varies the time interval in such a manner as to eliminate the time lug from the lapse of time. The floppy disc controller/driver 170 produces the delta time code representative of the time interval, and stores the delta time code in the track chunk TT together with the event code or codes.

The floppy disc controller/driver 170 includes a controller 172, a write-in head 174 and a clock generator 176. The controller 172 creates the standard MIDI file SMF in a floppy disc FD, and writes the codes in the standard MIDI file SMF through the write-in head 174. The clock generator 176 has an oscillator, i.e., the combination of a quartz oscillator and an amplifier and a frequency divider. The oscillator generates a periodic signal, and the frequency divider divides the periodic signal for producing various clock signals for the timing control. One of the clock signals is called as a tempo clock CT, and the tempo clock CT is supplied to the MIDI controller 150 for generating the MIDI data codes. The time interval between an event and the previous event is indicated by using the tempo clock CT.

Figure 3:
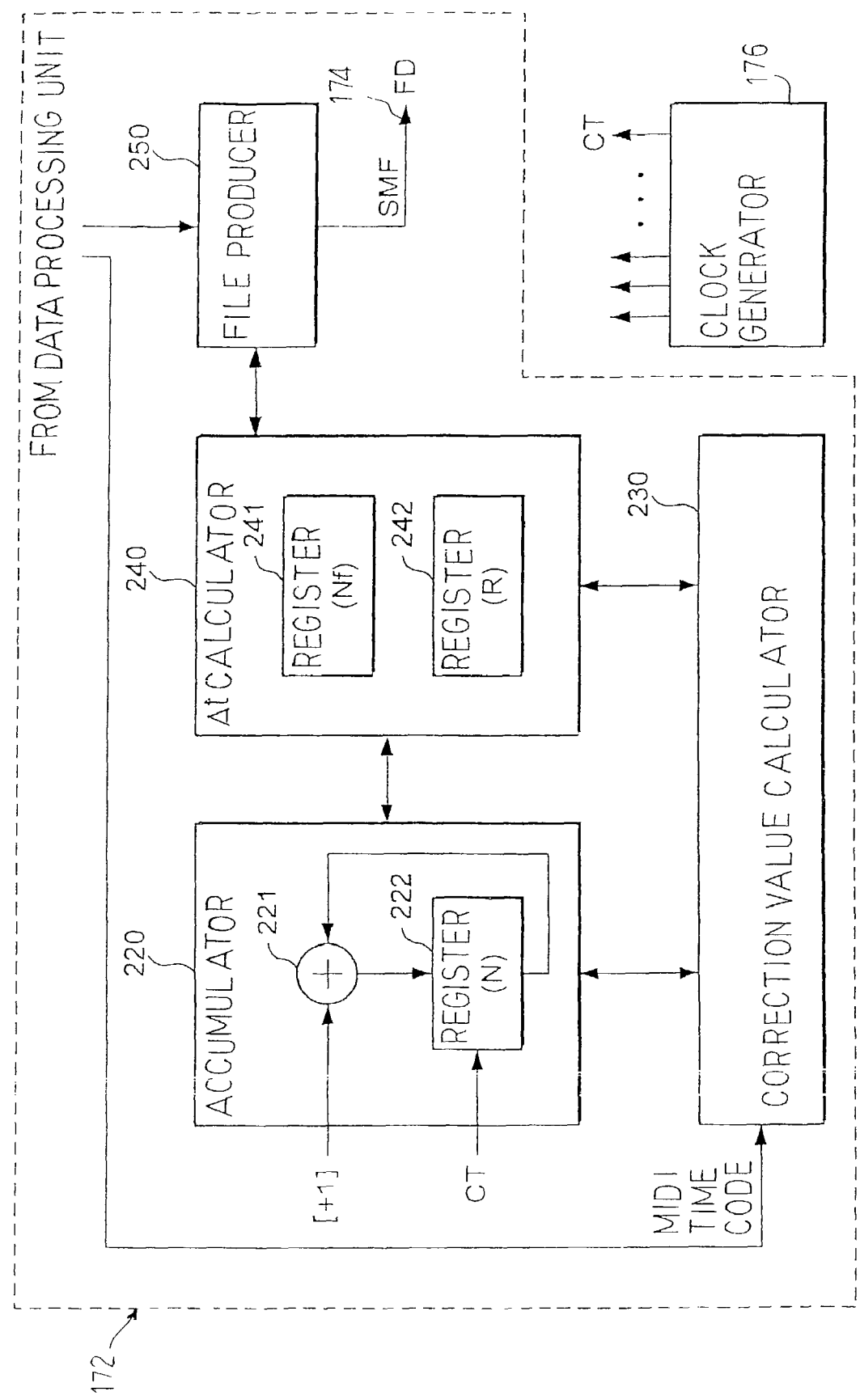
FIG. 3 is a block diagram showing the circuit configuration of a controller incorporated in a floppy disc controller/driver.

The circuit configuration of the controller 172 is shown in FIG. 3. The controller 172 includes an accumulator 220 serving as the clock, a correction value calculator 230, a delta-time calculator 240 and a file producer 250. The controller 3 is connected to the file producer 250 and the correction value calculator 230, and supplies the event codes and the MIDI time codes to the file producer 250 and the correction value calculator 230, respectively. The tempo clock CT is supplied from the clock generator 210 to the accumulator 220.

The accumulator 220 includes an adder 221 and a register 222. When the data processing unit 128 receives the first MIDI time code representative of zero from the code converter 126, the data processing unit 128 writes zero in the register 222. While the controller 110 is recording the performance synchronously with the picture, the data processing unit 128 transfers the MIDI time code to the correction value calculator 230. A source of constant [+1] is connected to one of the input nodes of the adder 221, and the register 222 is connected to the other input node of the adder 221. The total number N of tempo clocks is supplied to the adder 221, and the adder 221 increments the total number N of tempo clocks by one. The output node of the adder 221 is connected to the register 222, and the register 222 is responsive to the tempo clock CT for latching the output signal of the adder 221. Thus, the adder 221 and register 222 form an accumulating loop, and the total number N is incremented by one in response to the tempo clock signal CT. The total number N of tempo clocks is proportional to the lapse of time from the reception of the first MIDI time code, i.e., the initiation of synchronous recording. Thus, the accumulator serves as the clock.

The file producer 250 is under the control of the data processing unit 128. The file producer 250 is connected to the delta-time calculator 240, and supplies an instruction signal representative of a calculation of delta time to the delta-time calculator 240 upon reception of an event code or a set of event codes so that the delta-time calculator 240 determines the delta time, i.e., the time interval between the previous event and the presently received event. The delta-time calculator 240 stores the delta-time in a delta-time code, and supplies the delta-time code to the file producer 250.

The file producer 250 is further connected through a driving circuit (not shown) to the write-in head 174. The data processing unit 128 transfers the videotape identification code V-ID to the file producer 250, and the file producer 250 writes the videotape identification code V-ID through the write-in head 260 into the header chunk HT in the floppy disc FD. While the user is fingering on the keyboard 142, the data processing unit 128 intermittently transfers the event codes from the MIDI controller 150 to the file producer 250. When the event code or codes reach the file producer 250, the file producer 250 supplies the instruction signal to the delta-time calculator 240. The delta-time calculator 240 produces the delta-time code, and supplies it to the file producer 250 as described hereinbefore. The file producer 250 writes the event code or codes, which are supplied from the data processing unit 128, and the associated delta-time codes into the track chunk TT of the floppy disc FD.

The delta-time calculator 240 is connected to the accumulator 220, correction value calculator 230 and file producer 250, and includes registers 241 and 242. When the control signal representative of the initiation of synchronous recording reaches the controller 172, the registers 241/242 are initialized, and zero is written in both registers 241 and 242. The time at which the delta-time calculator 240 received the instruction signal from the file producer 250 is stored in the register 241. The previously instructed time is stored in the register 241 as the number Nf of tempo clocks. When the instruction signal reaches the delta-time calculator 240, the delta-time calculator 240 reads out the number N of tempo clocks from the register 222, and calculates the time interval (N−Nf). The delta-time calculator 240 keeps the number N of tempo clocks in the register 241 as the previous instructed time Nf. On the other hand, the register 242 is assigned to a correction value R, which is also written in the form of the number of tempo clocks CT. The correction value R is representative of the difference between the lapse of time indicated by the clock, i.e., the accumulator 220 and the lapse of time determined on the basis of the MIDI time code. The correction value R is supplied from the correction value calculator 230, and the delta-time calculator 240 adds the correction value R to the time interval (N−Nf) for determining the delta-time, i.e., (N−Nf+R). The delta-time calculator 240 stores the delta-time in the delta-time code, and supplies the delta-time code to the file producer 250. Upon completion of the task instructed by the file producer 250, the delta-time calculator 240 writes the number N of tempo clocks CK into the register 241. Thus, the previous instructed time Nf is renewed.

Figure 4:
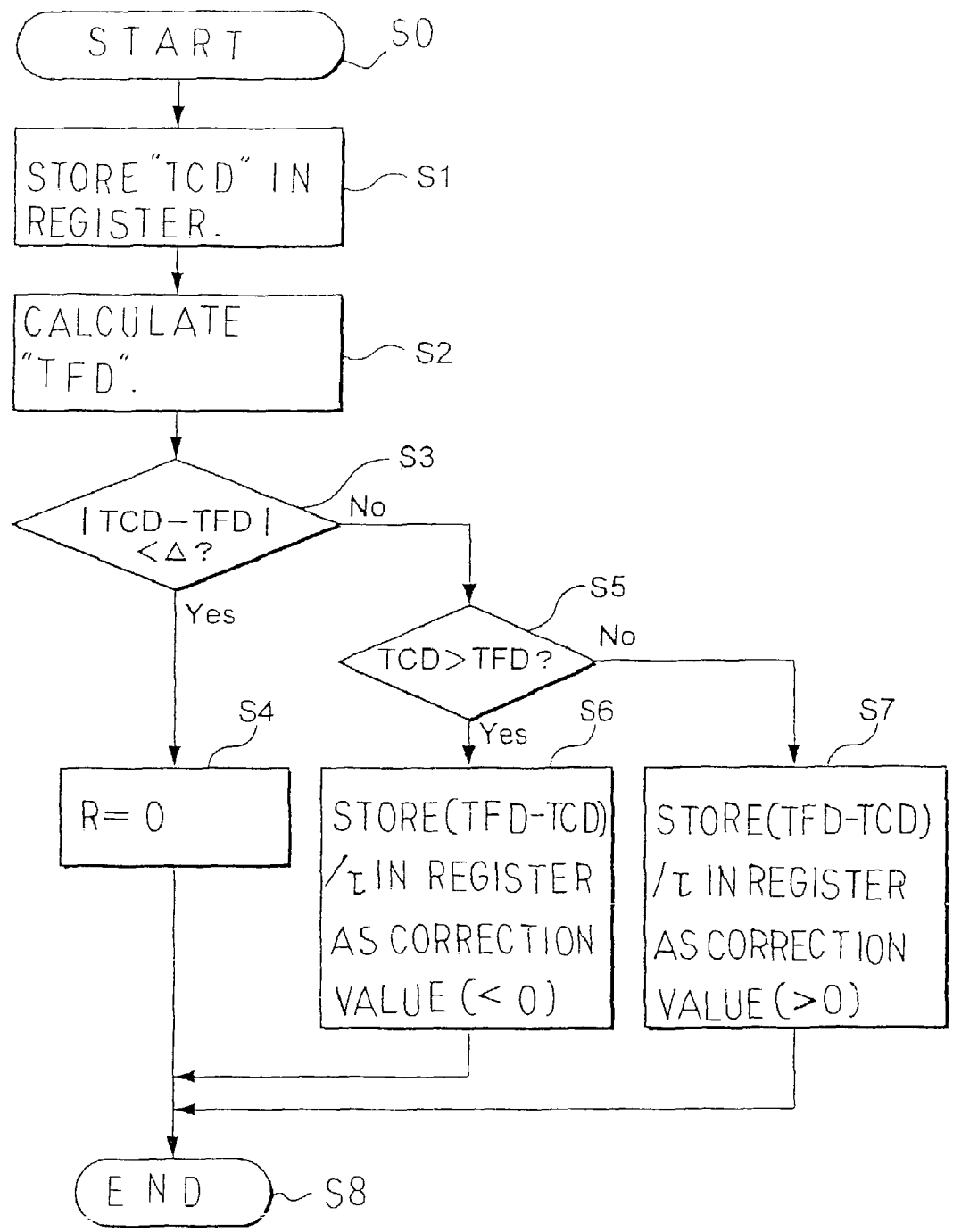
FIG. 4 is a flowchart showing a computer program executed by a correction value calculator.

The correction value calculator 230 is connected to the accumulator 220 and delta-time calculator 240, and determines the correction value R. The correction value R is representative of the time difference between the lapse of time from the reproduction of the picture and the lapse of time from the performance on the keyboard 142. The correction value calculator 230 determines the correction value R through execution of a computer program shown in FIG. 4.

A MIDI time code is assumed to reach the correction value calculator 230. The correction value calculator 230 starts the computer program at step S0, and stores the MIDI time code in an internal register (not shown). The MIDI time code represents the lapse of time TCD from initiation of producing the picture as by step S1.

Subsequently, the correction value calculator 230 reads out the number N of tempo clocks CT from the register 222, and converts the number N to a lapse of time TFD as by step S2. The tempo clocks CT have a pulse period τ, and the lapse of time TFD is given as (N×τ).

The correction value calculator 240 determines the absolute value of the difference between the lapse of time TCD and the lapse of time TFD, and compares the absolute value |TCD−TFD| with a margin Δ to see whether or not the absolute value |TCD−TFD| is less than the margin Δ as by step S3.

When the absolute value |TCD−TFD| is less than the margin Δ, the answer at step S3 is given affirmative, and the correction value calculator 230 determines that the correction value R is to be zero. Then, the correction value calculator 230 writes zero in the register 242 as by step S4, and exits from the computer program.

On the other hand, the absolute value |TCD−TFD| is greater than the margin Δ, the answer at step S3 is given negative, and the correction value calculator 230 checks the lapses of time TCD and TFD to see whether the performance on the keyboard 142 is delayed for the picture as by step S5.

The performance on the keyboard 142 is assumed to be delayed for the picture. The lapse of time TCD is greater than the lapse of time TFD, and the answer at step S5 is given affirmative. Then, the correction value calculator 230 divides the difference TFD−TCD, which is a negative value, by the pulse period τ, and writes the product, i.e., (TCD−TFD)/τ in the register 242 as the correction value R. Since the dividend (TCD−TFD) and the divisor τ are a negative value and a positive value, the product (TCD−TFD)/τ is negative. The correction value calculator 230 writes the correction value (<0) in the register 242 as by step S6. When the delta-time calculator 240 adds the correction value R to the time interval (N−Nf) for determining the delta-time, i.e., (N−Nf+R), the time interval (N−Nf) is shortened, and the delta-time code makes the next note-on event catches up with the visual images in the picture.

If, on the other hand, the performance on the keyboard 142 is advanced rather than the picture, the answer at step S5 is given negative, and the correction value calculator 230 divides the difference TFD−TCD, which is a positive value, by the pulse period τ, and writes the product, i.e., (TCD−TFD)/τ in the register 242 as the correction value R. Since the dividend (TCD−TFD) and the divisor τ are positive, the product (TCD−TFD)/τ is a positive number. The correction value calculator 230 writes the correction value (>0) in the register 242 as by step S7

When the delta-time calculator 240 adds the correction value R to the time interval (N−Nf) for determining the delta-time, i.e., (N−Nf+R), the time interval (N−Nf) is prolonged, and the delta-time code makes the visual images in the picture catch up with the next note-on event.

When the correction value calculator 230 writes the correction value at step S6 or S7, the correction value calculator 230 terminates the task at step S8.

Figure 5:
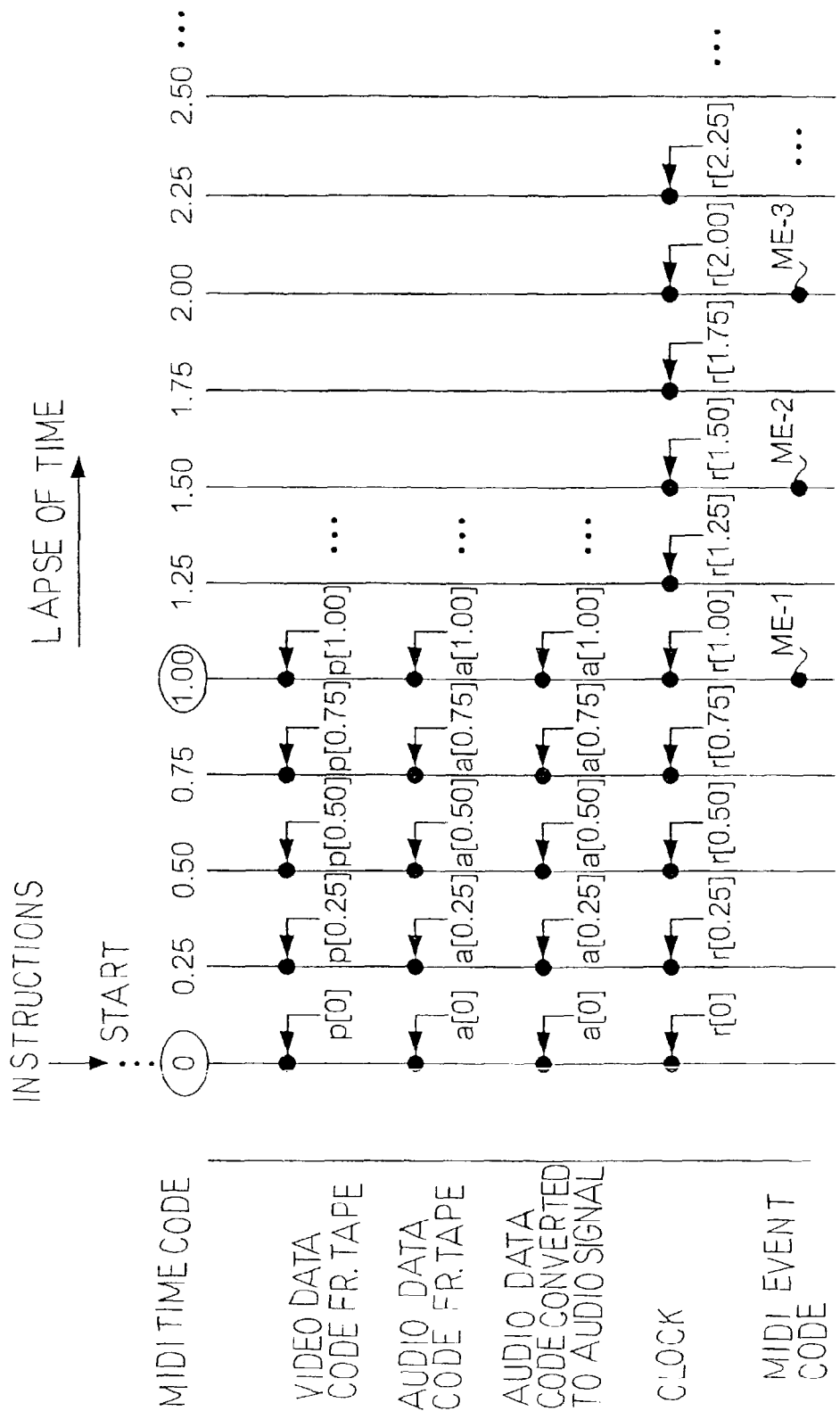
FIG. 5 is a timing chart showing a synchronous recording.

Description is hereinafter made on the synchronous recording with reference to FIG. 5. The video time codes, which are read out from the videotape cassette VT, are converted to the MIDI time codes, which are assigned the first row. The video time codes [0], [0.25], [0.50], ... are read out at time zero, 0.25 second, 0.50 second ..., and are immediately transferred through the data processing unit 128 to the controller 172. Thus, the MIDI time codes [k] (k=0, 0.25, 0.50, ... ) are read out at time intervals of 250 milliseconds. In an actual multimedia platform, the MIDI time codes are produced at time intervals of 1/30 second. However, the time intervals are reduced to 250 milliseconds for the sake of simple description.

The video data codes, which are also read out from the videotape cassette VT, are expressed as p[k], i.e., p[0], p[0.25], p[0.50], ..., and are read out between time [k] and time [k+1]. The video data codes p[k] are immediately supplied to the monitor display 112 for producing a picture. The second row is assigned to the video data codes p[k].

The audio data codes, which are also read out from the videotape cassette VT, are expressed as a[k] (k=0, 0.25, 0.50, ... ), and are read out from the videotape between time [k] and time [k+1]. The third row is assigned to the audio data codes a[k]. The audio data codes a[k] are supplied to the data processing unit 128, and are converted to the audio signal. The fourth row is assigned to the audio data codes converted to the audio signal.

The fifth row is assigned to the lapse of time r[k], i.e., N×τ, and event codes ME-1, ME-2, ME-3, ... are intermittently supplied to the file producer 250 in response to the fingering on the keyboard 142 as indicated by the sixth row.

A user firstly gives a pause instruction to the data processing unit 128 through the manipulating panel 130. The data processing unit 128 supplies the control signal representative of the user's instruction to the floppy disc controller/driver 170 so that the floppy disc controller/driver 170 enters the idling state. While the data processing unit 128 is waiting for the next instruction, the user loads a floppy disc FD into the floppy disc controller/driver 170 and a videotape cassette VT into the video camera 102. The multimedia platform gets ready for the synchronous recording, and informs the user of the ready state through the display window on the manipulating panel 130.

The user instructs the player 116 to start the reproduction of the picture through the manipulating panel 118. Then, the player 116 reads out the first video time code representative of zero, and supplies the video time code to the code converter 126. The code converter 126 converts the video time code to the MIDI time code [0], and supplies the MIDI time code [0] to the data processing unit 128. When the MIDI time code [0] reaches the data processing unit 128, the data processing unit 128 supplies the control signal representative of the initiation of synchronous recording, i.e., cancellation of the pause instruction to the controller 172 together with the MIDI time code [0].

With the MIDI time code [0], the registers 222, 241 and 242 are reset to zero, and the accumulator 220 starts to count the tempo clocks CT. Although the correction value calculator 230 gets ready to calculate the lapse of time r[0], the correction value calculator 230 does not calculate the correction value R on the basis of the MIDI time code [0].

The player 116 further reads out the video data codes p[0] and audio data codes a[0] from the videotape cassette VT, and supplies the video data codes p[0] and audio data codes a[0] to the monitor display 112 and the data processing unit 128, respectively. The monitor display 112 starts to produce visual images on the screen, and the data processing unit 128 starts to supply the audio signal to the sound system 106 for radiating the electronic tones from the speakers 164.

When the next video time code is read out from the videotape cassette VT, the MIDI time code [0.25] is supplied to the correction value calculator 230, and the video data codes p[0.25] and audio data codes a[0.25] are transferred to the monitor display 112 and the data processing unit 128. The correction value calculator 230 starts the computer program shown in FIG. 4, and stores the correction value R in the register 242, if necessary. The monitor display 112 continuously produces the visual images on the screen, and the electronic tones are radiated from the speakers 164. The correction value calculator 230 calculates the lapse of time r[0.25], and compares the lapse of time r[0.25], i.e., TFD with the lapse of time TCD represented by the MIDI time code [0.25] so see whether or not the correction value R is to be determined.

While the MIDI time code is being incremented from [0.25] to [0.75], the player 116, data processing unit 128, sound system 106 and the controller 172 repeat the above-described jobs, and waits for the first MIDI event code ME-1. When the user depresses a black/white key, the MIDI controller 150 acknowledges the note-on event, and supplies the first MIDI event codes ME-1 through the data processing unit 128 to the floppy disc controller/driver 170. Upon arrival of the first MIDI event codes ME-I at the file producer 250, the file producer 250 requests the delta-time calculator 240 to determine the lapse of time from the initiation of the synchronous recording. The delta-time calculator 240 reads out the number N of tempo clocks CT from the register 222, and checks the register 242 for the correction value R. The delta-time calculator 240 calculates the delta time, i.e., (N−Nf+R), and stores the delta time in a delta-time code. The delta-time calculator 240 supplies the delta-time code to the file producer 250 so that the first MIDI event codes ME-1 and delta-time code are stored in the track chunk TT by means of the write-in head 174.

When the MIDI event codes ME-2/ME-3/ . . . reaches the file producer 250, the file producer 250 and delta-time calculator 240 repeat the above-described jobs for storing the MIDI event codes ME-2/ME-3/ . . . in the track chunk TT together with the delta-time codes.

When the user completes the performance on the keyboard 142, he or she gives the instruction representative of the completion to the data processing unit 128. Then, the data processing unit 128 instructs the player 116 to read out the videotape identification code V-ID from the videotape cassette VT. The player 116 transfers the videotape identification code V-ID to the data processing unit 128, and the data processing unit 128 supplies the control signal representative of storing the videotape identification code V-ID in the header chunk HT to the file producer 250 together with the videotape identification code V-ID. The file producer 250 writes the videotape identification code V-ID into the header chunk HT, and completes the synchronous recording.

As will be understood from the foregoing description, the correction value calculator 230 periodically regulates the internal clock 220 by the MIDI time code, and stores the MIDI event codes in the information storage medium together with the delta-time codes representative of the time interval between the MIDI event codes and the previous event codes on the basis of the lapse of time indicated by the clock 220. For this reason, the performance recorded in the information storage medium is always synchronized with the picture produced in another information storage medium VT.

In the first embodiment, the automatic player piano 132 serves as the first data source 1, and the video camera 102 and controller 110 as a whole constitute the second data source 2. The clock generator 176, accumulator 220, delta-time calculator 240 and correction value calculator 230 as a whole constitute the third data source 4, and the file producer 250 and write-in head 174 form in combination the recorder 6. The monitor display 112 serve as the image generator 8.

Second Embodiment

Figure 6:
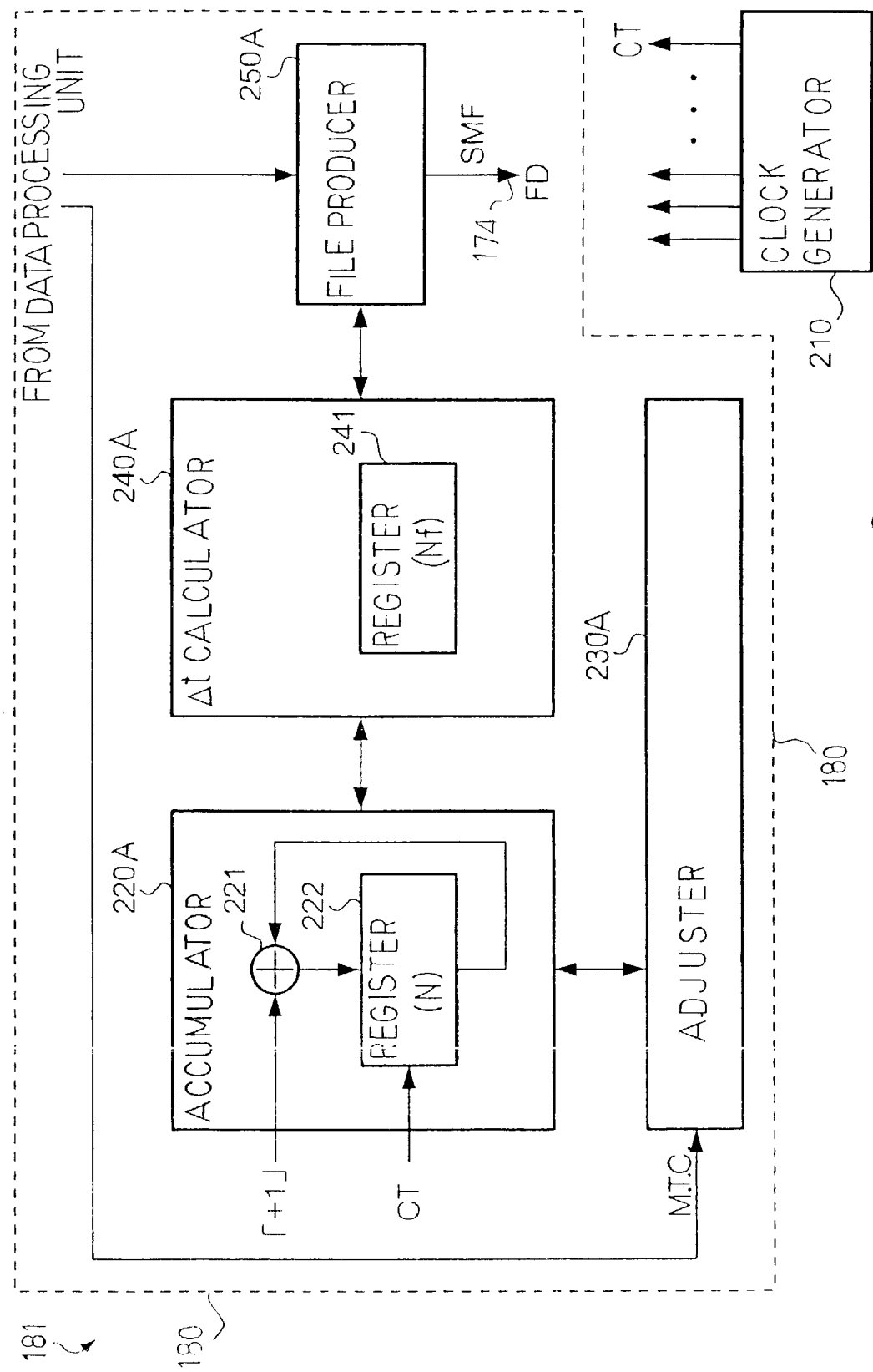
FIG. 6 is a block diagram showing the system configuration of a controller incorporated in another multimedia platform according to the present invention.

FIG. 6 shows another controller 180 incorporated in a floppy disc controller/driver 181, which in turn is incorporated in another multimedia platform embodying the present invention. The other system components are similar to those of the first embodiment so that references 102/104/106/108/110/112 are used for discriminating them from one another.

The floppy disc controller/driver 181 also has an information processing capability. The controller 180 is connected to the data processing unit 128. The controller 180 internally produces delta-time codes on the basis of the number N of tempo clocks CT, and eliminates a time difference from the lapse of time indicated by the clock upon arrival of the MIDI time code. The event codes are supplied from the MIDI controller 150 through the data processing unit 128, and the event codes and delta-time codes are written in a floppy disc FD by means of the write head 174.

The controller 180 includes an accumulator 220A, a delta-time calculator 240A, a file producer 250A and an adjuster 230A. The file producer 250A is similar to the file producer 250, and no further description is hereinafter incorporated for avoiding repetition.

The accumulator 220A also comprises an adder 221 and a register 222, and increments the total number N of tempo clocks CT as similar to the accumulator 220. The total number N expresses the lapse of time from the initiation of synchronous recording. The difference between the accumulators 220 and 220A is that the adjuster 230A can rewrite the total number N of tempo clocks CT as will be hereinafter described in more detail.

The delta-time calculator 240A includes only one register 24 1, which is assigned to the total number Nf of the tempo clocks CT at which the previous event code or codes reached the file producer 250A. The delta-time calculator 240A determines a difference between the total number N and the total number Nf, and produces the delta-time code representative of the difference, i.e., the interval between the events. The delta-time calculator 240A supplies the delta-time code to the file producer 250A.

When the time code is transferred from the data processing unit 128, the adjuster 230A compares the lapse of time calculated on the basis of the total number N with the lapse of time stored in the MIDI time code to see whether or not the difference between the lapses of time is fallen within a predetermined margin $\Delta$. If the difference is equal to or less than the margin $\Delta$, the adjuster 230A does not carry out any adjustment work. On the other hand, if the difference is greater than the margin $\Delta$, the adjuster 230A rewrites the total number N so as to eliminate the difference from between the lapses of time.

Figure 7:
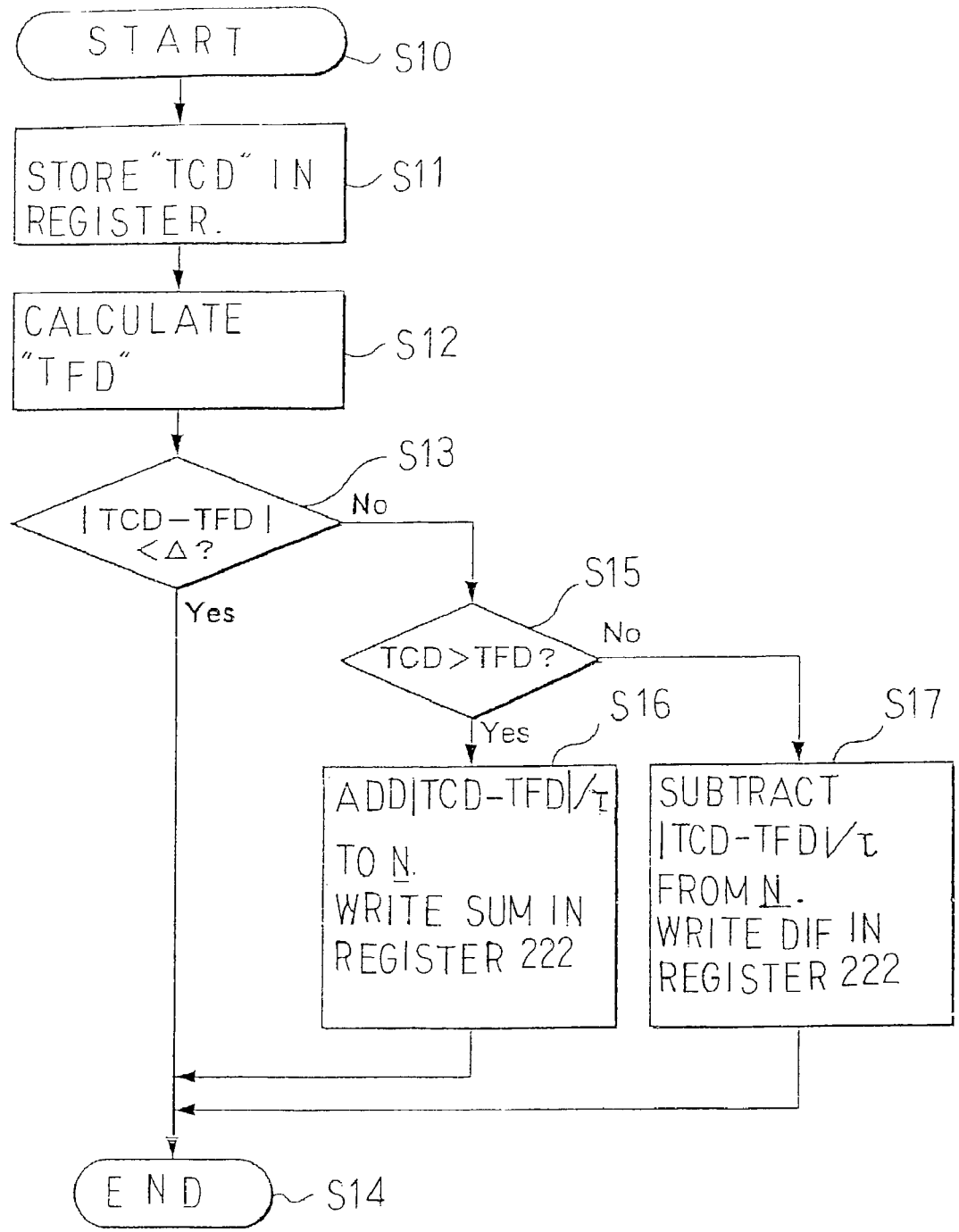
FIG. 7 is a flowchart showing a computer program executed by an adjuster.

FIG. 7 illustrates a computer program to be executed by the adjuster 230A. A MIDI time code is assumed to reach the adjuster 230A. The adjuster 230A starts the computer program at step S10, and stores the MIDI time code in an internal register (not shown) as by step S11. The MIDI time code is representative of the lapse of time TCD from initiation of producing a picture on the monitor display 112.

Subsequently, the adjuster 230A reads out the total number N of tempo clocks from the register 222, and converts the number N to a lapse of time TFD from the initiation of synchronous recording as by step S12. The tempo clocks CT have a pulse period $\tau$, and the lapse of time TFD is given as $(N \times \tau)$.

The adjuster 230A determines the absolute value of the difference between the lapse of time TCD and the lapse of time TFD, and compares the absolute value |TCD−TFD| with the margin $\Delta$ to see whether or not the absolute value |TCD−TFD| is less than the margin $\Delta$ as by step S13. When the absolute value |TCD−TFD| is less than the margin $\Delta$, the answer at step S13 is given affirmative, and the adjuster 736 exits from the computer program as by step S14.

On the other hand, the absolute value |TCD−TFD| is greater than the margin $\Delta$, the answer at step S13 is given negative, and the adjuster 230A compares the lapse of time TCD with the lapse of time TFD to see whether or not the internal clock, i.e., accumulator 220A is delayed for the time stored in the MIDI time code as by step S15.

The internal clock is assumed to be delayed for the lapse of time stored in the time code. The lapse of time TCD is greater than the lapse of time TFD, and the answer at step S15 is given affirmative. Then, the adjuster 230A divides the absolute value |TFD−TCD| by the pulse period τ, and add the product, i.e., |TCD−TFD|/τ to the total number N. The sum is written in the register 222 as by step S16. Thus, the internal clock is set with the MIDI time code. The adjuster 736 exits from the computer program at step S14.

If, on the other hand, the internal clock is advanced, the answer at step S15 is given negative, and the adjuster 230A divides the absolute value |TCD−TFD| by the pulse period τ, and subtracts the product, i.e., |TCD−TFD|/τ from the total number N. The adjuster 230A writes the difference (N−|TCD−TFD|/τ) in the register 222 as by step S17. Thus, the internal clock is set with the MIDI time code. The adjuster 230A exits from the computer program at step S14.

When a user instructs the controller data processing unit 128 to record his or her performance synchronously with a picture stored in a videotape cassette VT, the floppy disc controller/driver 170 internally produces the delta-time codes on the basis of the difference between the total numbers N and Nf, and stores the event codes and the delta-time codes in a standard MIDI file SMF. The adjuster 230A periodically checks the internal clock 220A to see whether or not the lapse of time Nτ is approximately equal to the lapse of time stored in the MIDI time code. When the lapse of time NT is advanced or delayed, the adjuster 230A sets the internal clock with the MIDI time code. As a result, the time interval stored in the delta-time code is based on the lapse of time indicated by the MIDI time code, and the performance is recorded in the floppy disc FD synchronously with the picture on the monitor display 112. Thus, the multimedia platform implementing the second embodiment achieves all the advantages of the first embodiment.

In the second embodiment, the clock generator 210, accumulator 220A, adjuster 230A and delta-time calculator 240A as a whole constitute the third data source 4, and the file producer 250A and write-in head 174 form in combination the recorder 6.

Third Embodiment

Figure 8:
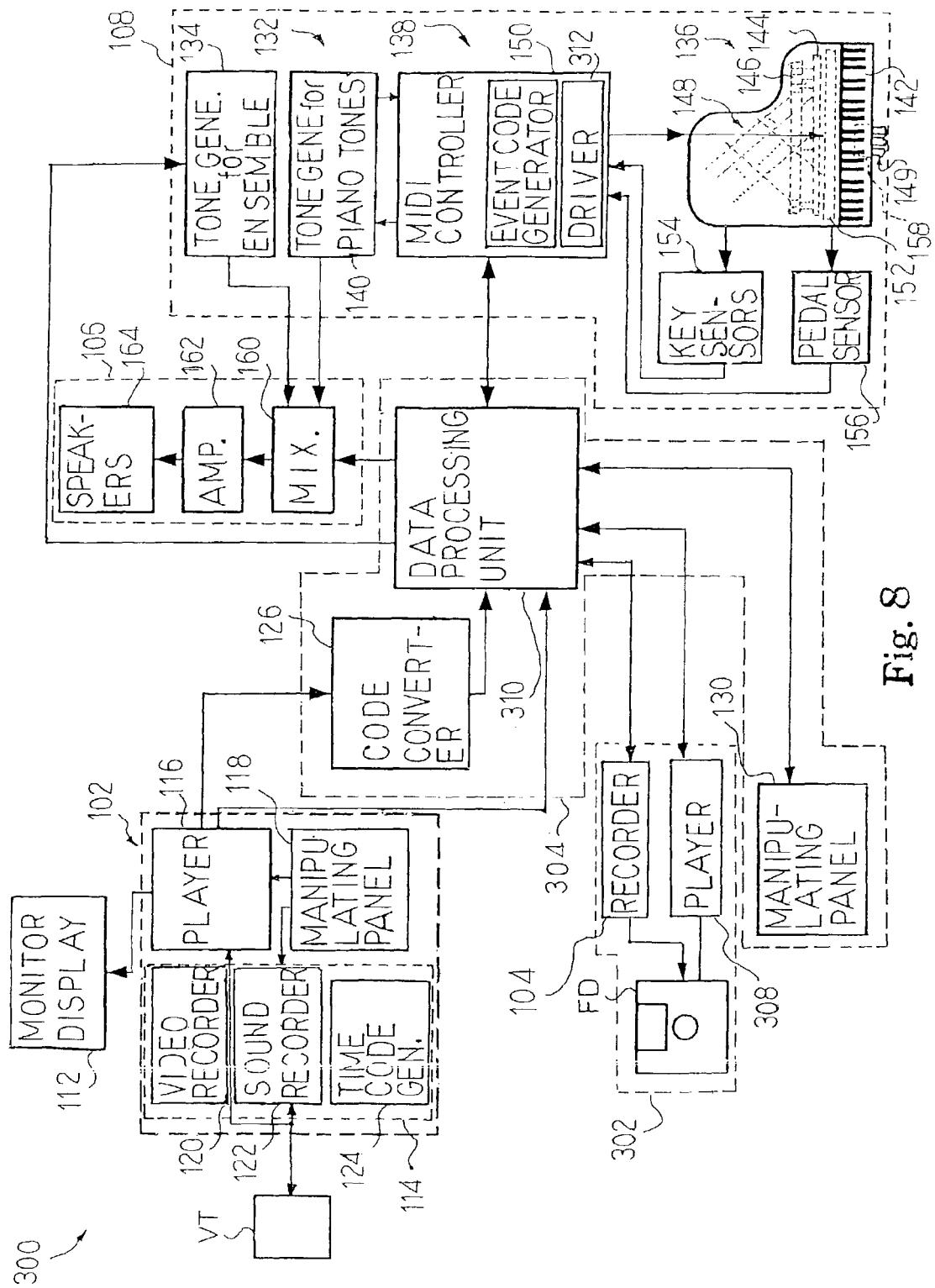
FIG. 8 is a block diagram showing the system configuration of another multimedia platform according to the present invention.

FIG. 8 shows yet another multimedia platform 300 embodying the present invention. The multimedia platform 300 is similar to the multimedia platform 100 except a disc recorder/player 302 and a controller 304. For this reason, the other system components are labeled with references designating corresponding system components 102/106/108 without detailed description for the sake of simplicity.

The disc recorder/player 302 includes the disc recorder 104 and a disc player 308, and the data processing unit 128 is replaced with a data processing unit 310. The disc recorder 104 is similar to that of the first embodiment. The code converter 126 and the MIDI controller 150 supply the MIDI time codes and event codes to the disc recorder 104 under the control of a data processing unit 310, and the disc recorder 104 records a performance on the keyboard 142 in a floppy disc FD synchronously with the playback of a picture.

The data processing unit 310 achieves other tasks for a synchronous playback as well as the tasks identical with those of the data processing unit 128, and the disc player 308 supplies the event codes, which are read out from the floppy disc FD, to the data processing unit 310 synchronously with the playback of the picture. In detail, a user is assumed to instruct the data processing unit to reproduce the performance recorded in a floppy disc synchronously with the playback of a picture through the manipulating panel 130. Then, the data processing unit 310 supplies a control signal to the disc player 308. The control signal is representative of the initiation of playback 500 milliseconds later than the initiation of playback of the picture. While the player 116 is transferring the video data codes and audio data codes to the monitor display 112 and the data processing unit 310, the video time codes are periodically supplied to the code converter 126, and are converted to the MIDI time codes. The data processing unit 310 transfers the MIDI time codes to the disc player 308 for the synchronization between the picture and the performance.

Prior to description on the disc player 308, the automatic player piano 138 is described in more detail. As described in conjunction with the multimedia platform 100, the automatic player piano 132 includes the acoustic piano 136 and automatic playing system 138. The solenoid-operated key actuators 152 and solenoid-operated pedal actuators 158 are provided for the keyboard 142 and pedals 149, respectively, and the MIDI controller 150 selectively supplies the driving signal through the driving circuit 312 to the solenoid-operated key/pedal actuators 152/158. The solenoid-operated key actuators 152 thus energized with the driving signal give rise to the key motion, and the hammers 146 are driven for rotation by the associated action units 144 so as to strike the associated strings 148 at the end of the free rotation. The strings 148 vibrate, and the acoustic piano tones are radiated from the vibrating strings 148. A time lug takes place between the delivery of the event codes to the MIDI controller 150 and the generation of the acoustic piano tones. The time lug is of the order of 500 milliseconds in this instance. The time lug of 500 milliseconds is to be taken into account for the synchronous playback. However, in case where the user instructs the data processing unit 310 to transfers the event codes to the tone generator for ensemble 134, any substantial amount of time lug does is not required for the synchronous playback.

The multimedia platform 300 eliminates the time lug from the synchronous playback as follows. When the user gives the data processing unit 310 instructions for the synchronous playback through the manipulating panel 130, the data processing unit 310 supplies the control signal representative of the pause instruction to the disc layer 308 and the control signal representative of the initiation of the playback to the player 116. When the first MIDI time code reaches the data processing unit 310, the data processing unit 310 gives instructions for the initiation of playback at a certain point 500 milliseconds after the first MIDI code to the disc player 308. The disc player 308 is responsive to the instructions so as to start the data read-out at the certain point 500 milliseconds later than the starting point. Although the acoustic piano tone is delayed from the delivery of MIDI codes by 500 milliseconds, the disc player 308 reads out the MIDI codes 500 milliseconds earlier than the video data codes representative of a scene corresponding to the acoustic piano tone. Thus, the acoustic tones are reproduced synchronously with the picture.

While the MIDI data codes are being sequentially read out from the floppy disc FD, the disc player 308 serves as not only a sequencer but also a timing controller. When the disc player 308 delivers an event code or codes to the data processing unit 310, the disc player 308 enters waiting state. Upon expiry of the time period indicated by the delta-time code, the disc player 308 reads out the next event code or codes from the floppy disc FD, and delivers the read-out event code or codes to the data processing unit 310. This is the function as the sequencer.

Figure 9:
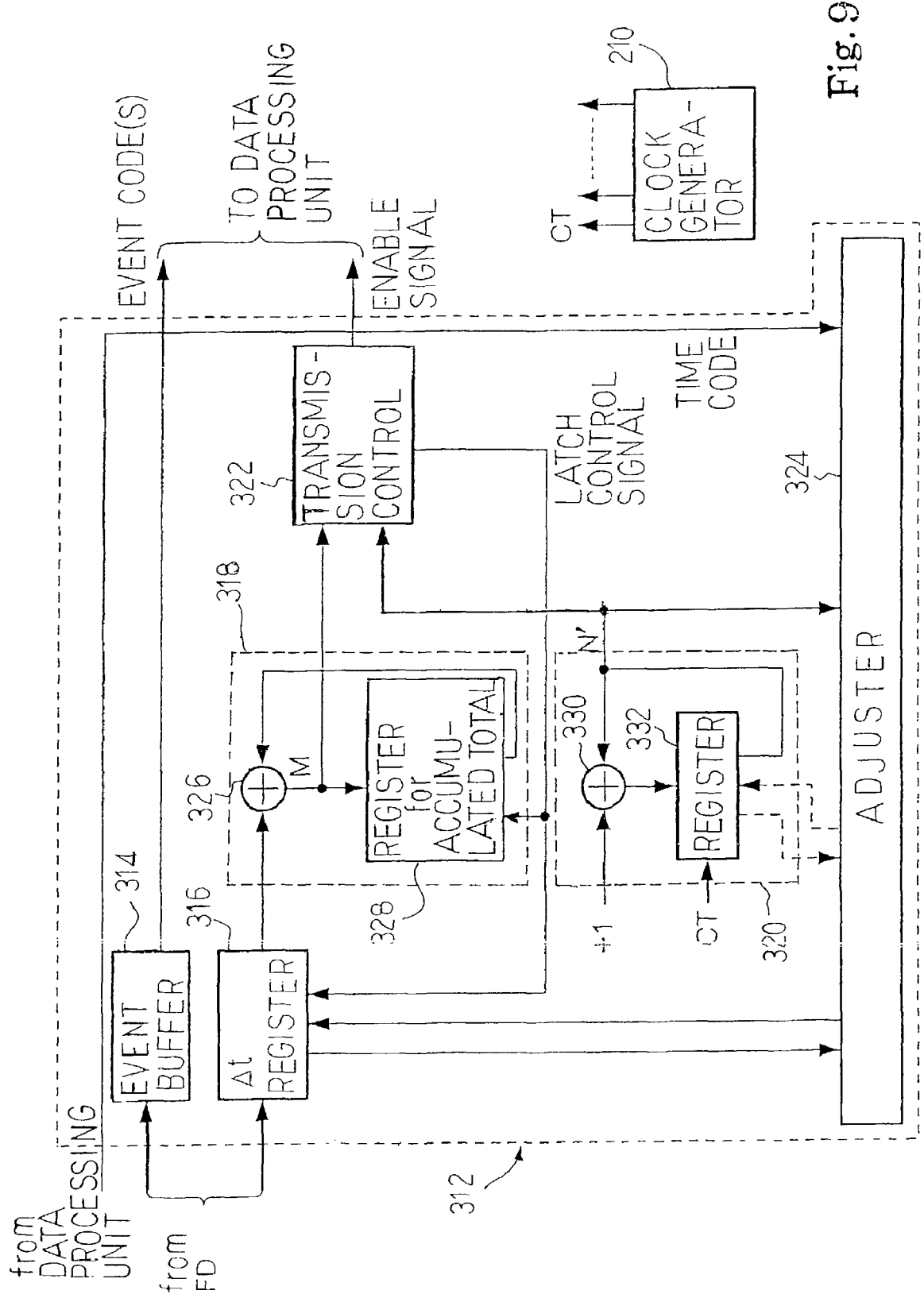
FIG. 9 is a block diagram showing the circuit configuration of a controller incorporated in a disc player forming a part of the multimedia platform.

The function as the timing controller is described with reference to FIG. 9. FIG. 9 shows the circuit arrangement of a controller 312 incorporated in the disc player 308. The controller 312 includes an event buffer 314, a delta-time register 316, accumulators 318/320, a transmission control 322 and an adjuster 324 for the function as the timing controller. The accumulator 318 is implemented by a combination of an adder 326 and a register 328, and an adder 330 and a register 332 constitute the other accumulator 320.

The event code or codes and delta-time code are selectively supplied from the floppy disc FD to the event buffer 314 and delta-time register 316, and are stored in the event buffer 314 and the delta-time register 316, respectively. A delta-time code may be followed by more than one event code. The event buffer 314 has a memory capacity much enough to store all the event codes concurrently supplied from the floppy disc FD. The value of the delta-time code is equal to the number of tempo clocks CT to be counted between an event and the next event. The event buffer 314 is connected to the data processing unit 310, and the delta-time register 316 is connected to the accumulator 318 and adjuster 324. The delta-time codes are continuously read out from the floppy disc FD until 500 milliseconds without any waiting time, and the event codes are ignored until 500 milliseconds, if any. For this reason, the accumulated total M is representative of 500 milliseconds immediately after the initiation of synchronous playback.

The transmission control 322 has two input ports connected to the accumulator 318 and the adjuster 324, and compare an accumulated total M, which represents a target time to transfer the event code or codes, with a number N' stored in the register 332 to see whether or not the event code or codes are to be transferred to the data processing unit 310. When the number N' reaches the accumulated total M, the answer is given affirmative, and the transmission control 322 changes an enable signal and a latch control signal to an active level, and supplies the active enable/latch control signals to the data processing unit 310 and the delta-time register/register for accumulated total 316/328. The transmission control 322 may supply the registers 316/328 a write-in clock signal instead of the latch control signal.

The accumulator 318 accumulates the time intervals, i.e., the values of the delta-time codes, and supplies the accumulated total M to the transmission control 322. Each delta-time code is representative of the number of tempo clocks CT to be counted between the event and the next event so that the accumulated total M is also represented by the total number of tempo clocks CT counted from the initiation of reading out the MIDI codes. The adder 326 has two input ports respectively connected to the delta-time register 316 and the register for accumulated total 328, and the output port is connected to the register for accumulated total 328. Thus, the adder 326 and register 328 form an accumulating loop. When a user instructs the controller 304 to reproduce the performance recorded in the floppy disc FD, the register 328 is reset to zero. While the disc player 308 is sequentially reading out the MIDI codes, the floppy disc FD intermittently supplies the delta-time codes to the delta-time register 316. When the number N' reaches the accumulated total M, the transmission control 322 changes the latch control signal to the active level. With the active latch control signal, the next delta-time code is stored in the delta-time register 316, and is immediately transferred to the adder 326 for accumulation. The adder 326 adds the delta time to the accumulated total M, and the new accumulated total M is stored in the register 328 in the presence of the latch control signal of the active level.

The other accumulator 320 counts the tempo clock CT. The adder 330 has two input ports respectively connected to a source of constant value "+1" and the register 332, and the output port of the adder 330 is connected to the input port of the register 332. The adder 330 and register 332 form an accumulating loop. The input port, at which the register 332 is connected to the adder 330, is further connected to the adjuster 324 and the transmission control 322, and the tempo clock CT is supplied to the register 332 as a latch control signal. When the user instructs the data processing unit 310 to reproduce the performance synchronously with the picture, an initial value is written in the register 332. The initial value is equal to $500/\tau$ millisecond. The pulse period of the tempo clock CT is represented by $\tau$. The adder 330 increments the number by one, and the total is stored in the register 332 in response to the tempo clock CT. The number N' is representative of the lapse of time from the initiation of the synchronous playback. Thus, the number N' of the tempo clocks CT is stored in the register 332, and is supplied to the adjuster 324 and the transmission control 322.

Although the accumulator 318 accumulates the delta-times, the event code or codes are never transferred to the data processing unit 310 until the accumulated total M exceeds the number N' of tempo clocks CT. After exceeding the number N', the tempo clock CT makes the number N' increment. When the number N' catches up the accumulated total M, the event code or codes are transferred to the data processing unit 310. As described hereinbefore, the initial value is "$500/\tau$" so that, even if an event code or codes are stored in the event buffer 314 before "$500/\tau$", the event code or codes are not transferred to the data processing unit 310.

The adjuster 324 is connected to the data processing unit 310, accumulator 320 and delta-time register 316. The MIDI time codes are periodically transferred from the code converter 126 through the data processing unit 310 to the adjuster 324, and the accumulator 320 supplies the number N' of tempo clocks CT to the adjuster 324. The lapse of time represented by the MIDI time code is abbreviated as "TCD'". The adjuster 324 achieves three major tasks as follows.

The adjuster 324 firstly calculates a lapse of time from the initiation of synchronous playback by multiplying the number N' by the pulse period $\tau$ of the tempo clocks CT, i.e., $(N \times \tau)$. As described hereinbefore, the event codes are transferred to the data processing unit 310 at the certain point 500 milliseconds later than the initiation of synchronous playback. In order to equalize the dial plate of one clock to the dial plate of the other clock, the adjuster 241 subtracts 500 milliseconds from the lapse of time $(N' \times \tau)$, and determines a corrected lapse of time TFD', i.e., $\{(N' \times \tau) - 500\}$. This is the first task.

The second task to be achieved by the adjuster 324 is to set the clock ahead or back. First, the adjuster 324 checks the MIDI time code to see whether or not the lapse of time TCD' is greater than zero. While the answer is given negative, the adjuster 324 repeats the comparison. When a MIDI time code represents the lapse of time greater than zero, the answer is changed to affirmative. With the positive answer, the adjuster 324 compares the lapse of time TFD' with the lapse of time TCD' to see whether the lapse of time TCD' is greater than, equal to or less than the lapse of time TFD'. In case where the lapse of time TFD' is different from the lapse of time TCD', the adjuster 324 further checks the lapses of time TFD'/TCD' to see whether or not the difference DF therebetween is fallen within a predetermined margin MG. The adjuster 324 proceeds to different steps depending upon the answers as follows.

Case 1: TFD=TCD or |DF|<MG

The adjuster 324 sets the clock neither ahead nor back. The delta-time codes are intermittently supplied from the floppy disc FD to the delta-time register 316, and are accumulated in the register 328. When the total number N' of the tempo clocks CT reaches the accumulated total M, the transmission control 322 changes the enable signal and latch control signal to the active level. With the enable signal of the active level, the event code or codes are latched in the buffer of the data processing unit 310, and the delta time represented by the next delta-time code is accumulated in the accumulator 318.

Case 2: TCD'>TFD' and |DF|>MG

The performance reproduced through the automatic player piano 132 is delayed for the picture reproduced on the monitor display 112 by the difference DF. The adjuster 324 converts the time lug, i.e., difference DF to the number DN of tempo clocks CT by dividing the difference DF by the pulse period $\tau$. The product $(TCD'-TFD')/\tau$ is equivalent to the time delay. The adjuster 324 takes out the delta-time code from the delta-time register 316, and subtracts the number DN from the value ND of the delta-time code.

Subsequently, the adjuster 324 checks the calculation result to see whether or not the difference $\{ND-(TCD'-TFD')/\tau\}$ is a positive number. When the answer is given affirmative, the adjuster 324 writes the difference $\{ND-(TCD'-TFD')/\tau\}$ in the delta-time register 316. The time interval represented by the delta-time code is shortened. The adjuster 324 supplies the corrected delta-time code to the register 316 so that the corrected delta-time code represents the number of tempo clocks CT less than the previous number. When the corrected delta-time code is accumulated in the register 328, the transmission control 322 transmits the event code or codes D3 to the data processing unit 310 earlier than the previous schedule. This results in that the delay is canceled. Both of the performance and picture are synchronously reproduced through the automatic player piano 312 and the monitor display 112.

On the other hand, if the difference $\{ND-(TCD'-TFD')/\tau\}$ is a negative number, the answer is given negative. In this situation, the adjuster 324 divides the product $(TCD'-TFD')/\tau$ by a positive number $\alpha$, and subtracts the products $(TCD'-TFD')/\tau\alpha$ from the value of the delta-time code. If the positive number is 2, the difference is given as $\{ND-(TCD'-TFD')/2\tau\}$. The adjuster 324 checks the calculation result to see whether or not the difference is a positive number. When the answer is given affirmative, the adjuster 324 writes the difference $\{ND-(TCD'-TFD')/2\tau\}$ in the delta-time register 316, and keeps the other half, i.e., $(TCD'-TFD')/2\tau$ in an internal register (not shown). The adjuster 324 will subtract the other half from the value of the next delta time. Thus, the adjuster 324 stepwise takes up the time lug in order to make the reproduction of performance synchronous with the picture. If the difference $\{ND-(TCD'-TFD')/2\tau\}$ is still given negative, the adjuster 324 increases the divisor, and repeats the above-described sequence.

Case 3: TFD'>TCD' and |DF|>MG

In this situation, the performance reproduced through the automatic player piano 132 is advanced by the difference DF, i.e., TFD'-TCD' from the reproduction of the picture. The adjuster 324 firstly converts the time, i.e., difference DF to the number DN of tempo clocks CT by dividing the difference DF by the pulse period $\tau$. The product $(TFD'-TCD')/\tau$ is equivalent to the time by which the performance produced by the automatic player piano 132 is advanced. The adjuster 324 reads out the delta-time code from the delta-time register 316, and adds the number DN to the value ND of the delta-time code. The adjuster 324 writes the sum $\{ND+(TFD'-TCD')/\tau\}$ in the delta-time register 316. Thus, the time interval represented by the delta-time code is prolonged. The adjuster 324 supplies the corrected delta-time code to the register 316 so that the corrected delta-time code stored in the register 316 represents the number greater than the previous number. When the corrected delta-time code is accumulated in the register 328, the transmission control 322 retards the transmission of the event code or codes. This results in that the picture catches up the performance reproduced through the automatic player piano 132.

Figure 10:
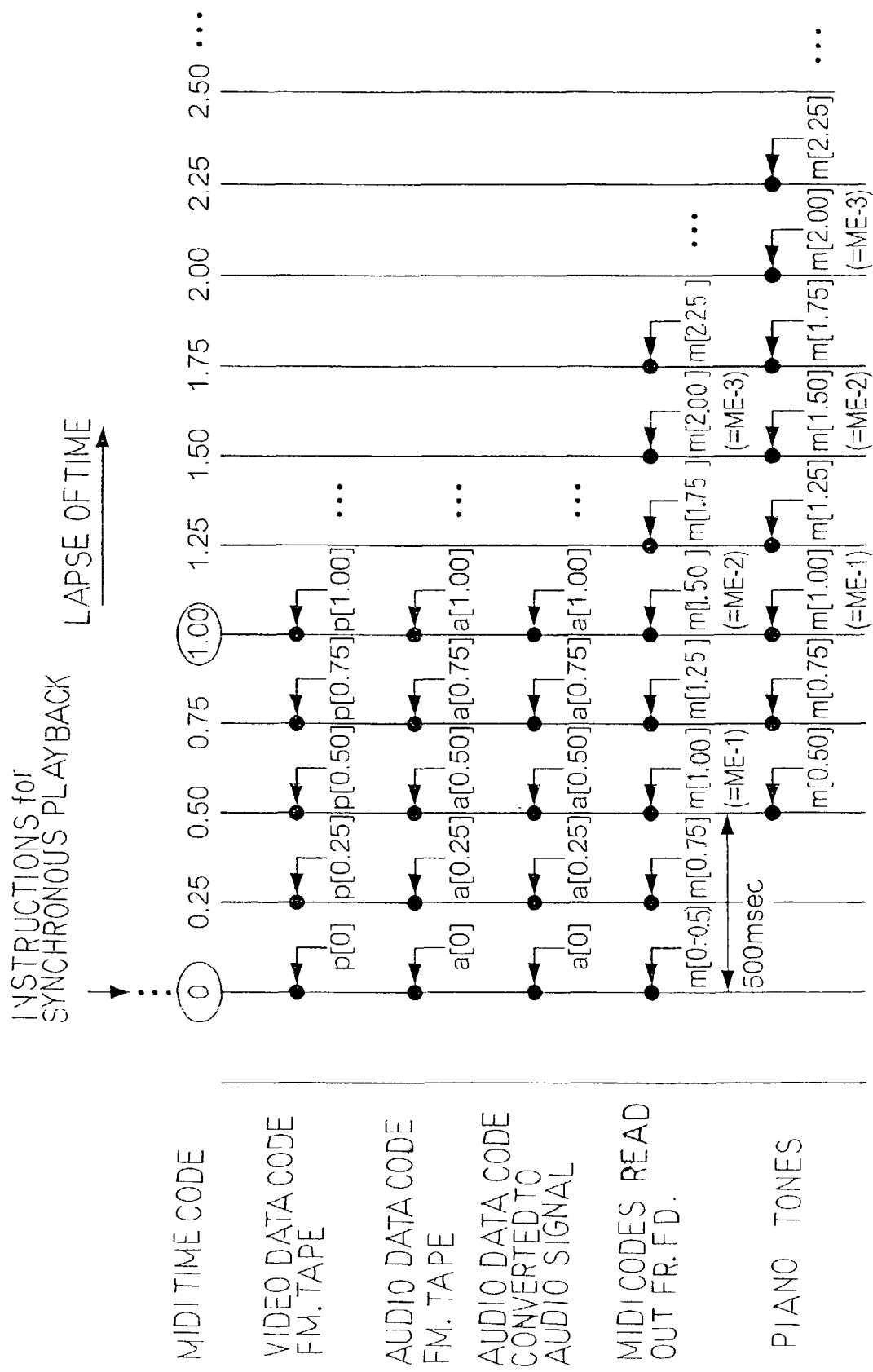
FIG. 10 is a timing chart showing a synchronous playback.

FIG. 10 shows a synchronous playback. The MIDI time codes express the lapse of time from the initiation of playback of a picture, and is assigned the first row. [k] is indicative of the lapse of time, and is incremented by 0.25 millisecond Although the video time-codes are usually incremented by 1/30 second, the video time codes shown in FIG. 10 is incremented by 0.25 second for the sake of simplicity. For example, [0.25] is indicative of the lapse of time 0.25 milliseconds after the initiation of the playback. The video data codes, which are read out from the videotape cassette VT, are assigned the second row. The video data codes are expressed as "p[k]". The video data codes p[k] are read out from the videotape cassette VT from time [k] to time [k+1]. The video data codes p[0.25] are read out from [0.25] to [0.50].

The audio data codes, which are also read out from the videotape cassette VT, are assigned the third row. The audio data codes are expressed as "a[k]". The audio data codes a[k] are read out from the videotape cassette VT from time [k] to [k+1]. The audio data codes a[k] are supplied to the data processing unit 310, and the data processing unit 310 converts the audio data codes a[k] to the audio signal. The audio signal is supplied to the sound system 106, and the electronic tones are radiated from the speakers 164. The fourth row is assigned the audio data codes a[k] converted to the audio signal. Any substantial amount of time delay is not introduced in the conversion from the audio data codes a[k] to the audio signal so that the audio data codes a[k] converted to the audio signal are put on the vertical lines indicative of the lapse of time [k] together with the corresponding audio data codes a[k] read out from the videotape cassette VT.

The MIDI data codes, which are read out from the floppy disc FD, are assigned the fifth row, and are expressed as m[k]. The MIDI data codes m[k] are read out from the floppy disc FD from [k] to [k+1]. Although the players 116 and 308 concurrently start, the MIDI data codes m[k+0.5] are put on the vertical lines together with the corresponding video data codes p[k] and audio data codes a[k]. The MIDI data codes are broken down into the event codes and delta-time codes, and the first three event codes representative of the note-on are abbreviated as "ME-1", "ME-2" and "ME-3". Nevertheless, the delta-time codes between [0] and [0.50] have been already accumulated in the register 328, and the initial value "500/$\tau$" is written in the register 332 immediately after [0]. The disc player 308 starts to transfer the event codes to the data processing unit 310 at the position 500 milliseconds later than the initiation of the read-out from the floppy disc FD. For this reason, the MIDI data codes m[0.50] are transferred to the data processing unit 310 between [0] and [0.25]

The event codes ME-1, ME-2 and ME-3 are read out from the floppy disc FD at [0.5], [1.00] and [1.50], and are transferred to the data processing unit 310. However, 500 milliseconds are consumed between the delivery to the MIDI controller 150 and the generation of the acoustic piano tones. For this reason, the acoustic piano tones are generated at [1.00], [1.50] and [2.00] on the basis of the event codes ME-1, ME-2 and ME-3 as shown in the sixth row. The acoustic tone on the basis of the event codes ME-1 is generated synchronously with the scene represented by the video data codes p[1.00] and electronic tones represented by the audio data codes a[1.00]. (See the vertical line indicative of [1.00])

A user is assumed to instruct the controller 304 for the synchronous playback. The data processing unit 310 gives the pause instruction to the disc player 308 so that the disc player 308 enters the idling state. The player 116 reads out the videotape identification V-ID code from the videotape cassette VT, and transfers the videotape identification code V-ID through the data processing unit 310 to the disc player 308. The disc player 308 reads out the videotape identification code V-ID from the header chunk HT of the standard MIDI file SMF, and compares the read-out videotape identification code V-ID with the videotape identification code V-ID supplied from the player 116 to see whether or not they are consistent with each other. If the videotape identification codes V-ID are identical with each other, the disc player 308 reports the judgement to the data processing unit 310, and the data processing unit 310 notifies the user of the judgement through the display window on the manipulating panel 130.

When the user instructs the player 116 to read out the video/audio/video time codes from the videotape cassette VT through the manipulating panel 118, the player starts to read out the video data codes, audio data codes and video time codes from the videotape cassette VT. The player 116 supplies the video time code representative of zero to the code converter 126, and the converter 126 supplies the MIDI time code [0] to the data processing unit 310. The data processing unit 310 supplies the control signal representative of the initiation of synchronous playback to the disc player 308. When the disc player 308 receives the control signal, the disc player 308 resets the register 328 to zero, writes the initial value "500/τ" into the register 332, and starts to successively distribute the event codes and delta-time codes to the event buffer 314 and delta-time register 316 without any wait. The delta-time codes are successively accumulated in the register 328 without any wait until the accumulated total reaches "500/τ". The disc player 308 immediately completes those jobs so that the MIDI data codes [0.5] are read out from the floppy disc FD substantially concurrently with the distribution of the video data codes and analog audio signal to the monitor display 112 and sound system 106.

The disc player 308 intermittently reads out the event codes and delta-time codes from the floppy disc FD from m[0.50], and transfers the event codes through the data processing unit 310 to the MIDI controller 150 when the number N' of tempo clock CT reaches the accumulated total M. The adjuster 324 periodically corrects the value of the delta-time codes upon reception of the MIDI time code [k].

The first event code ME-1 representative of the note-on is incorporated in the MIDI data codes m[1.00], and the MIDI data codes m[1.00] are transferred to the data processing unit 310 at [0.50]. However, the automatic player piano 132 consumes 500 milliseconds from the reception of the event code ME-1 to the generation of the acoustic piano tone. For this reason, the acoustic piano tone represented by the event code ME-1 is generated at [1.00]. The MIDI data codes m[1.00] are scheduled to realize at [1.00] together with the video data codes p[1.00] and audio data codes a[1.00]. When the player 116 reads out the video data codes p[1.00] and audio data codes a[1.00], the player immediately transfers the video data codes p[1.00] and audio data codes a[1.00] to the monitor display 112 and the sound system 106, and the monitor display 112 and sound system 106 reproduces the visual images and electronic tones from the video data codes p[1.00] and audio data codes a[1.00] at [1.00]. Similarly, the event codes ME-2 and ME-3 are incorporated in the MIDI data codes m[1.50] and m[2.00], and the acoustic tones are generated at [1.50] and [2.00] synchronously with the visual images p[1.50] and p[2.00] and electronic tones a[1.50] and a[2.00]. Thus, the acoustic piano tones are generated synchronously with the picture, i.e., the series of visual images and electronic tones.

As will be understood from the foregoing description, the multimedia platform 300 reproduces the acoustic tones synchronously with the picture and electronic tones.

In the third embodiment, the disc player 308 serves as the first data source 20, the video camera 102 and controller 304 as a whole constitute the second data source 22, the monitor display 112 is corresponding to the image generator 24, the automatic player piano 132 and tone generator for ensemble 134 as a whole constitute the sound generator 26, and the controller 312 serves as the timing controller 28.

Fourth Embodiment

Figure 11:
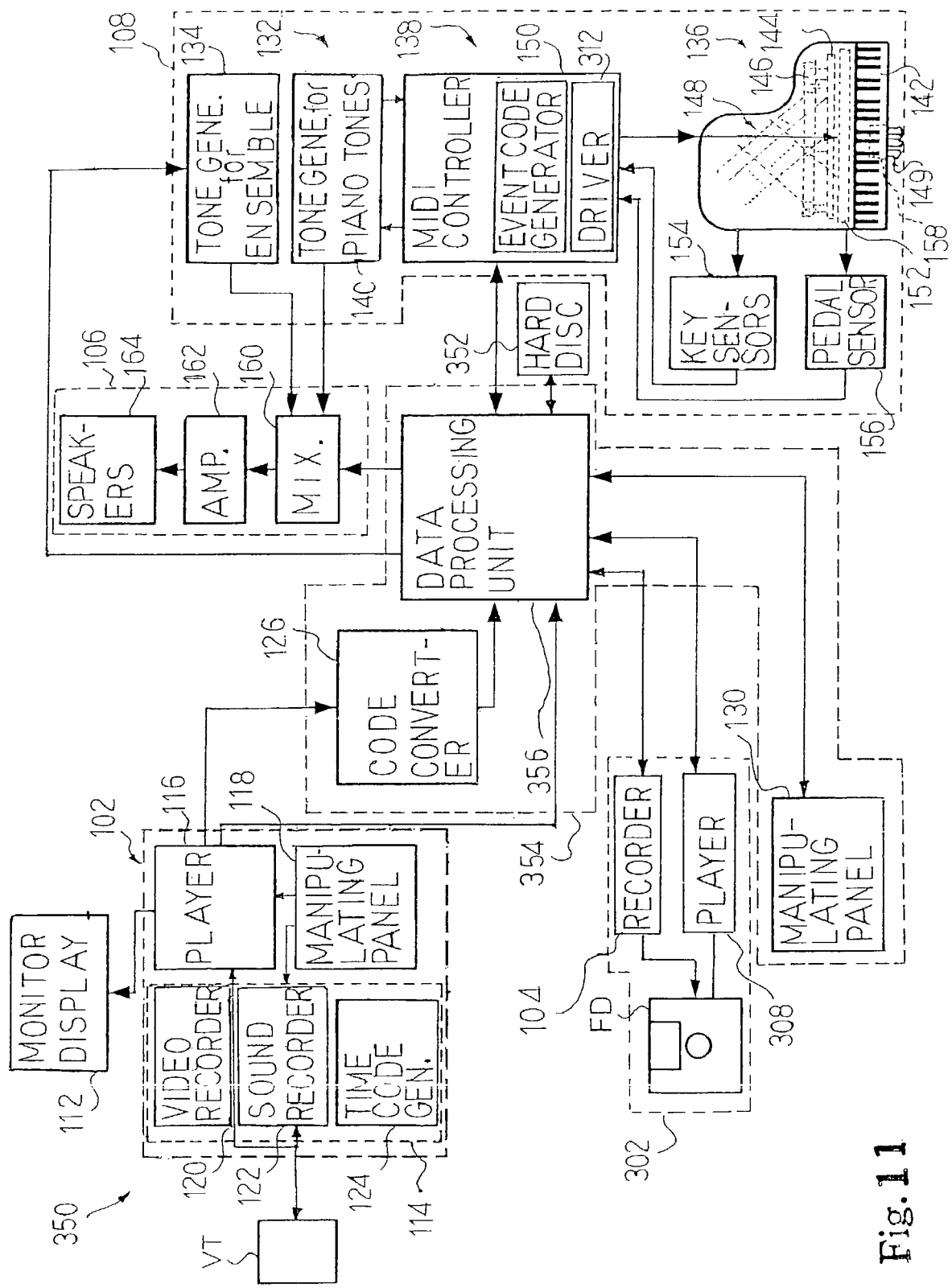
FIG. 11 is a block diagram showing the system configuration of another multimedia platform according to the present invention.

FIG. 11 shows still another multimedia platform 350 embodying the present invention. The multimedia platform 350 is similar to the multimedia platform 300 except a hard disc unit 352 and a controller 354. For this reason, other system components of the multimedia platform 350 are labeled with reference numerals designating corresponding system components of the multimedia platform 300 without detailed description for the sake of simplicity. The hard disc unit 352 may be replaced with another sort of memory device such as, for example, a random access memory.

The multimedia platform 350 is available for the synchronous recording and synchronous playback as similar to the multimedia platform 300. The controller 354 adjusts the pitches of the electronic tones to those of the corresponding acoustic piano tones through execution of a computer program. In detail, the electronic tone produced on the basis of the audio data code is assumed to have the standard pitch of 443 Hz, i.e., the pitch of A. If the acoustic piano 136 is tuned to have the standard pitch of 448 Hz, the electronic tones are never harmonized with the acoustic piano tones. In order to make the electronic tones harmonized with the acoustic piano tones, the controller 354 controls the pitches of the electronic tones so that the electronic tones are well harmonized with the acoustic piano tones in ensemble.

In order to control the pitches of the electronic tones, the audio data codes are read out from the videotape cassette VT, and the data processing unit 356 writes the audio data codes in the hard disc unit 352. As a result, the audio data codes are read out from the hard disc unit 352 independently of the video data codes read out from the videotape cassette VT.

Figure 12:
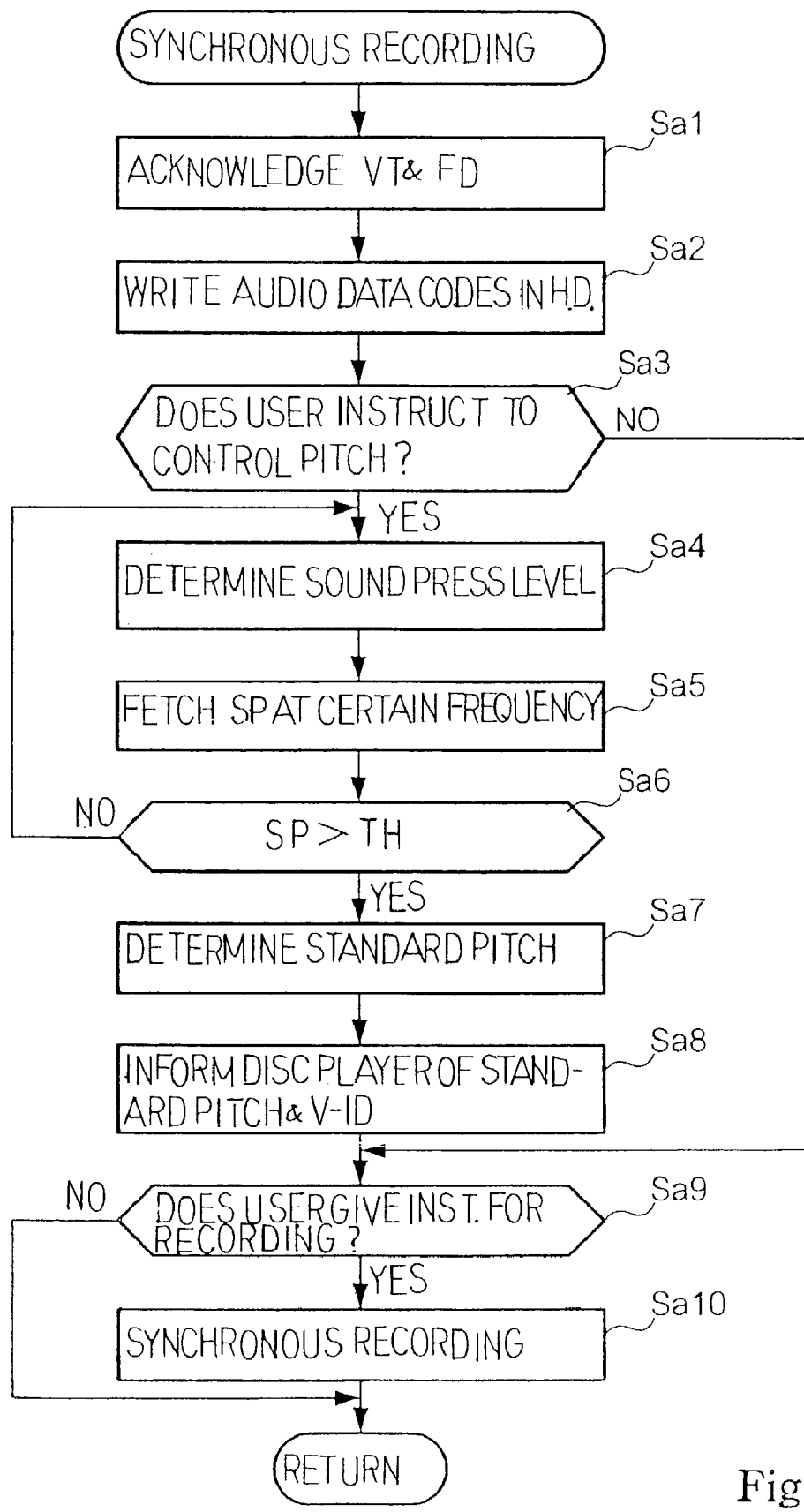
FIG. 12 is a flowchart showing a computer program for controlling the pitch of electronic tones in a synchronous recording.

FIG. 12 shows a computer program for controlling the pitch of the electronic tones in the synchronous recording. A user is assumed to instruct the controller 354 on the condition that the pitches of the electronic tones are to be controlled for harmonization after loading a videotape cassette VT and floppy disc FD into the video camera 102 and disc recorder 104.

The data processing unit 356 acknowledges the videotape cassette VT and floppy disc FD loaded into the video camera 102 and disc recorder 104 as by step Sa1, and instructs the player 116 to transfer the audio data codes from the videotape cassette VT thereto. The data processing unit 356 receives the audio data codes, and writes them into the hard disc unit 352 as by step Sa2.

Subsequently, the data processing unit 356 checks the manipulating panel 130 to see whether or not the user has instructed the pitch control as by step Sa3. If the user has not instructed the data processing unit 356 for the pitch control, the answer is given negative "NO", and the data processing unit 356 proceeds to step Sa9. Jobs at step Sa9 will be described hereinlater. On the other hand, if the user has already instructed the data processing unit 356 for the pitch control, the answer is given affirmative "YES", and the data processing unit 356 repeats the loop consisting of steps Sa4, Sa5 and Sa6 for the standard pitch of the electronic tone.

Figure 13:
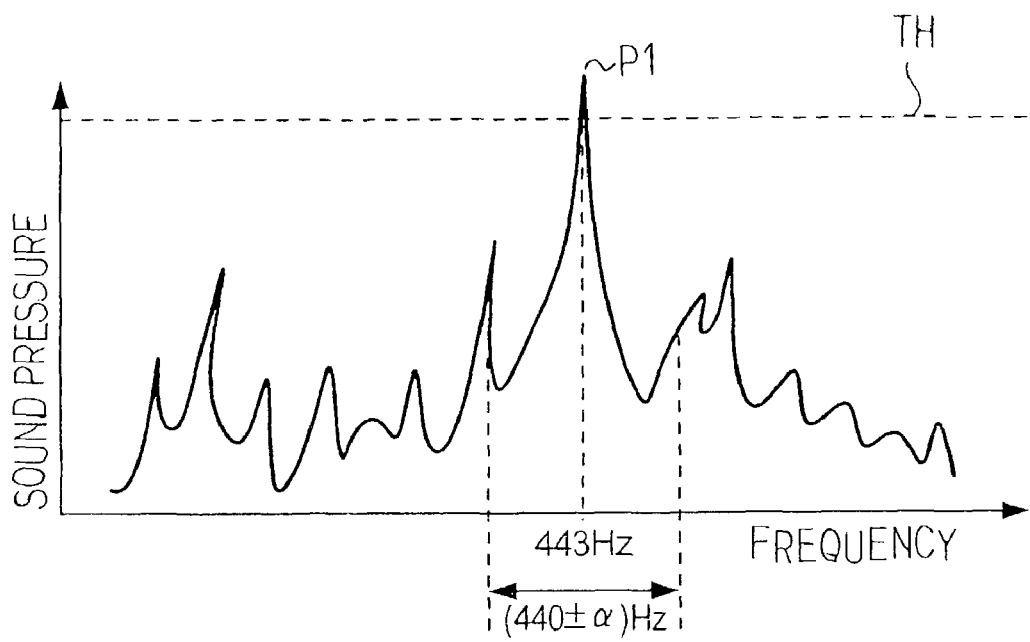
FIG. 13 is a graph showing the waveform of an electric signal representative of a sound pressure level.

The data processing unit 356 reads out the audio data codes from the hard disc unit 352, and determines the sound pressure level for each frequency through a fast Fourier transformation as by step Sa4. FIG. 13 shows the waveform of an electric signal representative of sound pressure, which is determined on the basis of the audio data code. The waveform has multiple peaks. However, the standard pitch of the electronic tone is to be close to the standard pitch of the acoustic piano tone. For this reason, the data processing unit may pass the electric signal through a band pass filter for focusing the analysis on the target band (440 Hz±α).

Subsequently, the data processing unit 356 selects a certain frequency, and fetches a piece of data information representative of the sound pressure SP at the certain frequency as by step Sa5. The data processing unit 356 compares the sound pressure SP at the certain frequency with a threshold TH to see whether or not the sound pressure at the certain frequency exceeds the threshold as by step Sa6. If the sound pressure SP is less than the threshold TH, the answer is given negative "NO". Then, the data processing unit 356 changes the target frequency, and returns to step Sa4. Thus, the data processing unit 356 changes the target frequency, and reiterates the loop consisting of steps Sa4 to Sa6 until the answer at step Sa6 is changed to affirmative.

When the data processing unit 356 find the peak P1 (see FIG. 13), the answer is changed to affirmative "YES", and the data processing unit 356 determines that the certain frequency is the standard pitch as by step Sa7. In the example shown in FIG. 13, the standard pitch is 443 Hz.

Figure 14:
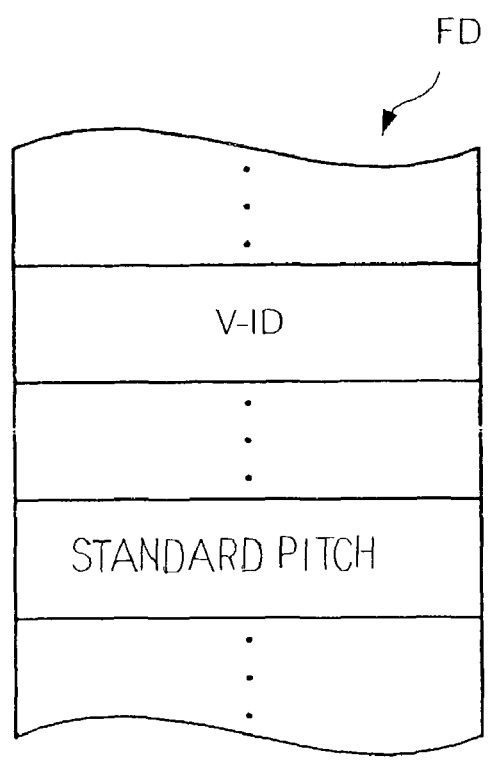
FIG. 14 is a view showing memory locations of a floppy disc for storing a videotape identification code and a standard pitch.

Subsequently, the data processing unit 356 acquires the videotape identification code V-ID from the video cassette VT through the player 116, and informs the disc player 308 of the standard pitch and videotape identification code V-ID as by step Sa8. The disc player 308 stores the data code representative of the standard pitch and videotape identification code V-ID in the floppy disc FD as shown in FIG. 14. In case where the standard MIDI file SMF is to be created in the floppy disc FD, the data code representative of the standard pitch and videotape identification code V-ID are stored in the header chunk HT.

The data processing unit 356 checks the manipulating panel 130 to see whether or not the user has instructed the controller 354 for the synchronous recording as by step Sa9. If the answer at step Sa9 is given negative "NO", the data processing unit 356 returns to the main routine. On the other hand, when the answer is given affirmative "YES", the data processing unit 356 informs the user that the multimedia platform 350 gets ready for the synchronous recording, and instructs the disc recorder 104 to record the performance on the keyboard 142 synchronously with the picture on the monitor display 112 as by step Sa10. Upon completion of the performance, the user instructs the data processing unit 356 to terminate the synchronous recording, and the data processing unit 356 returns to the main routine.

Figure 15:
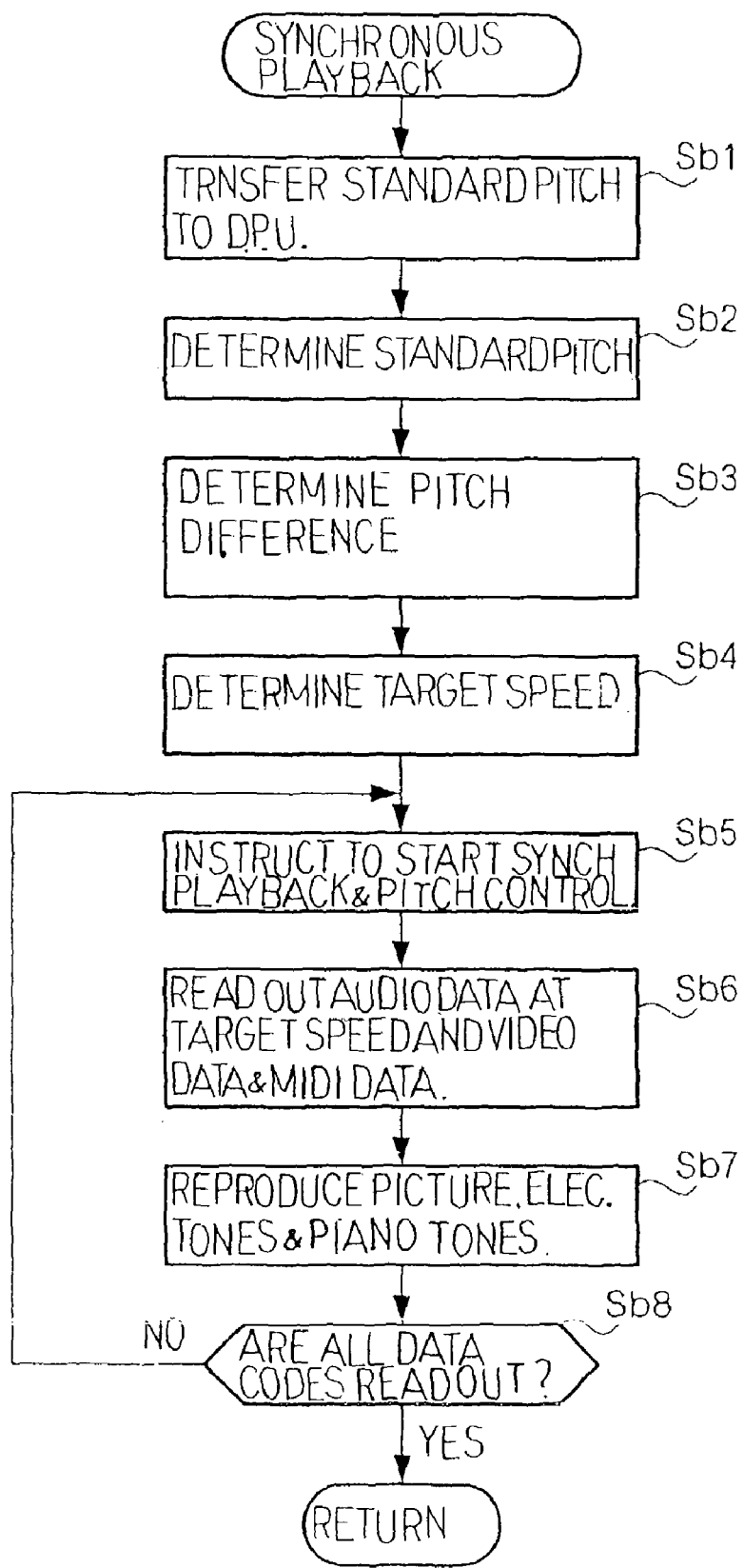
FIG. 15 is a flowchart showing a computer program for a synchronous playback.

The user is assumed to instruct the controller 354 for reproducing the performance synchronously with the picture and electronic tones. The data processing unit 354 enters a computer program shown in FIG. 15. First, the data processing unit 356 requests the disc player 308 to transfer the event code representative of the standard pitch from the floppy disc FD thereto as by step Sb1. Subsequently, the data processing unit 356 instructs the manipulating panel 130 to produce a massage such as "Please depress the white key A" on the display window, and waits for the user's response. When the user depresses the white key A, the hammer 146 strikes the string 148, and the tone A is generated from the vibrating string 148. A microphone (not shown) picks up the tone A, and supplies the electric signal to the data processing unit 356. The data processing unit analyzes the digital codes, which were converted from the electric signal, and determines the standard pitch as by step Sb2. In this instance, the standard pitch for the piano tones is assumed to be 448 Hz. The data processing unit 356 may measure the sound pressure level in a certain band through the fast Fourier transformation, and checks the sound pressure to see what frequency has the sound pressure level over a threshold. When the data processing unit 356 finds the sound pressure level at a certain frequency to exceed the threshold, the data processing unit 356 determines that the certain frequency is the standard pitch at the piano tone "A".

Subsequently, the data processing unit 356 calculates the difference between the standard pitch of the electronic tone "A" and the standard pitch of the piano tone "A", and determines a pitch difference as by step Sb3. In this instance, the standard pitch of the piano tone "A" is 448 Hz, and the standard pitch of the electronic tone "A" is 443 Hz so that the pitch difference is 5 Hz. The electronic tones are to be increased in pitch by 5 Hz. Then, the data processing unit 356 determines a target speed for reading out the audio data codes from the hard disc unit 352 as by step Sb4. The data read-out speed deeply concerns the pitch of tones as follows.

Figure 16A:
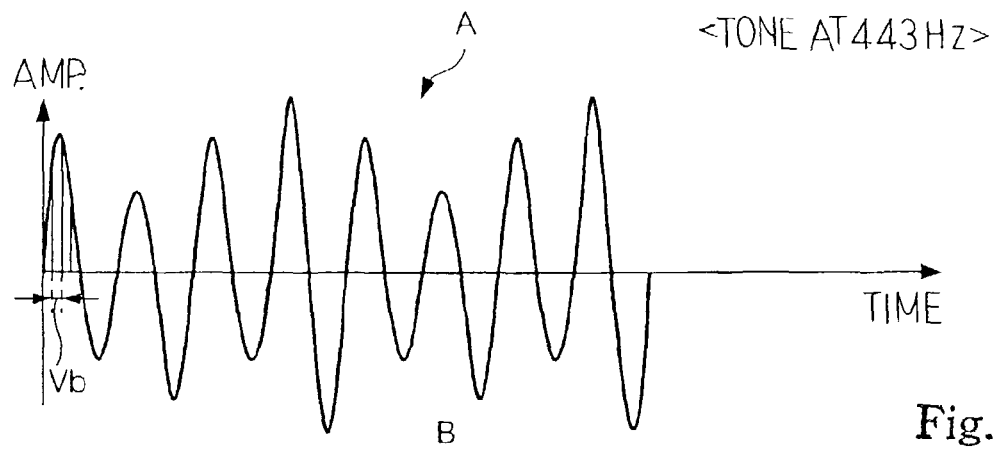
FIGS. 16A to 16C are graphs showing relation between a read-out speed and the pitch of electronic tones.
Figure 16B:
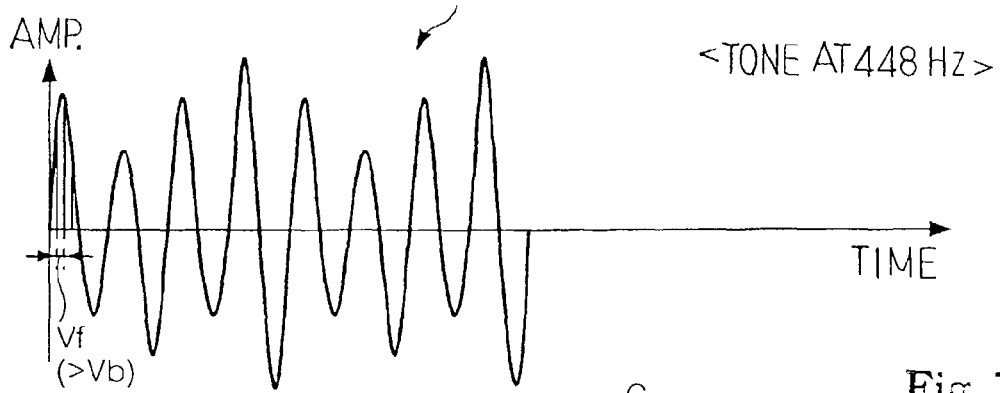
Figure 16C:
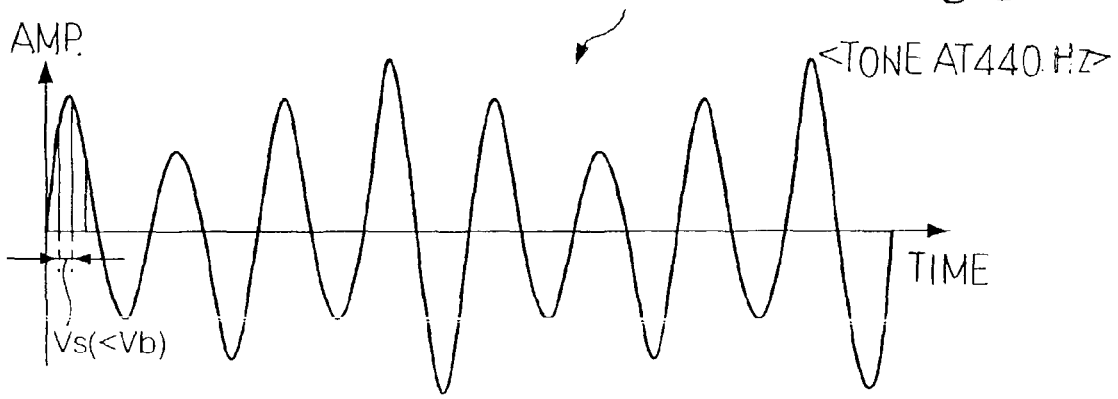

FIGS. 16A to 16C show the relation between the target speed for reading out the audio data codes and the pitch of the electronic tones. Even though the audio data codes are not changed, the waveform of the audio signal representative of the electronic tone is varied depending upon the target speed for reading out the audio data codes from the hard disc unit 352. When the audio data codes are read out from the hard disc unit 352 at the standard read-out speed Vb, the audio signal has a waveform A shown in FIG. 16A. If the data read-out is accelerated, i.e., Vf>Vb, the waveform A is shrunk, and the audio signal has the waveform B as shown in FIG. 16B. Accordingly, the tone is sharp pitched. The pitch is increased to 448 Hz. On the other hand, in case where the read-out speed is lowered, i.e., Vs<Vb, the waveform A is expanded, and the audio signal has the waveform C as shown in FIG. 16C. Accordingly, the pitch of the tone is lowered to 440 Hz.

In this instance, the pitch of the electronic tone is lower than the pitch of the acoustic piano tone by 5 Hz. The data processing unit 356 instructs the hard disc unit 352 to increase the data read-out speed. If, on the contrary, the pitch of the second electronic tones is higher than the pitch of the acoustic piano tones, the data processing unit 356 instructs the hard disc unit 352 to decrease the data read-out speed.

When the target speed is determined, the data processing unit 356 instructs the hard disc unit 352, player 116 and disc player 308 to start the synchronous playback under the pitch control as by step Sb5. The player 116 reads out the video data codes and video time codes from the videotape cassette VT, the disc player 308 reads out the delta-time codes and event codes from the floppy disc FD, and the hard disc 352 reads out the audio data codes from the hard disc at the target speed as by step Sb6. The video data codes, video time codes and audio data codes are supplied to the monitor display 112, code converter 126 and the data processing unit 356, respectively. The monitor display 112 reproduces a picture on the screen. The video time codes are converted to the MIDI time codes, and the data processing unit 356 transfers the MIDI time codes to the disc player 308 for controlling the timing to transfer the event codes through the data processing unit 356 to the MIDI controller 150 as similar to those of the third embodiment. The automatic player piano 132 produces the acoustic piano tones synchronously with the picture. The data processing unit 356 converts the audio data codes to the audio signal, and supplies the audio signal to the sound system 106 for producing the electronic tones. Since the audio data codes are read out at the target speed, the electronic tones are well harmonized with the acoustic piano tones. Thus, the picture, acoustic piano tones and electronic tones are reproduced as by step Sb7.

Subsequently, the data processing unit 356 checks the videotape cassette VT, hard disc unit 352 and floppy disc FD to see whether or not all the data codes have been already read out therefrom as by step Sb8. While the answer at step Sb8 is given negative "NO", the data processing unit 356 returns to step Sb5, and reiterates the loop consisting of steps Sb5 to Sb8 until the answer at step Sb8 is changed to affirmative. When the last video data/video time/audio data/MIDI data codes are read out from the videotape cassette VT, hard disc 352 and floppy disc FD, the answer at step Sb8 is changed to affirmative, and the data processing unit 356 returns to the main routine.

As will be understood from the foregoing description, the multimedia platform 350 implementing the fourth embodiment achieves the pitch control between the electronic tones and the acoustic piano tones as well as the synchronous playback. As a result, the electronic tones are well harmonized with the acoustic piano tones.

Fifth Embodiment

Figure 17:
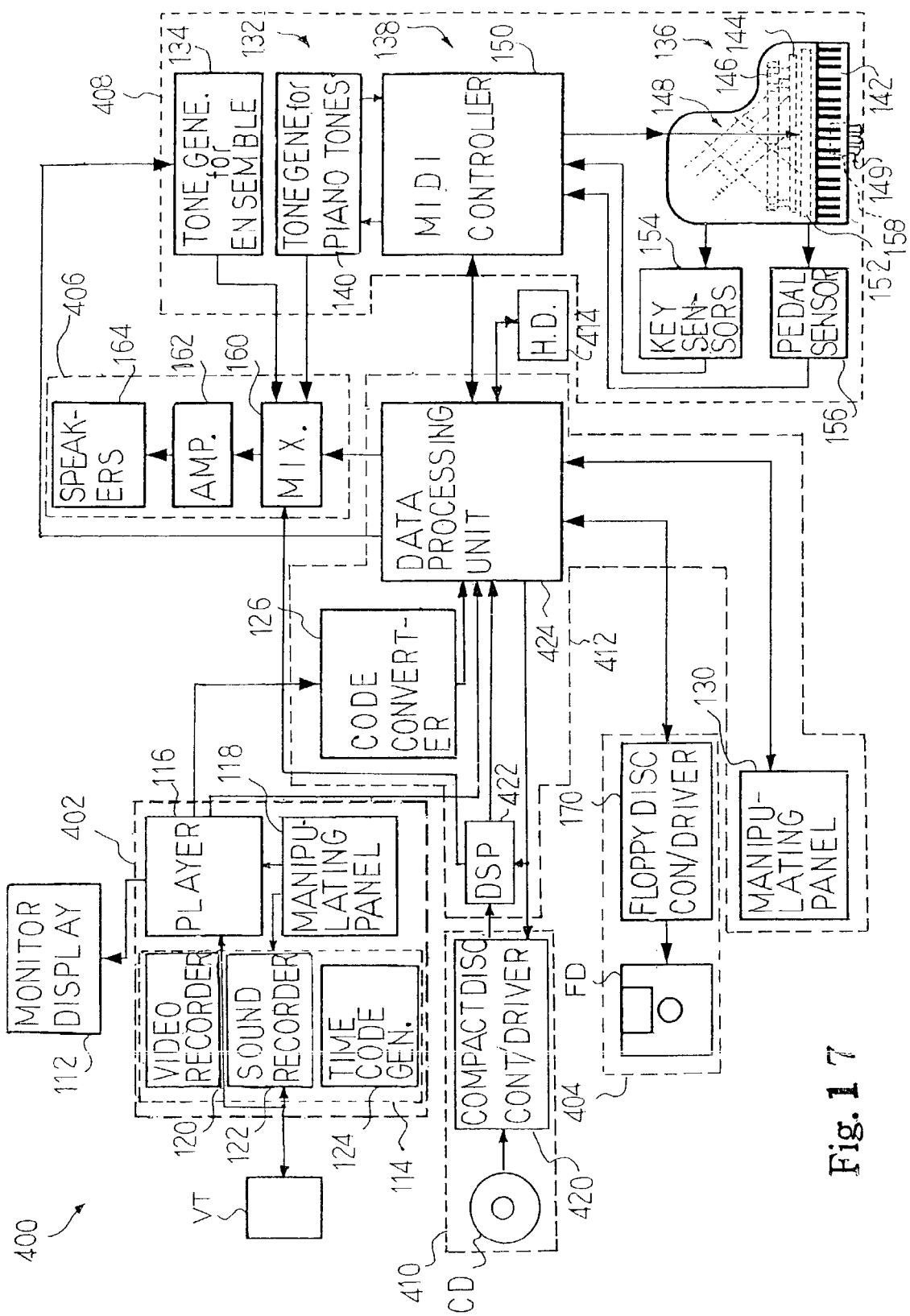
FIG. 17 is a block diagram showing the system configuration of another multimedia platform according to the present invention.

Turning to FIG. 17, a multimedia platform 400 embodying the present invention largely comprises a video camera 402, a floppy disc recorder 404, a sound system 406, a sound source 408, a compact disc player 410, a controller 412 and a hard disc unit 414. The multimedia platform 400 records MIDI data codes representative of user's performance synchronously with reproduction of picture and electronic tones on the basis of audio data codes stored in a videotape cassette VT and further with reproduction of electronic tones on the basis of a compact disc CD. In the following description, the audio data codes stored in the videotape cassette VT are referred to as "tape-stored audio data codes", and the electronic tones produced from the tape-stored audio data codes are referred to as "first electronic tones". On the contrary, the audio data codes stored in the compact disc CD are referred to as "disc-stored audio data codes", and the electronic tones produced from the disc-stored audio data codes are referred to as "second electronic tones".

The video camera 402, floppy disc recorder 404, sound system 406 and sound source 408 are similar to the video camera 102, disc recorder 104, sound system 106 and sound source 108 incorporated in the multimedia platform 100. For this reason, the components thereof are labeled with references designating corresponding components of the video camera 102, disc recorder 104, sound system 106 and sound source 108 without detailed description for the sake of simplicity.

The compact disc player 410 includes a compact disc controller/driver 420, and the controller 412 includes a digital signal processor 422 and a data processing unit 424. The compact disc controller/driver 420 is connected to the digital signal processor 422 as well as the data processing unit 424. The digital signal processor 422 in turn is connected to the data processing unit 424 and the mixer 160. The hard disc unit 414 is connected to the data processing unit 424 as similar to that of the fourth embodiment. The data processing unit 424 supplies a control signal to the compact disc controller/driver 420 for transferring user's instructions, and the compact disc controller/driver 420 reads out the disc-stored audio data codes from a compact disc CD. The compact disc controller/driver 420 supplies the disc-stored audio data codes to the digital signal processor 422, and the digital signal processor 422 selectively supplies the disc-stored audio data codes or an analog audio signal to the data processing unit 424 or the mixer 160.

In case where the user instructs the controller 412 to reproduce a piece of music from the disc-stored audio data codes without the synchronization with a picture, first electronic tones and acoustic piano tones, the digital signal processor 422 produces the analog audio signal from the disc-stored audio data codes, and supplies the analog audio signal to the mixer 160. The analog audio signal is amplified, and, thereafter, is converted to the second electronic tones through the speakers 164. On the other hand, when the user instructs the controller 412 to reproduce a piece of music from the disc-stored audio data codes synchronously with the picture, first electronic tones and acoustic piano tones, the compact disc controller/driver 420 transfers the disc-stored audio data codes through the digital signal processor 422 to the data processing unit 424, and the data processing unit 424 writes the disc-stored audio data codes in the hard disc unit 414 prior to the synchronous playback. The synchronous playback will be hereinlater described in detail.

Figure 18:
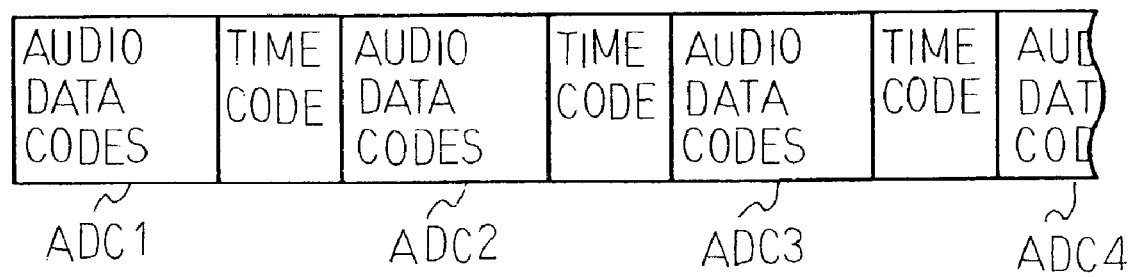
FIG. 18 is a view showing the arrangement of data codes stored in a compact disc.

Although compact discs are capable of storing various sorts of data codes, the disc-stored audio data codes deeply concern the multimedia platform 400 according to the present invention. In the standard compact discs CD for music use, audio data codes ADC1/ADC2 ADC3/ADC4 are stored in the recording area for the right and left channels, and time codes representative of a lapse of time from the initiation of playback are inserted into the audio data codes ADC1/ADC2 ADC3/ADC4 as shown in FIG. 18. The standard compact disc CD for the music use further contains a table of contents, and a disc identification code C-ID assigned to the compact disc CD and music identification codes representative of the titles of musical compositions. In order to discriminate the time codes stored in the compact disc from the time codes stored in the videotape cassette VT, the audio data codes stored in the compact discs CD and the audio data codes stored in the videotape cassette VT are hereinafter referred to as "audio time codes" and "video time codes", respectively. Another sort of compact discs is shared between the audio data codes and MIDI data codes. The audio data codes and MIDI data codes may be stored in the recording area for the right channel and left channel or vice versa.

The controller 412 controls the other system components 402/404/406/408/414 for the synchronous recording and synchronous playback. In this instance, the floppy disc recorder 404 records a performance on the keyboard 142 synchronously with reproduction of a picture, first electronic tones and second electronic tones. Prior to the synchronous recording, the disc-stored audio data codes are transferred from the compact disc CD to the hard disc unit 414. While the player 116 is reading out the video data codes and video audio data codes from the videotape cassette VT, the player 116 further reads out the video time codes from the videotape cassette VT, and transfers the video time codes to the code converter 126. The code converter 126 converts the video time codes to the MIDI time codes, and supplies the MIDI time codes to the data processing unit 424. The data processing unit 424 supplies the MIDI time codes to the floppy disc controller/driver 170 so as to produce the delta-time codes without any time lug between the lapse of time from the initiation of playback and the lapse of time from the initiation of recording. The data processing unit 424 further controls the data read-out from the hard disc unit 414 on the basis of the MIDI time codes, and converts the disc-stored audio data codes to the analog audio signal. The data processing unit 424 transfers event codes from the MIDI controller 150 to the floppy disc controller/driver 170. Another task assigned to the data processing unit 424 is to supply an audio signal converted from the video audio data codes.

Figure 19:
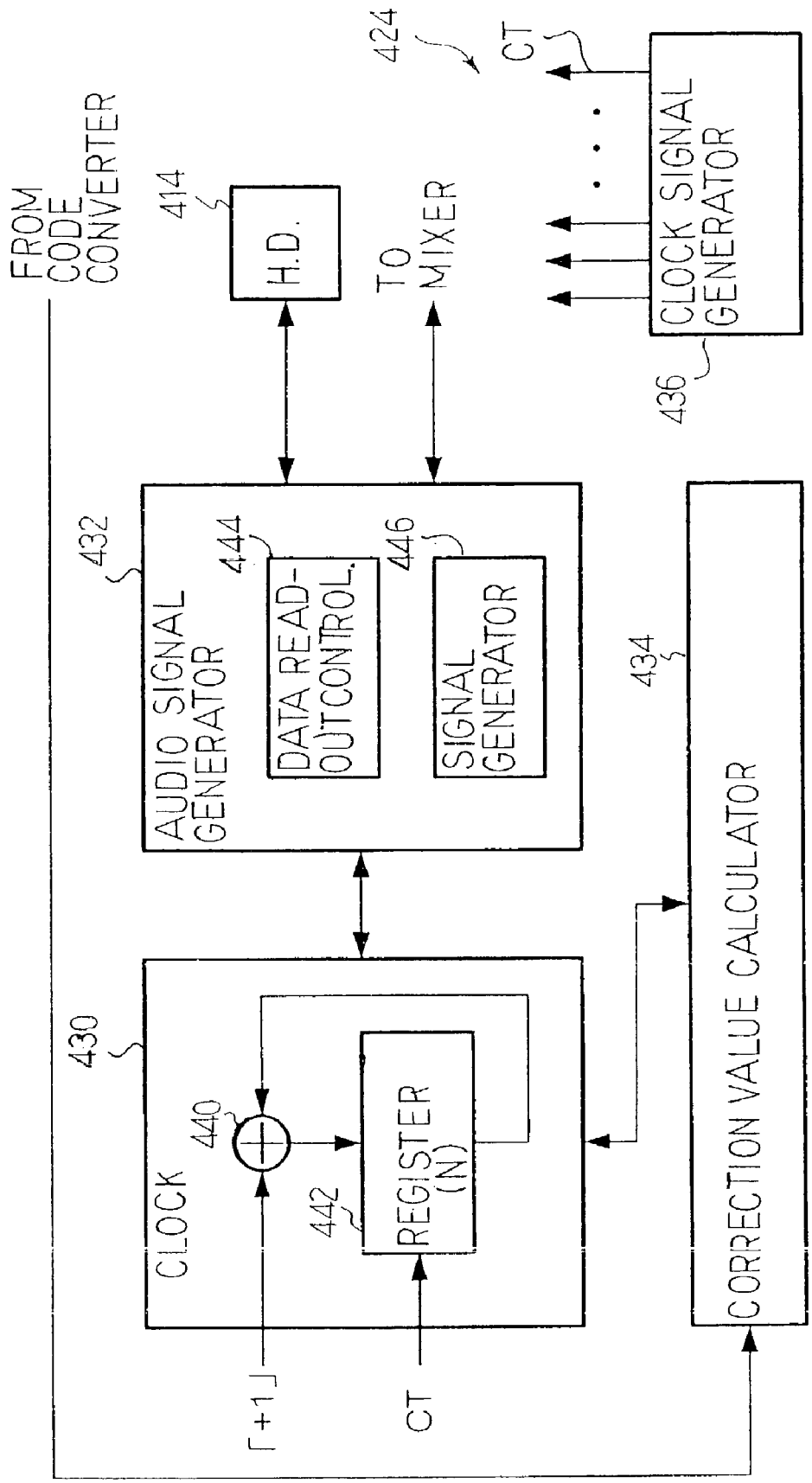
FIG. 19 is a block diagram showing means incorporated in a data processing unit incorporated in the multimedia platform.

FIG. 19 shows means realized by the data processing unit 424 in conjunction with the data read-out from the hard disc unit 414. The means are corresponding to a clock 430, an audio signal generator 432, a correction value calculator 434 and a clock signal generator 436. The clock signal generator 436 includes an oscillator implemented by the combination of a quartz oscillating element and an amplifier (not shown) and a frequency divider (not shown). The oscillator supplies a periodical signal to the frequency divider, and the frequency divider outputs clock signals different in frequency from one another. One of the clock signals is called as "tempo clocks CT", and the tempo clocks CT is used for the MIDI data codes. The tempo clocks CT are supplied to the clock 430, and the clock 430 defines the lapse of time as the number N of the tempo clocks.

The clock 430 includes an adder 440 and a register 442. The adder 440 has two input ports and one output port. The input ports are connected to a source of constant value [+1] and the output port of the register 442, and the output port of the adder 440 is connected to the input port of the register 442. When the user instructs the controller 412 to start the synchronous playback, the register 442 is reset to zero. The register 442 is responsive to the tempo clock CT so as to store the total number N of tempo clocks at the output port of the adder 440, and the adder increments the total number N by one. Thus, the adder 440 and register 442 form in combination an accumulating loop for accumulating the number N of tempo clocks CT after the initiation of the synchronous playback.

The correction value calculator 434 is connected to the clock 430, and the MIDI time codes periodically reaches the correction value calculator 434. Upon arrival of the MIDI time code, the correction value calculator, 434 checks the register 442 to see whether or not any time difference takes place between the lapse of time stored in the clock 430 and the lapse of time indicated by the MIDI time code. If the time difference is serious, the correction value calculator 434 rewrites the total number N for regulating the clock 430 by the MIDI time codes.

Figure 20:
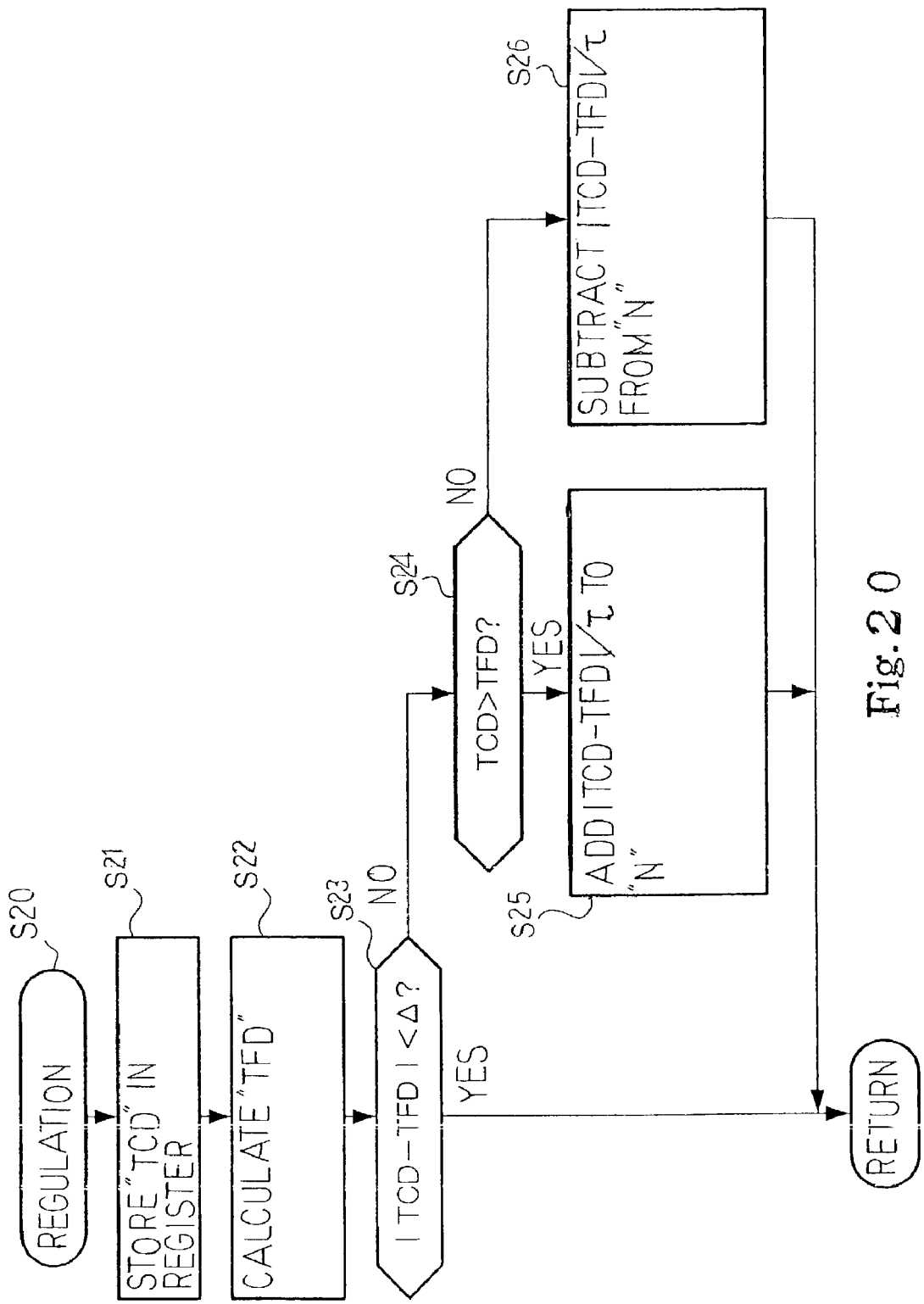
FIG. 20 is a flow chart showing a method for regulating a clock with MIDI time codes.

FIG. 20 shows a method for regulating the clock 430 by the MIDI time codes. A MIDI time code is assumed to reach the correction value calculator 434. The correction value calculator 434 enters a subroutine program at step S20, and stores the MIDI time code in an internal register (not shown). The MIDI time code represents the lapse of time TCD from initiation of the synchronous playback as by step S21.

Subsequently, the correction value calculator 434 reads out the number N of tempo clocks CT from the register 442, and converts the number N to a lapse of time TFD as by step S22. The tempo clocks CT have a pulse period τ, and the lapse of time TFD is given as (N×τ).

The correction value calculator 434 determines the absolute value of the difference between the lapse of time TCD and the lapse of time TFD, and compares the absolute value |TCD−TFD| with a margin Δ to see whether or not the absolute value |TCD−TFD| is less than the margin Δ as by step S23. When the absolute value |TCD−TFD| is less than the margin Δ, the answer at step S23 is given affirmative "YES", and the correction value calculator 434 return to the main routine program.

On the other hand, the absolute value |TCD−TFD| is greater than the margin Δ, the answer at step S23 is given negative "NO", and the correction value calculator 434 checks the lapses of time TCD and TFD to see whether the clock 430 is delayed for the MIDI time code as by step S24.

The clock 430 is assumed to be delayed for the MIDI time code. The lapse of time TCD is greater than the lapse of time TFD, and the answer at step S24 is given affirmative "YES". Then, the correction value calculator 434 divides the difference TCD−TFD by the pulse period τ, and determines the correction value (TCD−TFD)/τ. The correction value calculator 434 adds the correction value (TCD−TFD)/τ to the total number N stored in the register 442 as by step S25. Thus, the correction value calculator 434 sets ahead the clock 430.

If, on the other hand, the clock 430 is advanced rather than the MIDI time code, the answer at step S24 is given negative "NO", and the correction value calculator 434 divides the difference TCD−TFD by the pulse period τ, and determines the correction value (TCD−TFD)/τ. The correction value calculator 434 subtracts the correction value (TCD−TFD)/τ from the total number N as by step S26 so that the correction value calculator 434 sets the clock 430 back. Upon completion of the job at step S25 or S26, the correction value calculator 434 returns to the main routine program.

Turning back to FIG. 19, the audio signal generator 432 controls the data read-out form the hard disc unit 414, and is connected to the clock 430, hard disc unit 414 and mixer 160. The audio signal generator 432 includes a data read-out controller 444 and a signal generator 446. The data read-out controller 444 sequentially reads out the disc-stored audio data codes and audio time codes from the hard disc unit 414.

When the disc-stored audio data codes are transferred from the data readout controller 444 to the signal generator 446, the data read-out controller 444 reads out the next audio time code, and periodically fetches the total number N from the register 442. The data read-out controller 444 multiplies the total number by the pulse period τ. The product Nτ is representative of the lapse of time. Then, the data read-out controller 444 compares the lapse of time Nτ with the lapse of time indicated by the audio time code to see whether or not the disc-stored audio data codes are to be read out. When the lapse of time Nτ catches up the lapse of time indicated by the audio time code, the data read-out controller 444 transfers the next disc-stored audio data codes to the signal generator 446.

The signal generator 446 converts the disc-stored audio data codes to the analog audio signal, and supplies the analog audio signal to the mixer 414 for generating the second electronic tones. Since the correction value calculator 434 periodically regulates the clock 430 with the MIDI time codes, the lapse of time Nτ is also consistent with the lapse of time indicated by the MIDI time codes. The audio signal generator 432 produces the analog audio signal from the disc-stored audio data codes at the time when the lapse of time Nτ catches up the associated audio time code. For this reason, the second electronic tones are produced synchronously with the picture produced on the monitor display 112.

Figure 21:
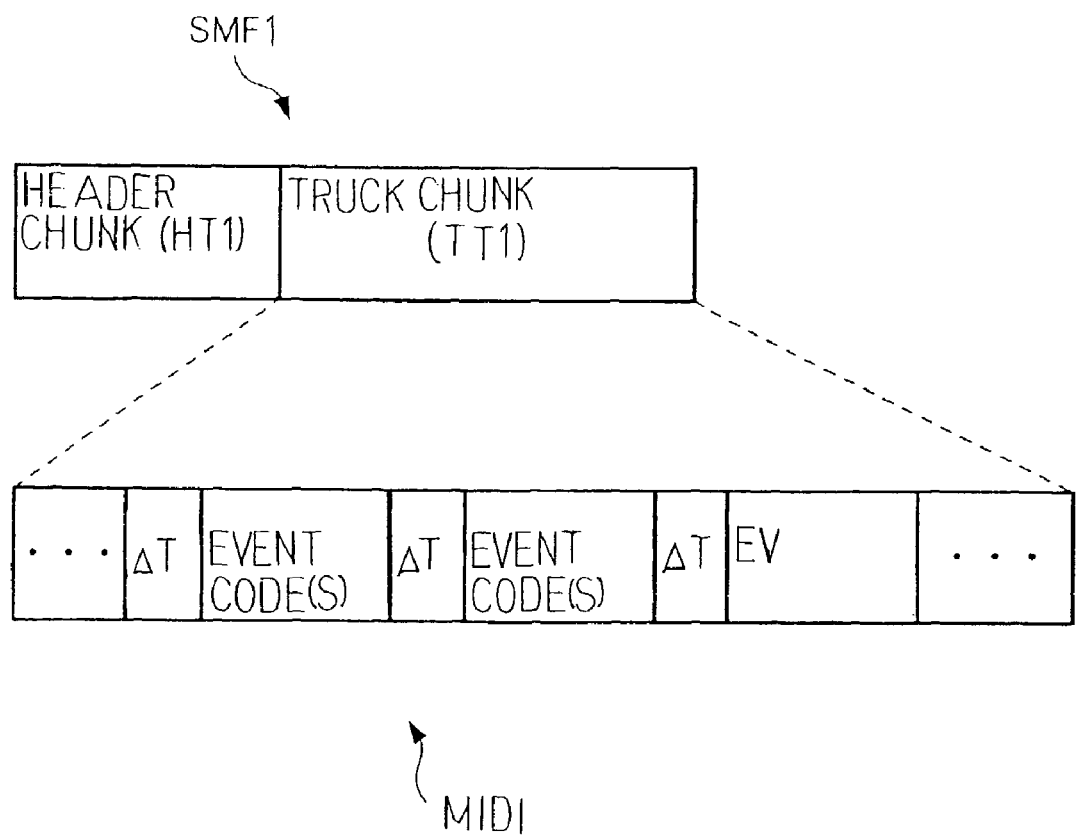
FIG. 21 is a view showing a standard MIDI file for recording a performance on a keyboard.

The floppy disc recorder 404 is operative to record a performance on the keyboard 142 synchronously with reproduction of a picture and first electronic tones and/or reproduction of the second electronic tones. The floppy disc recorder 404 creates a standard MIDI file SMF in a floppy disc FD under the control of the data processing unit 424. FIG. 21 shows the standard MIDI file SMF to be created in the floppy disc FD. The standard MIDI file SMF1 has a header chunk HT1 and a track chunk TT1. In this instance, a disc identification code C-ID assigned to the compact disc CD is stored in the header chunk HT1 together with the fundamental information such as the chunk type and videotape identification code V-ID. Although only the videotape identification code V-ID is stored in the header chunk HT (see FIG. 2B), the information stored in the header chunk HT1 makes the compact disc CD and videotape cassette VT, from which the picture and a piece of music were produced during the recording, discriminative from other compact discs and other videotape cassette. On the other hand, event codes and delta-time codes ΔT are stored in the track chunk TTI. Each delta-time code ΔT is inserted between an event code or codes and the previous event code or codes, and is representative of the time period therebetween. Most of the event codes represents the fingering on the keyboard, and other event codes represent a system exclusive event, metaevent and so forth. The event codes and delta-time codes AT form a set of MIDI data codes representative of a piece of music performed on the keyboard 142. A music identification code representative of the title of the composition may be further stored in the header chunk HT1.

When the user instructs the controller 412 to record a performance synchronously with a picture reproduced from the video data codes and a piece of music reproduced from the disc-stored audio data codes, the floppy disc recorder 404 starts an internal clock, and periodically regulates the clock with the MIDI time codes. The MIDI controller 150 supplies the event codes representative of the depressed keys, released keys, velocity and so fourth to the data processing unit 424, and the data processing unit 424 transfers the event codes to the floppy disc recorder 404. Upon arrival of the event code or codes, the floppy disc recorder 404 determines the time period between the event code or codes and the previous event code or codes, and writes the event code or codes and the delta-time code representative of the time period in the track chunk TT1.

Figure 22:
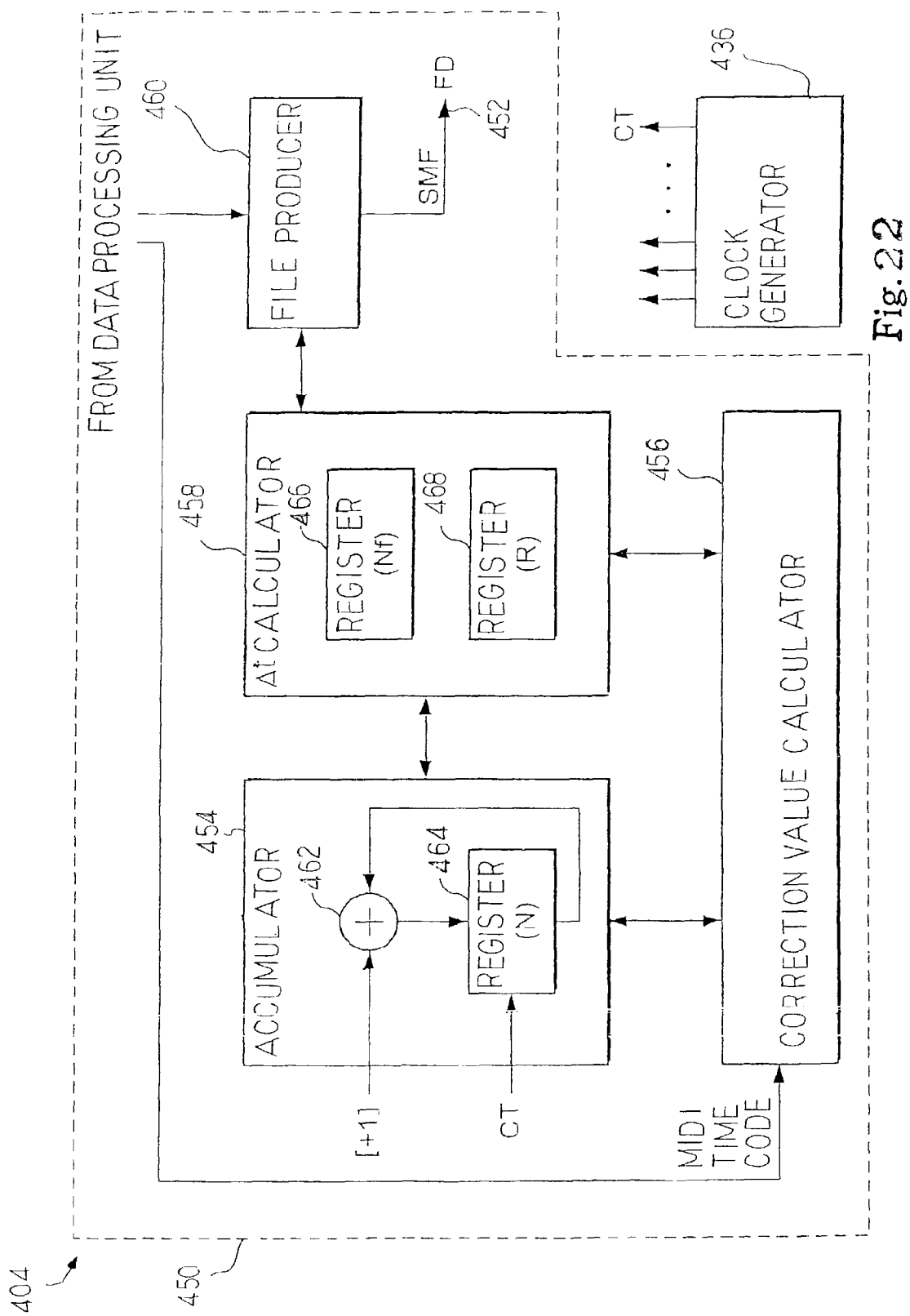
FIG. 22 is a block diagram showing the configuration of a controller incorporated in a floppy disc recorder.

FIG. 22 shows a controller 450 and a write-in head 452 both incorporated in the floppy disc recorder 404. The clock signal generator 436 supplies the tempo clock CT to the controller 450. The controller 450 includes an accumulator 454 serving as the clock, a correction value calculator 456, a delta-time calculator 458 and a file producer 460. The controller 412 is connected to the file producer 460 and the correction value calculator 456, and supplies the event codes and the MIDI time codes to the file producer 460 and the correction value calculator 456, respectively. The tempo clock CT is supplied from the clock signal generator 436 to the accumulator 454.

The accumulator 454 includes an adder 462 and a register 464. When the data processing unit 424 receives the first MIDI time code representative of zero from the code converter 126, the data processing unit 424 writes zero in the register 464. While the controller 450 is recording a performance synchronously with the picture and second electronic tones, the data processing unit 424 transfers the MIDI time code to the correction value calculator 456. A source of constant [+1] is connected to one of the input ports of the adder 462, and the register 464 is connected to the other input port of the adder 462. The total number N of tempo clocks is supplied to the adder 462, and the adder 462 increments the total number N of tempo clocks by one. The output port of the adder 462 is connected to the input port of the register 464, and the register 464 is responsive to the tempo clock CT for latching the output signal of the adder 462. Thus, the adder 462 and register 464 form an accumulating loop, and the total number N is incremented by one in response to the tempo clock signal CT. The total number N of tempo clocks is proportional to the lapse of time from the reception of the first MIDI time code, i.e., the initiation of synchronous recording. Thus, the accumulator serves as the clock.

The file producer 460 is under the control of the data processing unit 424. The file producer 424 is connected to the delta-time calculator 458, and supplies an instruction signal representative of a calculation of delta time to the delta-time calculator 458 upon reception of an event code or event codes so that the delta-time calculator 458 determines the delta time, i.e., the time interval between the previous event and the presently received event. The delta-time calculator 458 stores the delta-time in the delta-time code, and supplies the delta-time code to the file producer 460.

The file producer 460 is further connected through a driving circuit (not shown) to the write-in head 452. The data processing unit 424 transfers the videotape identification code V-ID and disc identification code C-ID to the file producer 460, and the file producer 460 writes the videotape identification code V-ID and disc identification code C-ID through the write-in head 452 into the header chunk HT1 in the floppy disc FD. While the user is fingering on the keyboard 142, the data processing unit 424 intermittently transfers the event codes from the MIDI controller 150 to the file producer 460. When the event code or codes reach the file producer 460, the file producer 460 supplies the instruction signal to the delta-time calculator 458. The delta-time calculator 458 produces the delta-time code, and supplies it to the file producer 460 as described hereinbefore. The file producer 460 writes the event code or codes, which have been supplied from the data processing unit 424, and the associated delta-time codes into the track chunk TT of the floppy disc FD.

The delta-time calculator 458 is connected to the accumulator 454, correction value calculator 456 and file producer 460, and includes registers 466 and 468. When the control signal representative of the initiation of synchronous recording reaches the controller 450, the registers 466/468 are initialized, and zero is written in both registers 466 and 468. The time at which the delta-time calculator 456 received the instruction signal from the file producer 460 is stored in the register 464. The previously instructed time is stored in the register 466 as the number Nf of tempo clocks. When the instruction signal reaches the delta-time calculator 458, the delta-time calculator 458 reads out the number N of tempo clocks from the register 464, and calculates the time interval (N−Nf). On the other hand, the register 468 is assigned to a correction value R, which is also written in the form of the number of tempo clocks CT. The correction value R is representative of the difference between the lapse of time indicated by the clock, i.e., the accumulator 454 and the lapse of time determined on the basis of the MIDI time code. The correction value R is supplied from the correction value calculator 456, and the delta-time calculator 458 adds the correction value R to the time interval (N−Nf) for determining the delta-time, i.e., (N−Nf+R). The delta-time calculator 458 stores the delta-time in the delta-time code, and supplies the delta-time code to the file producer 460. Upon completion of the task instructed by the file producer 460, the delta-time calculator 458 writes the number N of tempo clocks CK into the register 468 as the previous value Nf. Thus, the previous instructed time Nf is renewed.

The correction value calculator 456 is connected to the accumulator 454 and delta-time calculator 458, and determines the correction value R. The correction value R is representative of the time difference between the lapse of time from the reproduction of the picture and the lapse of time from the performance on the keyboard 142. The correction value calculator 456 determines the correction value R through execution of a computer program shown in FIG. 23.

A MIDI time code is assumed to reach the correction value calculator 456. The correction value calculator 456 starts the computer program at step S30, and stores the MIDI time code in an internal register (not shown). The MIDI time code represents the lapse of time TCD from initiation of producing the picture as by step S31.

Subsequently, the correction value calculator 456 reads out the number N of tempo clocks CT from the register 464, and converts the number N to a lapse of time TFD from the reception of the first MIDI time code representative of zero as by step S32. The tempo clocks CT have a pulse period τ, and the lapse of time TFD is given as (N×τ).

The correction value calculator 456 determines the absolute value of the difference between the lapse of time TCD and the lapse of time TFD, and compares the absolute value |TCD−TFD| with a margin Δ to see whether or not the absolute value |TCD−TFD| is less than the margin Δ as by step S33. When the absolute value |TCD−TFD| is less than the margin Δ, the answer at step S33 is given affirmative "YES", and the correction value calculator 456 determines that the correction value R is to be zero. Then, the correction value calculator 456 writes zero in the register 468 as by step S34, and returns to the main routine program.

On the other hand, the absolute value |TCD−TFD| is greater than the margin Δ, the answer at step S33 is given negative "NO", and the correction value calculator 456 checks the lapses of time TCD and TFD to see whether or not the clock 454 is delayed for the time indicated by the MIDI time code as by step S35.

The clock is assumed to be delayed for the time indicated by the MIDI time code. The lapse of time TCD is greater than the lapse of time TFD, and the answer at step S35 is given affirmative "YES". Then, the correction value calculator 456 divides the difference TFD−TCD, which is a negative value, by the pulse period τ, and writes the product, i.e., (TCD−TFD)/τ in the register 468 as the correction value R. Since the dividend (TCD−TFD) and the divisor τ are a negative value and a positive value, the product (TCD−TFD)/τ is negative. The correction value calculator 456 writes the correction value (<0) in the register 468 as by step S36. When the delta-time calculator 456 adds the correction value R to the time interval (N−Nf) for determining the delta-time, i.e., (N−Nf+R), the time interval (N−Nf) is shortened, and the delta-time code makes the next note-on event catches up with the corresponding scene.

If, on the other hand, the clock is advanced rather than the time indicated by the MIDI time code, the answer at step S35 is given negative, and the correction value calculator 456 divides the difference TFD−TCD, which is a positive value, by the pulse period τ, and writes the product, i.e., (TCD−TFD)/τ in the register 468 as the correction value R. Since the dividend (TCD−TFD) and the divisor τ are positive, the product (TCD−TFD)/τ is a positive number. The correction value calculator 456 writes the correction value R (>0) in the register 468 as by step S37.

When the delta-time calculator 458 adds the correction value R to the time interval (N−Nf) for determining the delta-time, i.e., (N−Nf+R), the time interval (N−Nf) is prolonged, and the delta-time code makes the scene catch up with the next note-on event.

When the correction value calculator 456 writes the correction value at step S36 or S37, the correction value calculator 456 terminates the task at step S38.

Figure 24:
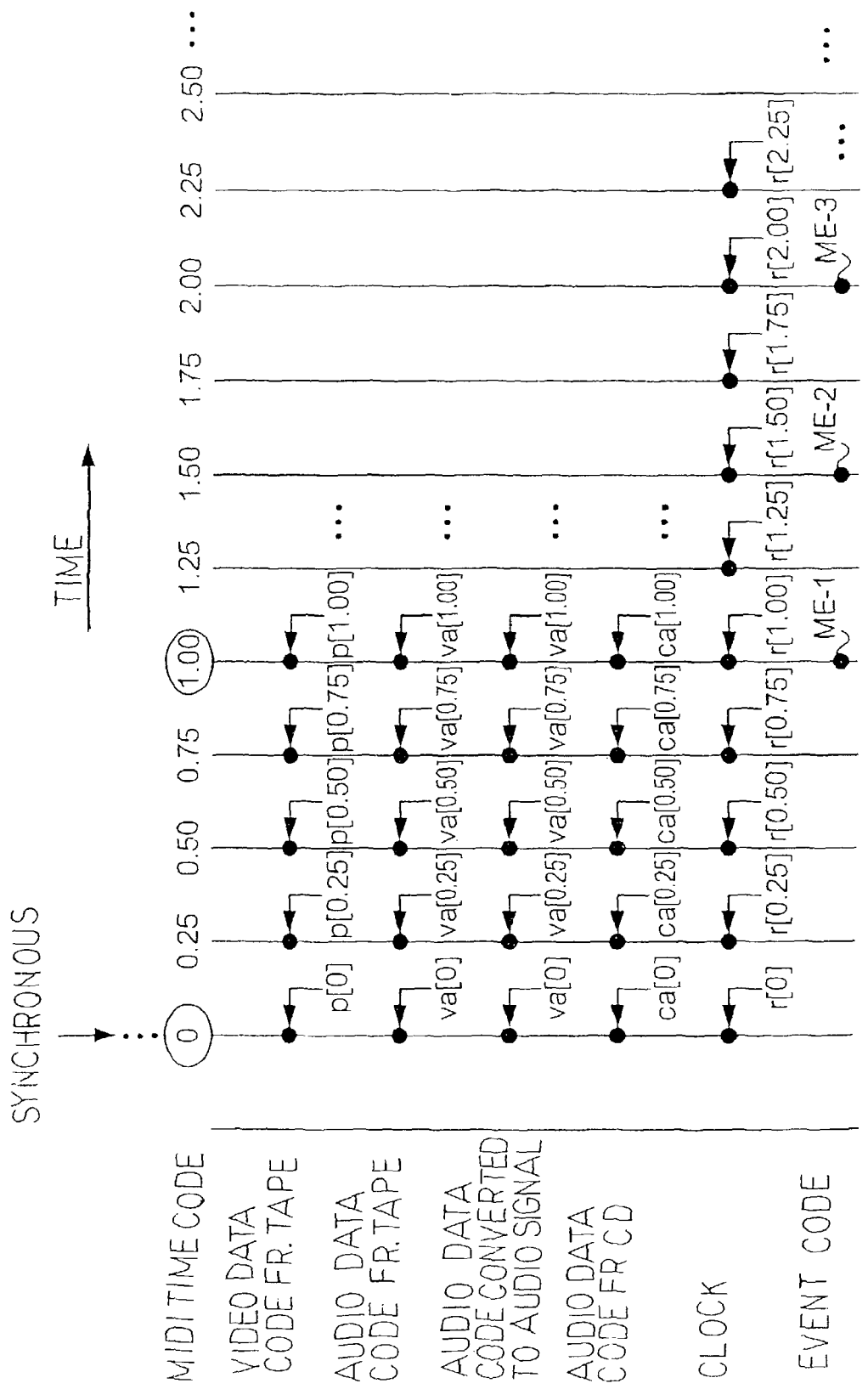
FIG. 24 is a timing chart showing a synchronous recording carried out the multimedia platform.

FIG. 24 shows the synchronous recording. The video time codes, which are read out from the videotape cassette VT, are converted to the MIDI time codes, which are assigned the first row. The video time codes [0], [0.25], [0.50], . . . are read out at time zero, 0.25 second, 0.50 second, . . . , and are immediately transferred through the data processing unit 424 to the controller 450. Thus, the MIDI time codes [k] (k=0, 0.25, 0.50, . . . ) are read out at time intervals of 250 milliseconds. In an actual multimedia platform, the MIDI time codes are produced at time intervals of ⅟30 second. However, the time intervals are reduced to 250 milliseconds for the sake of simple description.

The video data codes, which are also read out from the videotape cassette VT, are expressed as p[k], i.e., p[0], p[0.25], p[0.50], . . . , and the video data codes p[k] are read out between time [k] and time [k+1]. The video data codes p[k] are immediately supplied to the monitor display 112 for producing a picture. The second row is assigned to the video data codes p[k].

The tape-stored audio data codes, which are also read out from the videotape cassette VT, are expressed as va[k] (k=0, 0.25, 0.50, . . . ), and the tape-stored audio data codes va[k] are read out from the videotape between time [k] and time [k+1]. The third row is assigned to the tape-stored audio data codes va[k]. The tape-stored audio data codes va[k] are supplied to the data processing unit 424, and are converted to the analog audio signal. The fourth row is assigned to the tape-stored audio data codes converted to the analog audio signal.

The fifth row is assigned to the disc-stored audio data codes ca[k], which are read out from the hard disc unit 414 between time [k] and time [k+1]. The disc-stored audio data codes ca[k] are supplied to the data processing unit 424, and the data processing unit 424 converts the disc-stored audio data codes ca[k] to the analog audio signal.

The sixth row is assigned to the lapse of time r[k], i.e., N×τ, and event codes ME-1, ME-2, ME-3, . . . are intermittently supplied to the file producer 460 in response to the fingering on the keyboard 142 as indicated by the seventh row.

A user firstly gives instructions for synchronous recording to the data processing unit 424 through the manipulating panel 130. The data processing unit 128 supplies the control signal representative of selecting a certain piece of music and, thereafter, transferring the disc-stored audio data codes ca[k] to the hard disc unit 414 to the compact disc controller/driver 420, and the control signal representative of pause to the floppy disc controller/driver 170. The floppy disc controller/driver 170 enters the idling state. The compact disc controller/driver 420 selects the certain piece of music from the compact disc CD, and transfers the disc-stored audio data codes ca[k] through the digital signal processor 422 to the data processing unit 424. The data processing unit 424 writes the disc-stored audio data codes ca[k] into the hard disc unit 414.

Upon completion of the data transfer, the multimedia platform 400 gets ready for the synchronous recording, and informs the user of the ready state through the display window on the manipulating panel 130.

The user instructs the player 116 to start the reproduction of the picture and first electronic tones through the manipulating panel 118. The player 116 reads out the first video time code representative of zero, and supplies the video time code to the code converter 126. The code converter 126 converts the video time code to the MIDI time code [0], and supplies the MIDI time code [0] to the data processing unit 424. When the MIDI time code [0] reaches the data processing unit 424, the data processing unit 424 supplies the control signal representative of the initiation of synchronous recording, i.e., cancellation of the pause instruction to the controllers 424/450 together with the MIDI time code [0].

With the MIDI time code [0], the registers 442, 462, 464 and 468 are reset to zero, and the clock 430 and accumulator 454 start to count the tempo clocks CT. Although the correction value calculators 434/456 get ready to calculate the lapse of time, the correction value calculators 434/456 do not calculate the correction value R on the basis of the MIDI time code [0].

The player 116 further reads out the video data codes p[0] and tape-stored audio data codes va[0] from the videotape cassette VT, and supplies the video data codes p[0] and tape-stored audio data codes va[0] to the monitor display 112 and the data processing unit 424, respectively. Similarly, the audio signal generator 432 reads out the disc-stored audio data codes ca[0] from the hard disc unit 414 of the data processing unit 424. The monitor display 112 starts to produce visual images on the screen. The data processing unit 424 starts to produce the analog audio signals from the tape-stored audio data codes and disc-stored audio data codes, and supplies both analog audio signals to the sound system 406 for radiating the first electronic tones and second electronic tones from the speakers 164.

When the next video time code is read out from the videotape cassette VT, the MIDI time code [0.25] is supplied to the correction value calculators 434/456, and the video data codes p[0.25]/tape-stored audio data codes va[0.25] and the disc-stored audio data codes ca[0.25] are transferred to the monitor display 112 and the data processing unit 424. The monitor display 112 continuously produces the visual images on the screen, and the data processing unit 424 converts the tape-stored audio data codes va[0.25] to the analog audio signal so as to generate the first electronic tones.

Figure 23:
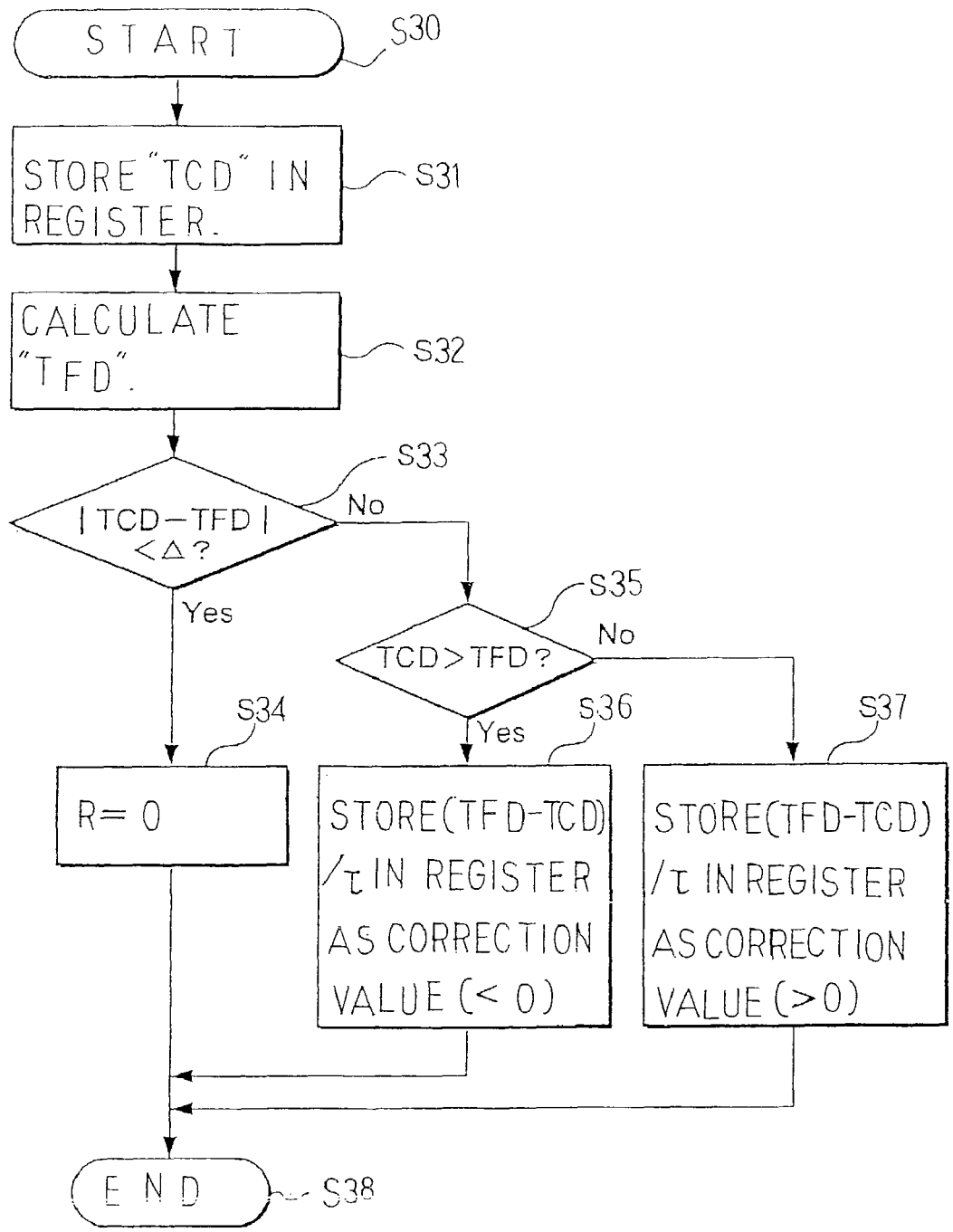
FIG. 23 is a flowchart showing a sequence of jobs executed by a correction value calculator.

The correction value calculators 434/456 start to execute the computer programs shown in FIGS. 20 and 23 at [0.25]. If the calculation value calculators 434/456 find the individual time differences to be larger in value than the given margins A, the correction value calculator 434 changes the number N of the accumulated tempo clocks CT, and the correction value calculator 456 stores the correction values R in the register 468. The controller 424 regulates the clock 430 with the MIDI time codes upon arrival of each MIDT time code, and the controller 450 determines the correction value R also upon arrival of each MIDI time code.

When the audio time code reaches the audio signal generator 432 from the hard disc unit 414 after [0.25], the audio signal generator 432 waits for the time at which the lapse of time No catches up the lapse of time indicated by the audio time code, and converts the disc-stored audio data signal ca[k] to the analog audio signal for generating the second electronic tones. Thus, the picture, first electronic tones and second electronic tones are reproduced synchronously with one another.

While the MIDI time code is being incremented from [0.25] to [0.75], the player 116, data processing unit 424, sound system 406, hard disc unit 414 and the controller 450 repeat the above-described jobs, and waits for the first MIDI event code ME-1. When the user depresses a black/white key, the MIDI controller 150 acknowledges the note-on event, and supplies the first MIDI event codes ME-1 through the data processing unit 424 to the floppy disc controller/driver 170. Upon arrival of the first MIDI event codes ME-1 at the file producer 460, the file producer 460 requests the delta-time calculator 458 to determine the lapse of time from the initiation of the synchronous recording. The delta-time calculator 458 reads out the number N of tempo clocks CT from the register 464, and checks the register 468 for the correction value R. The delta-time calculator 458 calculates the delta time, i.e., (N−Nf+R), and stores the delta time in a delta-time code. The delta-time calculator 458 supplies the delta-time code to the file producer 460 so that the first MIDI event codes ME-1 and delta-time code are stored in the track chunk TT1 by means of the write-in head 452.

When the MIDI event codes ME-2/ME-3/ . . . reach the file producer 460, the file producer 460 and delta-time calculator 458 repeat the above-described jobs for storing the MIDI event codes ME-2/ME-3/ . . . in the track chunk TT1 together with the delta-time codes.

When the user completes the performance on the keyboard 142, he or she gives the instruction for the completion of synchronous playback to the data processing unit 424. Then, the data processing unit 424 instructs the player 116 and compact disc converter/driver 420 to read out the videotape identification code V-ID and disc identification code C-ID from the videotape cassette VT and compact disc CD, respectively. The player 116 and compact disc converter/driver 420 transfer the videotape identification code V-ID and disc identification code C-ID to the data processing unit 424, respectively, and the data processing unit 424 supplies the control signal representative of storing the videotape identification code V-ID and disc identification code CID in the header chunk HT1 to the file producer 460 together with the videotape identification code V-ID and disc identification code C-ID. The file producer 460 writes the videotape identification code V-ID and disc identification code C-ID into the header chunk HT1, and completes the synchronous recording.

As will be understood from the foregoing description, the correction value calculators 434 periodically regulates the internal clock 430 with the MIDI time codes, and the correction value calculator 456 periodically determines the correction value R through the comparison between the accumulator 454 and the MIDI time codes. The audio signal generator 432 converts the discstored audio data codes to the analog audio signal at the time when the clock 430 catches up the audio time codes. The delta-time calculator 458 takes the correction value R into account, and produces the delta-time codes. Thus, the multimedia platform 400 reproduces the second electronic tones synchronously with the picture and first electronic tones, and records the performance in the floppy disc FD synchronously with the picture, first electronic tones and second electronic tones.

In the fifth embodiment, the compact disc unit 410 and digital signal processor 422 as a whole constitute the fourth data source 10, and the clock 430, audio signal generator 432, correction value calculator 434 and clock generator 436 as a whole constitute timing generator 12. The sound system 106 serves as the sound generator 14.

Sixth Embodiment

Figure 25:
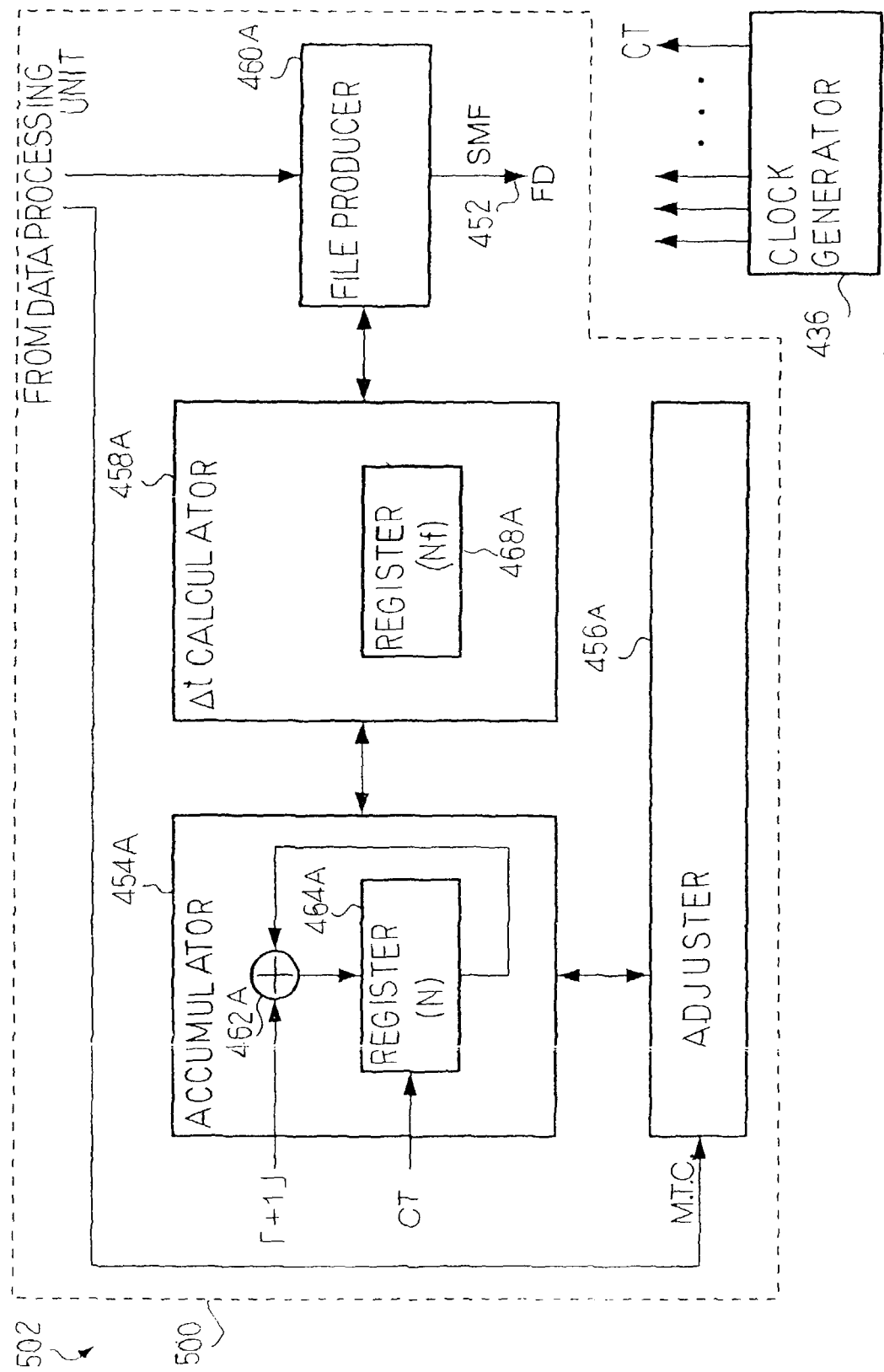
FIG. 25 is a block diagram showing a controller incorporated in a floppy disc recorder of another multimedia platform.

FIG. 25 shows another controller 500 incorporated in a floppy disc controller/driver 502, which in turn is incorporated in another multimedia platform embodying the present invention. The other system components are similar to those of the fifth embodiment so that references 402/406/408/410/412/414 are used in the following description for discriminating them from one another.

The floppy disc controller/driver 502 also has an information processing capability. The controller 500 is connected to the data processing unit 412. The controller 500 internally produces delta-time codes on the basis of the number N of tempo clocks CT, and eliminates a time difference from the lapse of time indicated by the clock upon arrival of the MIDI time codes. The event codes are supplied from the MIDI controller 150 through the data processing unit 412, and the event codes and delta-time codes are written in a floppy disc FD by means of the write head 452.

The controller 500 includes an accumulator 454A, a delta-time calculator 458A, a file producer 460A and an adjuster 456A. The file producer 460A is similar to the file producer 460, and no further description is hereinafter incorporated for avoiding repetition.

The accumulator 454A also comprises an adder 461A and a register 464A, and increments the total number N of tempo clocks CT as similar to the accumulator 454. The total number N expresses the lapse of time from the initiation of synchronous recording. The difference between the accumulators 454 and 454A is that the adjuster 456A can rewrite the total number N of tempo clocks CT as will be hereinafter described in more detail.

The delta-time calculator 458A includes only one register 468A which is assigned to the total number Nf of the tempo clocks CT at which the previous event code or codes reached the file producer 460A. The delta-time calculator 458A determines a difference between the total number N and the total number Nf, and produces the delta-time code representative of the difference, i.e., the interval between the events. The delta-time calculator 458A supplies the delta-time code to the file producer 460A.

When the time code is transferred from the data processing unit 424, the adjuster 456A compares the lapse of time NT with the lapse of time indicated by the MIDI time code to see whether or not the difference between the lapses of time is fallen within a predetermined margin Δ. If the difference is equal to or less than the margin Δ, the adjuster 456A does not carry out any regulation. On the other hand, if the difference is greater than the margin Δ, the adjuster 456A rewrites the total number N so as to eliminate the difference from between the lapses of time.

The other system components behave as similar to those of the multimedia platform 400. For this reason, no further description is incorporated hereinafter for the sake of simplicity. The multimedia platform implementing the sixth embodiment achieves all the advantages of the fifth embodiment.

Seventh Embodiment

Figure 26:
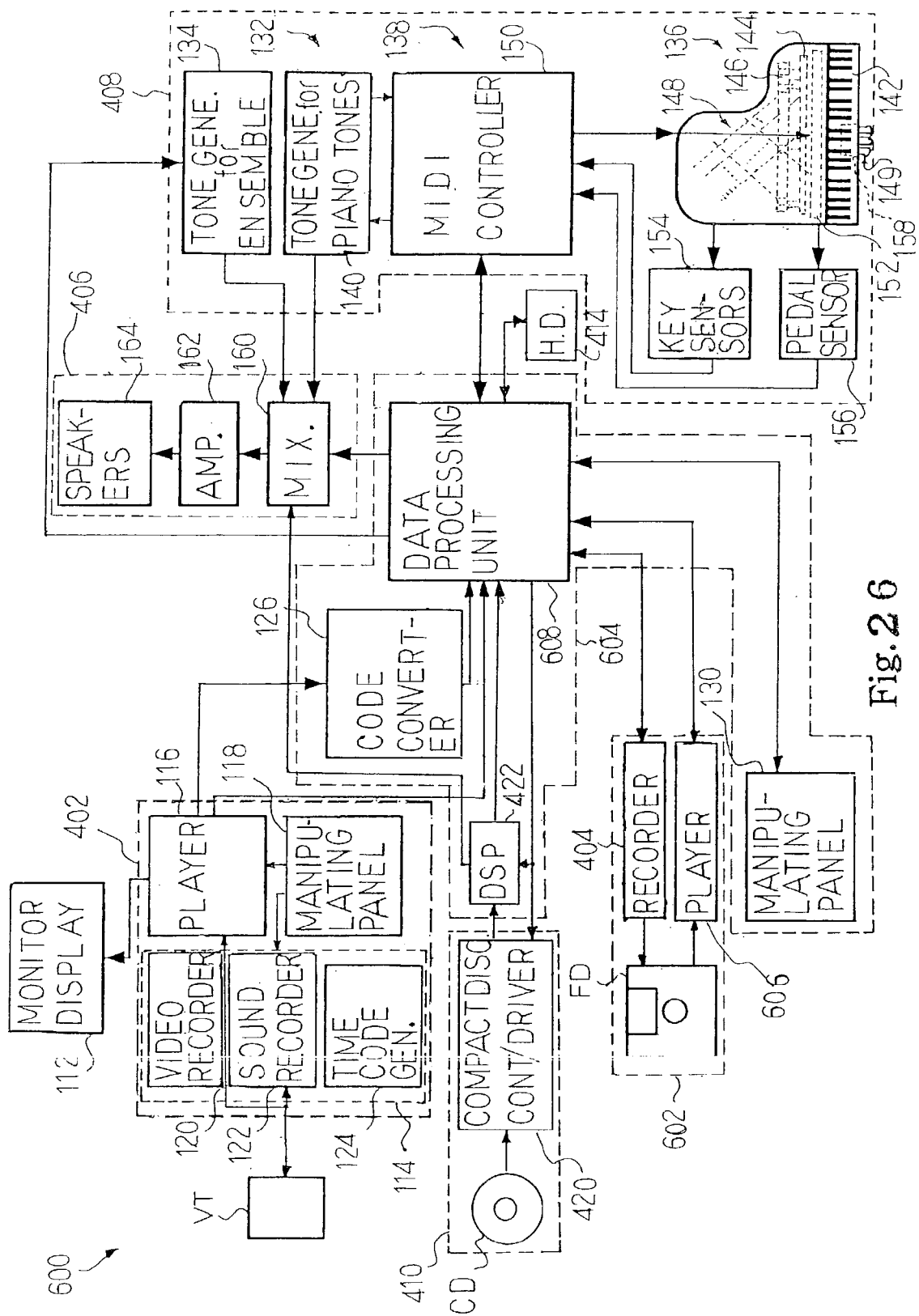
FIG. 26 is a block diagram showing the system configuration of another multimedia platform according to the present invention.

FIG. 26 shows another multimedia platform 600 embodying the present invention. The multimedia platform 600 is similar to the multimedia platform 400 except for a floppy disc recorder/player 602 and a controller 604. The other system components are similar to those of the multimedia platform 400. For this reason, the other system components are labeled with the references designating corresponding system components of the multimedia platform 400 without detailed description. The multimedia platform 600 records a performance on the keyboard 142 and reproduces second electronic tones from discstored audio data codes synchronously with reproduction of a picture and first electronic tones as similar to the multimedia platform 400. The multimedia platform 600 is further operative to reproduce the acoustic piano tones on the basis of the event codes and the second electronic tones from the disc-stored audio data codes synchronously with the reproduction of the picture and first electronic tones. This operation is hereinafter referred to as "synchronous playback".

The floppy disc recorder/player 602 includes a floppy disc player 606 as well as the floppy disc recorder 404, and are connected to a data processing unit 608 incorporated in the controller 604. The data processing unit 608 is responsive to user's instruction representative of the synchronous playback so that the data processing unit 608 controls the video camera 402, compact disc unit 410, floppy disc player 606 and automatic player piano 132 for reproducing a picture, acoustic piano tones and first and second electronic tones. The data processing unit 608 instructs the floppy disc player 606 to start to transfer the event codes to the data processing unit 608 500 from the certain position equivalent to 500 milliseconds later than the head of the track chunk TTI. This is because of the fact that a time lug takes place between the delivery of the event codes to the MIDI controller 150 and the generation of the acoustic piano tones. In this instance, the time lug is 500 milliseconds. The data read-out from the floppy disc FD is advanced rather than the reproduction of the picture and first and second electronic tones by 500 milliseconds. For this reason, the time lug is cancelled.

If, on the other hand, the user instructs the data processing unit 608 to transfer the event codes to the tone generator for ensemble 134. The time lug is ignoreable. The data processing unit 608 instructs the floppy disc player 606 to read out the MIDI data code from the head of the track chunk TT1.

Assuming now that the user instructs the controller 604 to start the synchronous playback through the automatic player piano 132, the data processing unit 608 gives the pause instruction to the floppy disc player 606, and instructs the compact disc unit 410 to read out the disc-stored audio data codes from the compact disc CD. The disc-stored audio data codes are transferred to the data processing unit 608, and the data processing unit 608 stores the disc-stored audio data codes in the hard disc unit 414.

Upon completion of the data transfer to the hard disc unit 414, the data processing unit 608 notifies the user of the completion of the data transfer to the hard disc unit 414. When the user gives the instruction for the synchronous playback to the player 116 through the manipulating panel 118, the player 116 starts to supply the video data codes, tape-stored audio data codes and video time codes to the monitor display 112, data processing unit 608 and code converter 126, respectively. The monitor display 112 reproduces the picture from the video data codes, and the data processing unit 608 produces the analog audio signal from the tape-stored audio data codes. The code converter 126 converts the video time codes to the MIDI time codes, and supplies the MIDI time codes to the data processing unit 608. The data processing unit 608 controls the conversion from the disc-stored audio data codes to the analog audio signal with the MIDI time codes, and supplies the MIDI time codes to the floppy disc player 606 for controlling the transfer of event codes.

Especially, when the MIDI time codes representative of zero reaches the floppy disc player 606, the floppy disc player 606 continuously reads out the MIDI data codes from the track chunk TTI until the floppy disc player 606 receives the delta-time code read out from the position 500 milliseconds later than the head of the track chunk TT1 without any data transfer of event codes to the data processing unit 608. The MIDI data codes may be stored in the floppy disc FD by means of the floppy disc recorder 404 as similar to the fifth embodiment. The floppy disc player 606 starts to transfer the event codes stored from the position equivalent to 500 milliseconds later than the head to the data processing unit 608. The continuous data read-out from the head of the track chunk is immediately completed so that the floppy disc player 606 starts the transmission of event codes substantially concurrently with the data read-out from the videotape cassette VT and hard disc unit 414.

The floppy disc player 606 serves as a sequencer and a timing controller. When a delta-time code reaches the floppy disc player 606, the floppy disc player 606 enters the idling state for the time period indicated by the delta-time code, and restarts the data read-out upon expiry of the time period. This is the function of the sequencer. The function of the timing controller is hereinafter described with reference to FIGS. 27 and 28.

Figure 27:
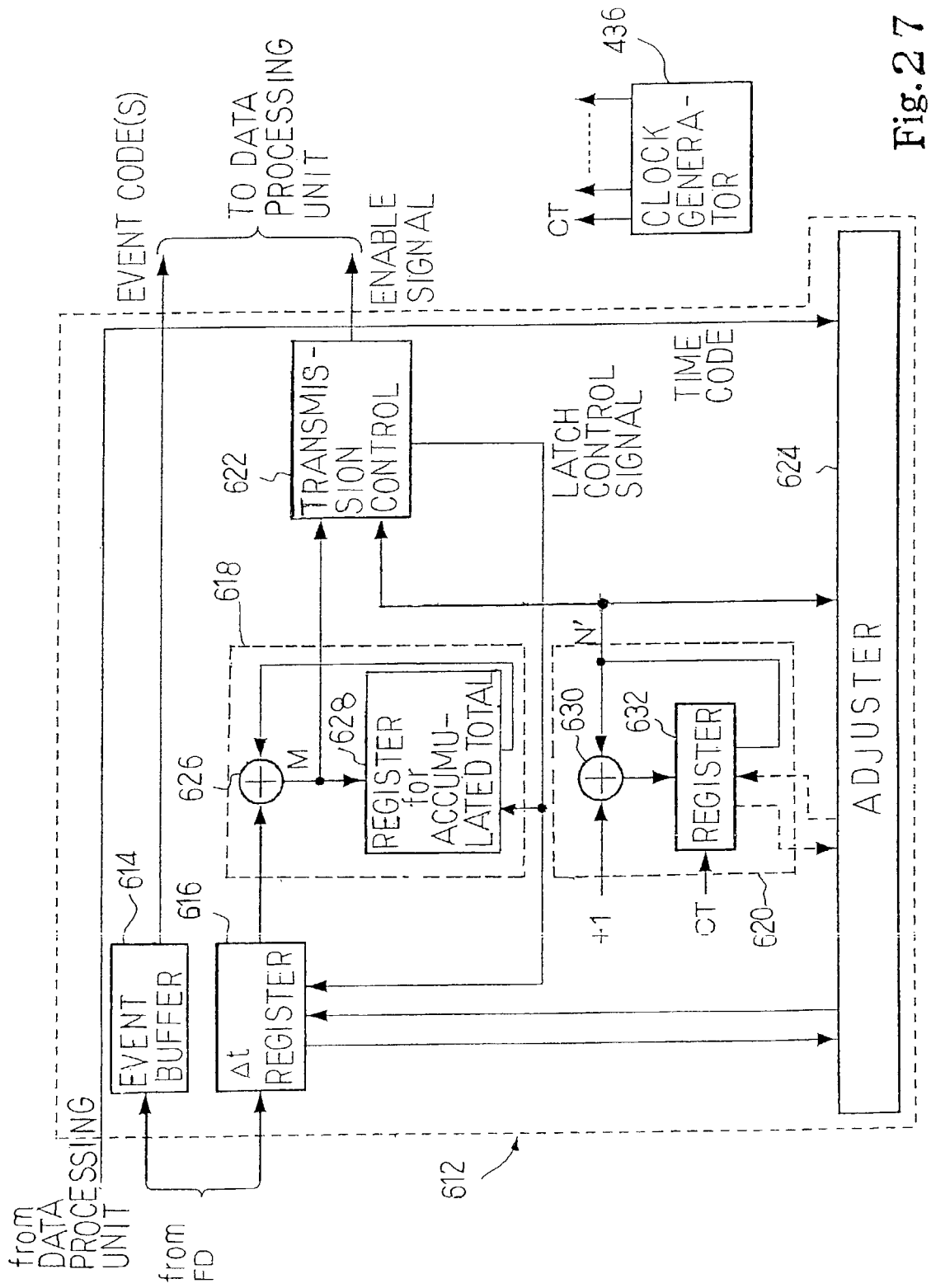
FIG. 27 is a block diagram showing the configuration of a controller incorporated in a floppy disc player.

FIG. 27 shows the circuit arrangement of a controller 612 incorporated in the floppy disc player 606. The controller 612 includes an event buffer 614, a delta-time register 616, accumulators 618/620, a transmission control 622 and an adjuster 624. The accumulator 618 is implemented by a combination of an adder 626 and a register 628, and an adder 630 and a register 632 constitute the other accumulator 620.

The event code or codes and delta-time code are selectively supplied from the floppy disc FD to the event buffer 614 and delta-time register 616, and are stored in the event buffer 614 and the delta-time register 616, respectively. A delta-time code may be followed by more than one event code. The event buffer 614 has a memory capacity much enough to store all the event codes concurrently supplied from the floppy disc FD. The value of the delta-time code is equal to a number of tempo clocks CT to be counted between an event and the next event. The event buffer 614 is connected to the data processing unit 608, and the delta-time register 616 is connected to the accumulator 618 and adjuster 624. The delta-time codes are continuously read out from the floppy disc FD until the position equivalent to 500 milliseconds without any waiting time, and the event codes are ignored until the position equivalent to 500 milliseconds, if any. For this reason, the accumulated total M is representative of 500 milliseconds immediately after the initiation of synchronous playback.

The transmission control 6322 has two input ports connected to the accumulator 618 and the adjuster 624, and compare an accumulated total M, which represents a target time to transfer the event code or codes, with a number N' stored in the register 632 to see whether or not the event code or codes are to be transferred to the data processing unit 608. When the number N' reaches the accumulated total M, the answer is given affirmative, and the transmission control 622 changes an enable signal and a latch control signal to an active level, and supplies the active enable/latch control signals to the data processing unit 608 and the delta-time register/register for accumulated total 616/628. The transmission control 622 may supply the registers 616/628 a writein clock signal instead of the latch control signal.

The accumulator 618 accumulates the time intervals, i.e., the values of the delta-time codes, and supplies the accumulated total M to the transmission control 622. Each delta-time code is representative of a number of tempo clocks CT to be counted between the event and the next event so that the accumulated total M is also represented by the total number of tempo clocks CT counted from the initiation of reading out the MIDI codes. The adder 626 has two input ports respectively connected to the delta-time register 616 and the register for accumulated total 628, and the output port is connected to the register for accumulated total 628. Thus, the adder 626 and register 628 form an accumulating loop. When a user instructs the controller 604 to reproduce the performance recorded in the floppy disc FD, the register 628 is reset to zero. While the floppy disc player 606 is sequentially reading out the MIDI codes, the floppy disc FD intermittently supplies the delta-time codes to the delta-time register 616. When the number N' reaches the accumulated total M, the transmission control 622 changes the latch control signal to the active level. With the active latch control signal, the next delta-time code is stored in the delta-time register 616, and is immediately transferred to the adder 626 for accumulation. The adder 626 adds the delta time to the accumulated total M, and the new accumulated total M is stored in the register 628 in the presence of the latch control signal of the active level.

The other accumulator 620 counts the tempo clock CT. The adder 630 has two input ports respectively connected to a source of constant value "+1" and the register 632, and the output port of the adder 630 is connected to the input port of the register 632. The adder 630 and register 632 form an accumulating loop. The input port, at which the register 632 is connected to the adder 630, is further connected to the adjuster 624 and the transmission control 622, and the tempo clock CT is supplied to the register 632 as a latch control signal. When the user instructs the data processing unit 608 to reproduce the performance and the second electronic tones synchronously with the picture and first electronic tones, an initial value is written in the register 632. The initial value is equal to 500/τ millisecond. The pulse period of the tempo clock CT is represented by τ. The adder 630 increments the number by one, and the total is stored in the register 632 in response to the tempo clock CT. The number N' is representative of the lapse of time from the reception of the MIDI time code representative of zero or the initiation of synchronous playback. Thus, the number N' of the tempo clocks CT is stored in the register 632, and is supplied to the adjuster 624 and the transmission control 622.

Although the accumulator 618 accumulates the delta-times, the event code or codes are never transferred to the data processing unit 608 until the accumulated total M exceeds the number N' of tempo clocks CT. After exceeding the number N', the tempo clock CT makes the number N' increment. When the number N' catches up the accumulated total M, the event code or codes are transferred to the data processing unit 608. As described hereinbefore, the initial value is "500/τ" so that, even if an event code or codes are stored in the event buffer 614 before "500/τ", the event code or codes are not transferred to the data processing unit 608.

The adjuster 624 is connected to the data processing unit 608, accumulator 620 and delta-time register 616. The MIDI time codes are periodically transferred from the code converter 126 through the data processing unit 608 to the adjuster 624, and the accumulator 620 supplies the number N' of tempo clocks CT to the adjuster 624. The lapse of time represented by the MIDI time code is abbreviated as "TCD'". The adjuster 624 achieves three major tasks as follows.

The adjuster 624 firstly calculates a lapse of time from the initiation of synchronous playback by multiplying the number N' by the pulse period τ of the tempo clocks CT, i.e., (N×τ). As described hereinbefore, the event codes are transferred to the data processing unit 608 at the certain point 500 milliseconds later than the initiation of the synchronous playback. In order to equalize the dial plate of one clock to the dial plate of the other clock, the adjuster 624 subtracts 500 milliseconds from the lapse of time (N'×τ), and determines a corrected lapse of time TFD', i.e., {(N'×τ)−500}. This is the first task.

The second task to be achieved by the adjuster 624 is to set the clock ahead or back. First, the adjuster 624 checks the MIDI time code to see whether or not the lapse of time TCD' is greater than zero. While the answer is given negative, the adjuster 624 repeats the comparison. When a MIDI time code represents the lapse of time greater than zero, the answer is changed to affirmative. With the positive answer, the adjuster 624 compares the lapse of time TFD' with the lapse of time TCD' to see whether the lapse of time TCD' is greater than, equal to or less than the lapse of time TFD'. In case where the lapse of time TFD' is different from the lapse of time TCD', the adjuster 624 further checks the lapses of time TFD'/TCD' to see whether or not the difference DF therebetween is fallen within a predetermined margin MG. The adjuster 624 proceeds to different steps depending upon the answers as follows.

Case 1: TFD=TCD or |DF|<MG

The adjuster 624 sets the clock neither ahead nor back. The delta-time codes are intermittently supplied from the floppy disc FD to the delta-time register 616, and are accumulated in the register 628. When the total number N' of the tempo clocks CT reaches the accumulated total M, the transmission control 622 changes the enable signal and latch control signal to the active level. With the enable signal of the active level, the event code or codes are latched in the buffer of the data processing unit 608, and the delta time represented by the next delta-time code is accumulated in the accumulator 618.

Case 2: TCD'>TFD' and |DF|>MG

The performance reproduced through the automatic player piano 132 is delayed for the picture reproduced on the monitor display 112 by the difference DF. The adjuster 624 converts the time lug, i.e., difference DF to the number DN of tempo clocks CT by dividing the difference DF by the pulse period τ. The product (TCD−TFD)/τ is equivalent to the time delay. The adjuster 624 takes out the delta-time code from the delta-time register 616, and subtracts the number DN from the value ND of the delta-time code.

Subsequently, the adjuster 624 checks the calculation result to see whether or not the difference {ND−(TCD'−TFD')/τ} is a positive number. When the answer is given affirmative, the adjuster 624 writes the difference {ND (TCD'−TFD')/τ} in the delta-time register 616. The time interval represented by the delta-time code is shortened. The adjuster 624 supplies the corrected delta-time code to the register 616 so that the corrected delta-time code represents the number of tempo clocks CT less than the previous number. When the corrected delta-time code is accumulated in the register 628, the transmission control 622 transmits the event code or codes to the data processing unit 608 earlier than the previous schedule. This results in that the delay is canceled. All of the performance, picture and first and second electronic tones are synchronously reproduced through the automatic player piano 312, monitor display 112 and the sound system 406.

On the other hand, if the difference {ND−(TCD'−TFD')/,} is a negative number, the answer is given negative. In this situation, the adjuster 624 divides the product (TCD'−TFD')/τ by a positive number α, and subtracts the products (TCD'−TFD')/τα from the value of the delta-time code. If the positive number is 2, the difference is given as {ND−(TCD'−TFD')/2τ}. The adjuster 624 checks the calculation result to see whether or not the difference is a positive number. When the answer is given affirmative, the adjuster 624 writes the difference {ND−(TCD'−TFD')/2τ} in the delta-time register 616, and keeps the other half, i.e., (TCD'−TFD')/2τ in an internal register (not shown). The adjuster 624 will subtract the other half from the value of the next delta time. Thus, the adjuster 624 stepwise takes up the time lug in order to make the reproduction of performance synchronous with the picture. If the difference {ND−(TCD'−TFD')/2τ} is still given negative, the adjuster 624 increases the divisor, and repeats the above-described sequence.

Case 3: TCD'<TFD' and |DF|>MG

In this situation, the performance reproduced through the automatic player piano 132 is advanced by the difference DF, i.e., TFD'−TCD' from the reproduction of the picture. The adjuster 624 firstly converts the time, i.e., difference DF to the number DN of tempo clocks CT by dividing the difference DF by the pulse period τ. The product (TFD'−TCD')/τ is equivalent to the time by which the performance produced by the automatic player piano 132 is advanced. The adjuster 624 reads out the delta-time code from the delta-time register 616, and adds the number DN to the value ND of the delta-time code. The adjuster 624 writes the sum {ND+(TFD'−TCD')/τ} in the delta-time register 616. Thus, the time interval represented by the delta-time code is prolonged. The adjuster 624 supplies the corrected delta-time code to the register 616 so that the corrected delta-time code stored in the register 616 represents the number greater than the previous number. When the corrected delta-time code is accumulated in the register 628, the transmission control 622 retards the transmission of the event code or codes. This results in that the picture catches up the performance reproduced through the automatic player piano 132.

Figure 28:
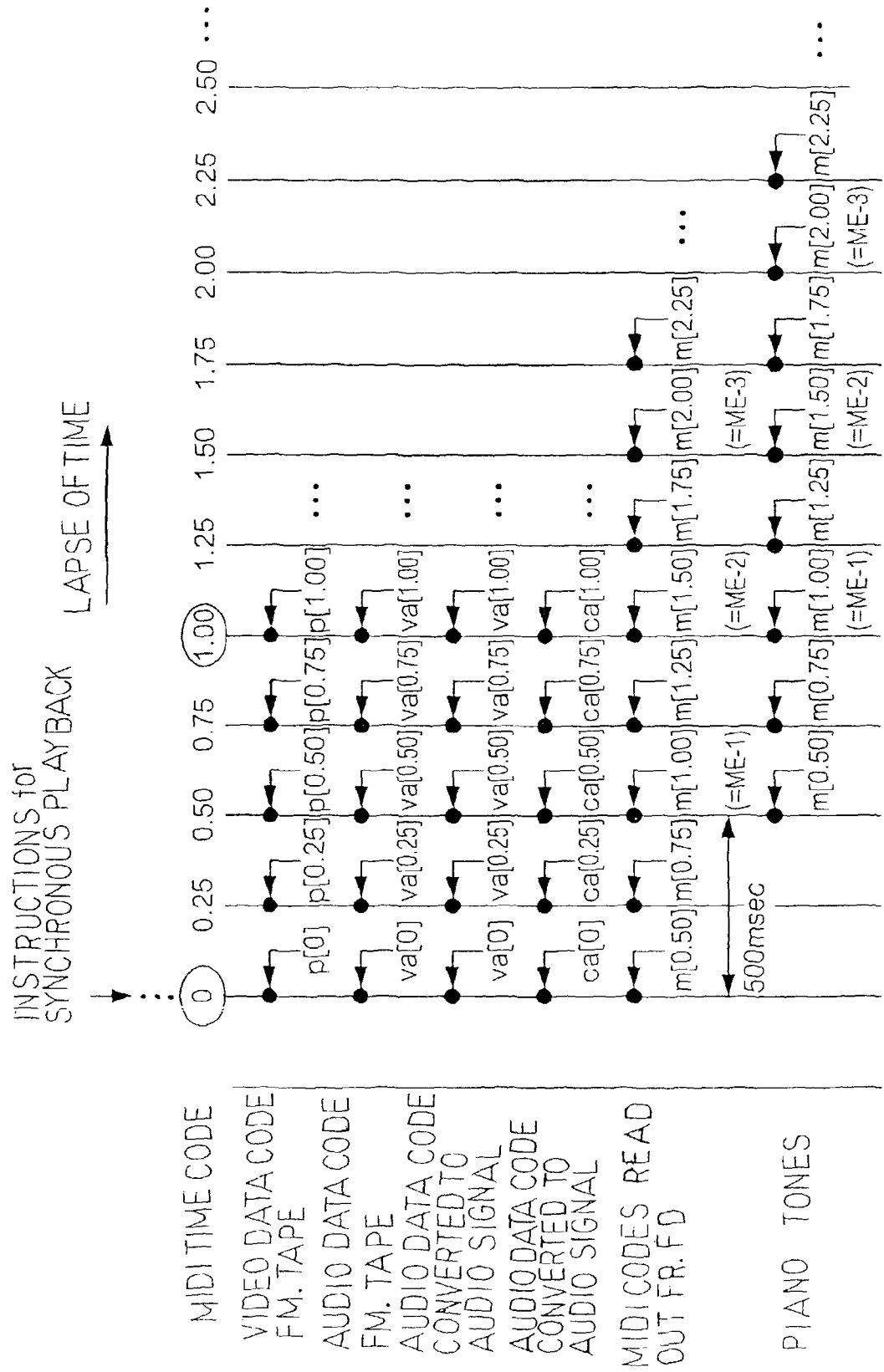
FIG. 28 is a timing chart showing a synchronous playback carried out the multimedia platform.

FIG. 28 shows a synchronous playback. The MIDI time codes express the lapse of time from the initiation of playback of a picture, and is assigned the first row. [k] is indicative of the lapse of time, and is incremented by 0.25 millisecond. Although the video time codes are usually incremented by ⅟₃₀ second, the video time codes shown in FIG. 28 is incremented by 0.25 second for the sake of simplicity. For example, [0.25] is indicative of the time 0.25 milliseconds later than the initiation of the playback.

The video data codes, which are read out from the videotape cassette VT, are assigned the second row. The video data codes are expressed as "p[k]". The video data codes p[k] are read out from the videotape cassette VT from time [k] to time [k+1]. For example, the video data codes p[0.25] are read out from [0.25] to [0.50].

The tape-stored audio data codes, which are also read out from the videotape cassette VT, are assigned the third row. The audio data codes are expressed as "va[k]". The audio data codes va[k] are read out from the video-tape cassette VT from time [k] to [k+1]. The audio data codes va[k] are supplied to the data processing unit 608, and the data processing unit 608 immediately converts the audio data codes va[k] to the analog audio signal. The audio signal is supplied to the sound system 106, and the first electronic tones are radiated from the speakers 164. The fourth row is assigned the tapestored audio data codes va[k] converted to the audio signal. Any substantial amount of time delay is not introduced in the conversion from the tape-stored audio data codes va[k] to the analog audio signal so that the tape-stored audio data codes va[k] converted to the analog audio signal are put on the vertical lines indicative of the lapse of time [k] together with the corresponding audio data codes va[k] read out from the videotape cassette VT.

The disc-stored audio data codes are assigned the fifth row. The discstored audio data codes are expressed as "ca[k]". The disc-stored audio data codes ca[k] are read out from the hard disc 414 from time [k] to [k+1]. The data processing unit 608 immediately converts the disc-stored audio data codes ca[k] to the analog audio signal. The audio signal is supplied to the sound system 106, and the second electronic tones are radiated from the speakers 164. Since the data processing unit 608 periodically regulates the clock 430 with the MIDI time codes, the disc-stored audio data codes ca[k] are converted to the analog audio signal concurrently with the tape-stored audio data codes va[k], and the disc-stored audio data codes ca[k] converted to the analog audio signal are put on the vertical lines indicative of the lapse of time [k] together with the corresponding tape-stored audio data codes va[k] converted to the analog audio signal.

The MIDI data codes, which are read out from the floppy disc FD, are assigned the sixth row, and are expressed as m[k]. The MIDI data codes m[k] are read out from the floppy disc FD from [k] to [k+1]. Although the players 116 and 606 concurrently start, the MIDI data codes m[0] to m[0.25] are continuously read out from the floppy disc FD without any interval for accumulating the delta-times in the register 628. For this reason, the MIDI data codes m[k+0.5] are put on the vertical lines together with the corresponding video data codes p[k], tape-stored audio data codes va[k] and disc-stored audio data codes ca[k]. The MIDI data codes are broken down into the event codes and delta-time codes, and the first three event codes representative of the note-on are abbreviated as "ME-1", "ME-2" and "ME-3".

The event codes ME-1, ME-2 and ME-3 are read out from the floppy disc FD at [0.5], [1.00] and [1.50], and are transferred to the data processing unit 608. However, 500 milliseconds are consumed between the delivery to the MIDI controller 150 and the generation of the acoustic piano tones. For this reason, the acoustic piano tones are generated at [1.00], [1.50] and [2.00] on the basis of the event codes ME-1, ME-2 and ME-3 as shown in the seventh row.

A user is assumed to give instructions to carry out the synchronous playback to the controller 604. The data processing unit 608 gives the pause instruction to the floppy disc player 606 so that the disc player 606 enters the idling state. The data processing unit 608 instructs the compact disc unit 410 to read out and transfer the disc-stored audio data codes, and the data processing unit 608 writes the disc-stored audio data codes in the hard disc unit 414. Upon completion of the data write-in, the data processing unit 608 notifies the user of the read for start.

The user instructs the player 116 to read out the video data codes, tape-stored audio data codes and video time codes at [0]. The player 116 starts to read out the video/audio/video time codes from the videotape cassette VT. The player 116 supplies the video time code representative of zero to the code converter 126, and the converter 126 supplies the MIDI time code [0] to the data processing unit 608. With the MIDI time code [0], the data processing unit 608 resets the clock 430, and starts to read out the disc-stored audio data codes ca[0] from the hard disc 414. The correction value calculator 434 periodically regulates the number of tempo clocks CT in the register 442 with the MIDI time code [k] from [0.25]. For this reason, the disc-stored audio data codes ca[k] are converted to the analog audio signal synchronously with the conversion from the tape-stored audio data codes va[k] to the analog audio signal.

The data processing unit 608 transfers the MIDI time code [0] to the floppy disc player 606. When the floppy disc player 606 receives the MIDI time code [0], the floppy disc player 606 resets the register 628 to zero, writes the initial value "500/τ" into the register 632, and starts to selectively distribute the event codes and delta-time codes to the event buffer 614 and delta-time register 616 without any wait. The delta-time codes are continuously accumulated in the register 628 without any wait until the accumulated total reaches "500/τ". The disc player 606 immediately completes those jobs so that the MIDI data codes [0.5] are read out from the floppy disc FD substantially concurrently with the distribution of the video/analog audio signals to the monitor display/sound system 112/106.

The floppy disc player 606 intermittently reads out the event codes and delta-time codes from the floppy disc FD from m[0.50], and transfers the event codes through the data processing unit 608 to the MIDI controller 150 when the number N' of tempo clock CT reaches the accumulated total M. The event codes are delivered to the MIDI controller 150 500 milliseconds before the read-out of the video data codes p[k]. The adjuster 624 periodically corrects the value of the delta-time codes upon reception of the MIDI time codes [0.25], [0.50] . . . so that the picture, first and second electronic tones and acoustic piano tones are synchronously reproduced from p[0.75], va[0.75], ca[0.75] and m[0.75].

The first event code ME-1 representative of the note-on is incorporated in the MIDI data codes m[1.00], and the MIDI data codes m[1.00] are transferred to the data processing unit 608 at [0.50]. However, the automatic player piano 132 consumes 500 milliseconds from the reception of the event code ME-1 to the generation of the acoustic piano tone. For this reason, the acoustic piano tone represented by the event code ME-1 is generated at [1.00]. The MIDI data codes m[1.00] are scheduled to realize at [1.00] together with the video data codes p[1.00], tape-stored audio data codes va[1.00] and disc-stored audio data codes ca[1.00]. When the player 116 and data read out control 444 read out the video data codes p[1.00]/tape-stored audio data codes va[1.00] and disc-stored audio data codes ca[1.00], the player 606, data processing unit 608 and signal generator 446 immediately transfer the video data codes p[1.00], analog audio signal corresponding to the tape-stored audio data codes va[1.00] and analog audio signal corresponding to the dis-stored audio data codes ca[1.001] to the monitor display 112 and the sound system 106, and the monitor display 112 and sound system 106 reproduce the visual images and first and second electronic tones at [1.00]. Thus, the synchronous playback is achieved.

Similarly, the event codes ME-2 and ME-3 are incorporated in the MIDI data codes m[1.50] and m[2.00], and the acoustic tones are generated at [1.50] and [2.00] synchronously with the visual images p[1.50] and p[2.00] and first and second electronic tones va[1.50]/ca[1.50] and va[2.00] ca[2.00]. Thus, the acoustic piano tones are generated synchronously with the picture, i.e., the series of visual images, first electronic tones and second electronic tones.

As will be understood from the foregoing description, the multimedia platform 300 reproduces the acoustic tones and second electronic tones synchronously with the picture and first electronic tones.

In the synchronous playback described in conjunction with FIG. 28, the data processing unit 608 may instruct the player 116 and floppy disc payer 606 to read out and transfer the tape identification codes V-ID. The data processing unit 608 compares the tape identification codes V-ID to see whether or not they are consistent with each other. If the answer is given negative, the data processing unit 608 notifies the user of the inconsistency, and waits for the next user's instruction. On the other hand, when the answer is given affirmative, the data processing unit 608 instructs the player 116 to start to read out the video/tape-stored audio/video time codes from the videotape cassette VT. This feature is desirable, because the performance is always reproduced together with the corresponding picture.

The data processing unit 608 may check the disc identification codes C-ID to see whether or not they are consistent with each other, or check both of the tape identification codes and disc-identification codes before the synchronous playback.

In the seventh embodiment, the compact disc unit 410 and digital signal processor 422 as a whole constitute the third data source 30, and the clock 430, audio signal generator 432, correction value calculator 434 and clock signal generator 436 as a whole constitute the timing controller 32. The sound system 106 serves as both sound generators 26/34.

Eighth Embodiment

Figure 29:
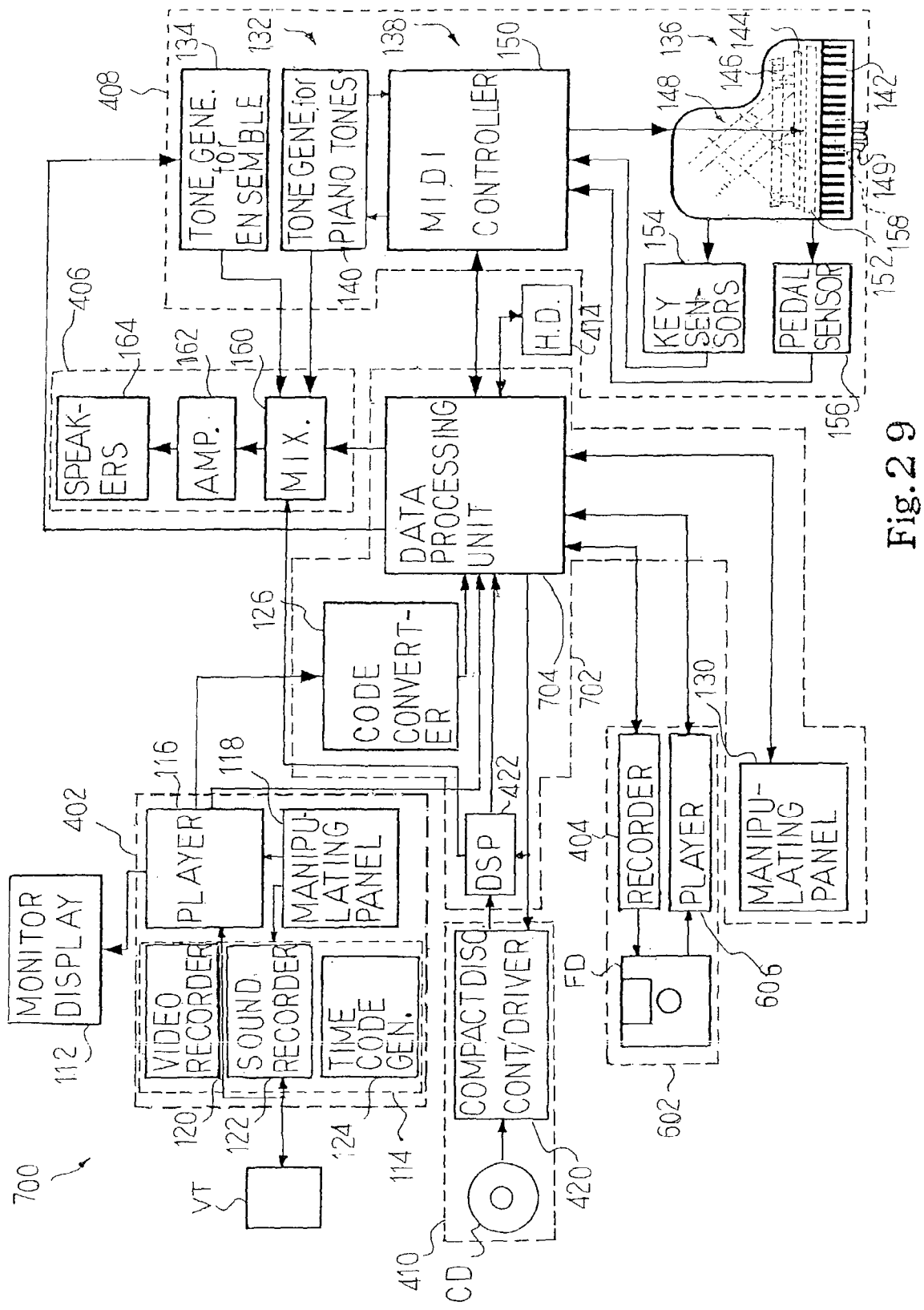
FIG. 29 is a block diagram showing another multimedia platform according to the present invention.

FIG. 29 shows another multimedia platform 700 embodying the present invention. The multimedia platform 700 is similar to the multimedia platform 600 except a controller 702. For this reason, other system components of the multimedia platform 700 are labeled with reference numerals designating corresponding system components of the multimedia platform 600 without detailed description for the sake of simplicity.

The multimedia platform 700 is available for the synchronous recording and synchronous playback as similar to the multimedia platform 600. The controller 702 adjusts the pitches of the second electronic tones to those of the corresponding acoustic piano tones through execution of a computer program. In detail, the second electronic tone produced on the basis of the disc-stored audio data code is assumed to have the standard pitch of 443 Hz, i.e., the pitch. If the acoustic piano 132 is tuned to have the standard pitch of 448 Hz, the electronic tones are never harmonized with the acoustic piano tones. In order to make the second electronic tones well harmonized with the acoustic piano tones, the controller 702 controls the pitches of the second electronic tones so that the second electronic tones are well harmonized with the acoustic piano tones in ensemble.

In order to control the pitches of the electronic tones, the disc-stored audio data codes are read out from a compact disc CD, and the data processing unit 704 writes the disc-stored audio data codes in the hard disc unit 414 before the synchronous playback. The controller 702 achieves all the tasks assigned to the controller 604, and further achieves the following tasks.

Figure 30:
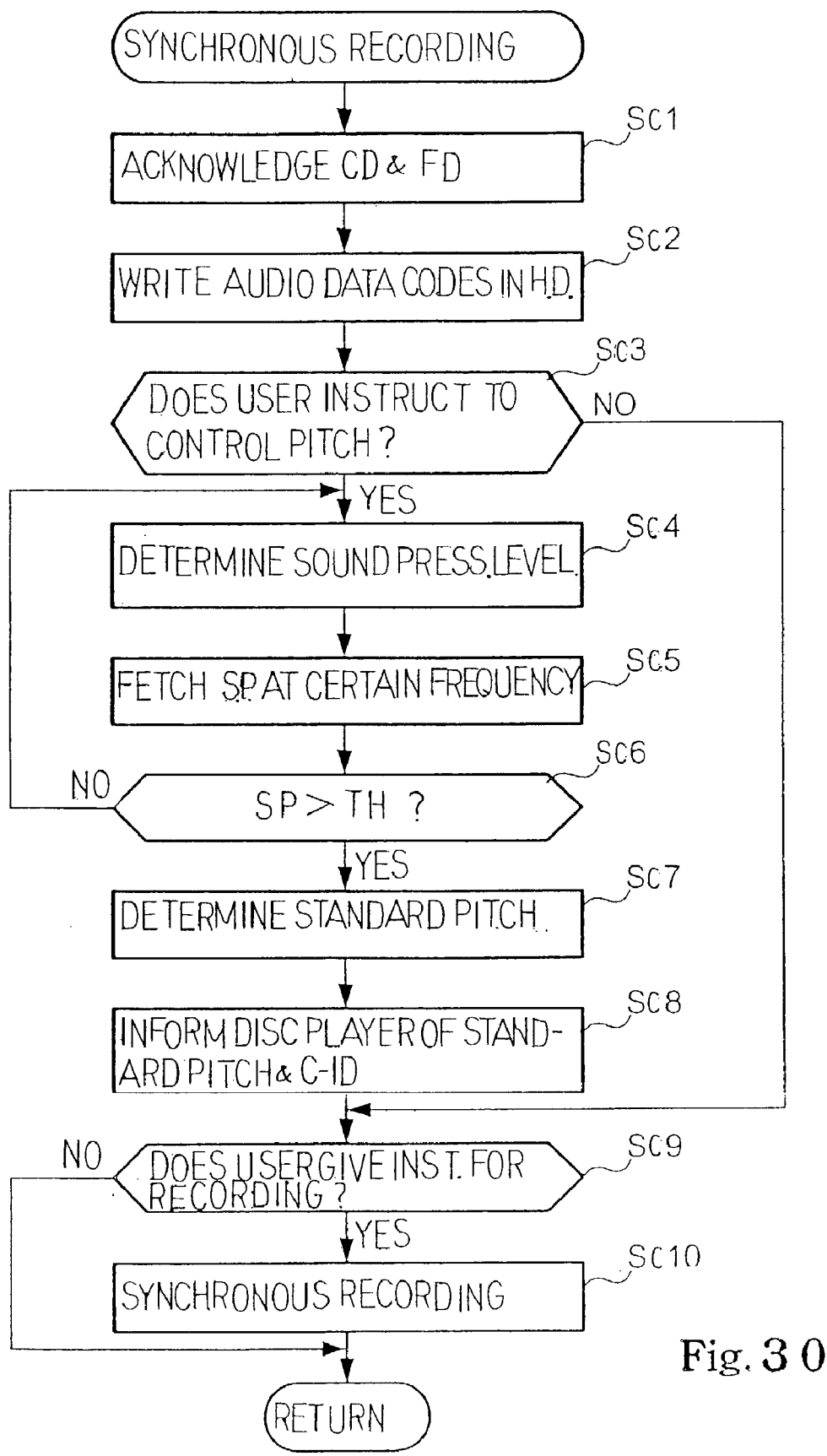
FIG. 30 is a flowchart showing a method for controlling the pitch of second electronic tones in a synchronous recording.

FIG. 30 shows a computer program for controlling the pitch of the second electronic tones in the synchronous recording. A user is assumed to instruct the controller 702 on the condition that the pitches of the second electronic tones are controlled for harmonization after loading a floppy disc FD and compact disc CD into the floppy disc recorder 404 and compact disc unit 410.

The data processing unit 704 acknowledges the compact disc CD and floppy disc FD loaded into the compact disc unit 410 and floppy disc recorder 404 as by step Sc1, and instructs the compact disc unit 410 to read out and transfer the disc-stored audio data codes from the compact disc CD. The data processing unit 704 receives the disc-stored audio data codes transferred through the digital signal processor 422, and writes them into the hard disc unit 414 as by step Sc2.

Subsequently, the data processing unit 704 checks the manipulating panel 130 to see whether or not the user has instructed the pitch control as by step Sc3. If the user has not instructed the data processing unit 704 to control the disc-stored audio data codes for the harmonization with the acoustic piano tones, the answer is given negative "NO", and the data processing unit 704 proceeds to step Sc9. Jobs at step Sc9 will be described hereinlater. On the other hand, if the user has already instructed the data processing unit 704 to control the disc-stored audio data codes for the harmonization, the answer at step Sc3 is given affirmative "YES", and the data processing unit 704 repeats the loop consisting of steps Sc4, Sc5 and Sc6 for determining the standard pitch of the electronic tone.

Figure 31:
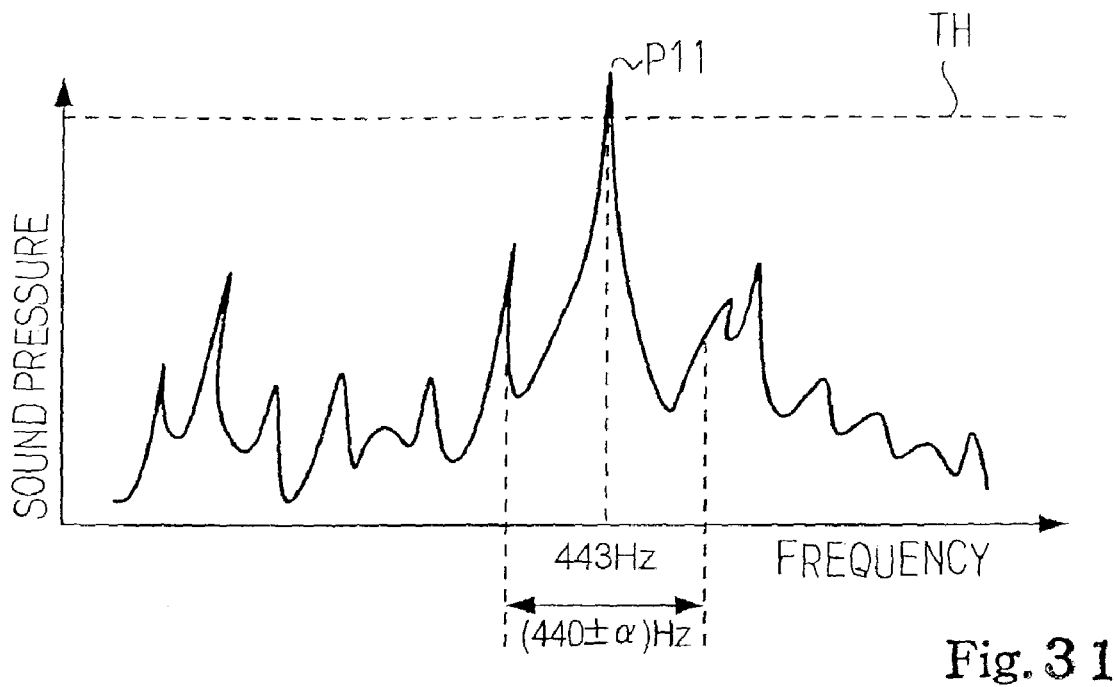
FIG. 31 is a graph showing the waveform of an electric signal representative of a sound pressure level.

The data processing unit 704 reads out the disc-stored audio data codes from the hard disc unit 414, and determines the sound pressure level for each frequency through a fast Fourier transformation as by step Sc4. FIG. 31 shows the waveform of an electric signal representative of sound pressure, which is determined on the basis of the disc-stored audio data code. The waveform has multiple peaks. However, the standard pitch of the electronic tone is to be close to the standard pitch of the acoustic piano tone. For this reason, the data processing unit may pass the electric signal through a band pass filter for focusing the analysis on the target band (440 Hz±α).

Subsequently, the data processing unit 704 selects a certain frequency, and fetches a piece of data information representative of the sound pressure SP at the certain frequency as by step Sc5. The data processing unit 704 compares the sound pressure SP at the certain frequency with a threshold TH to see whether or not the sound pressure at the certain frequency exceeds the threshold as by step Sc6. If the sound pressure SP is less than the threshold TH, the answer is given negative "NO". Then, the data processing unit 704 changes the target frequency, and returns to step Sc4. Thus, the data processing unit 356 changes the target frequency, and reiterates the loop consisting of steps Sc4 to Sc6 until the answer at step Sc6 is changed to affirmative.

When the data processing unit 704 find the peak P11(see FIG. 31), the answer is changed to affirmative "YES", and the data processing unit 704 determines that the certain frequency is the standard pitch as by step Sc7. In the example shown in FIG. 31, the standard pitch is 443 Hz.

Figure 32:
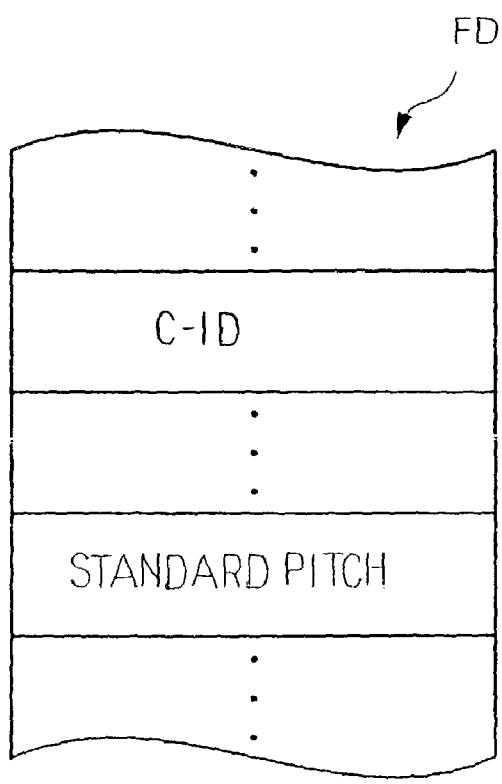
FIG. 32 is a view showing memory locations of a floppy disc for storing a disc identification code and a standard pitch.

Subsequently, the data processing unit 704 acquires the disc identification code C-ID from the hard disc unit 414, and informs the floppy disc player 606 of the standard pitch and disc identification code C-ID as by step Sc8. The floppy disc player 606 stores the event code representative of the standard pitch and disc identification code C-ID in the floppy disc FD as shown in FIG. 32. In case where the standard MIDI file SMF is to be created in the floppy disc FD, the event code representative of the standard pitch and disc identification code C-ID are stored in the header chunk HT1.

The data processing unit 704 checks the manipulating panel 130 to see whether or not the user has instructed the controller 702 to record the performance on the keyboard 142 synchronously with the picture and first/second electronic tones as by step Sc9. If the answer at step Sc9 is given negative "NO", the data processing unit 704 returns to the main routine. On the other hand, when the answer is given affirmative "YES", the data processing unit 704 informs the user that the multimedia platform 700 gets ready for the synchronous recording, and instructs the floppy disc recorder 414 to record the performance on the keyboard 142 synchronously with the picture and first/second electronic tones as by step Sc10. Upon completion of the performance, the user instructs the data processing unit 704 to terminate the synchronous recording, and the data processing unit 704 returns to the main routine.

Figure 33:
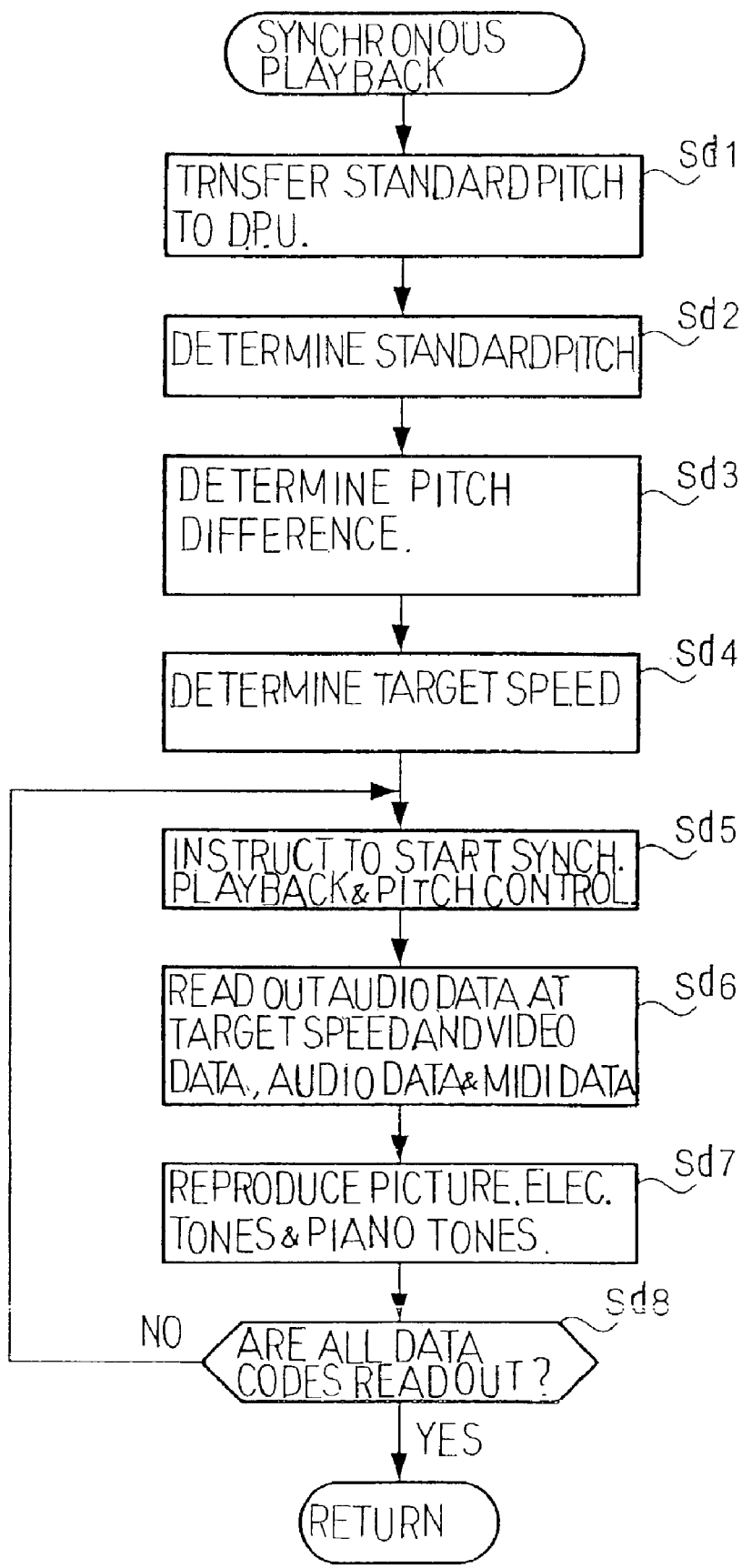
FIG. 33 is a flowchart showing a computer program for a synchronous playback.

The user is assumed to instruct the controller 704 for reproducing the performance and second electronic tones synchronously with the picture and first electronic tones. The data processing unit 704 enters a sub-routine program shown in FIG. 33. First, the data processing unit 704 requests the floppy disc player 606 to read out and transfer the event code representative of the standard pitch from the floppy disc FD thereto as by step Sd1.

Subsequently, the data processing unit 704 instructs the manipulating panel 130 to produce a massage such as for example, "Please depress the white key A" on the display window, and waits for the user's response. When the user depresses the white key A, the hammer 146 strikes the string 148, and the tone A is generated from the vibrating string 148. A microphone (not shown) picks up the tone A, and supplies the electric signal to the data processing unit 704. The data processing unit 704 analyzes the digital codes, which were converted from the electric signal, and determines the standard pitch as by step Sd2. In this instance, the standard pitch for the piano tones is assumed to be 448 Hz. The data processing unit 704 may measure the sound pressure level in a certain band through the fast Fourier transformation, and checks the sound pressure to see what frequency has the sound pressure level over a threshold. When the data processing unit 704 finds the sound pressure level at a certain frequency to exceed the threshold, the data processing unit 704 determines that the certain frequency is the standard pitch at the piano tone "A".

Subsequently, the data processing unit 704 calculates the difference between the standard pitch of the electronic tone "A" and the standard pitch of the piano tone "A", and determines a pitch difference as by step Sd3. In this instance, the standard pitch of the piano tone "A" is 448 Hz, and the standard pitch of the electronic tone "A" is 443 Hz so that the pitch difference is 5 Hz. The electronic tones are to be increased in pitch by 5 Hz. Then, the data processing unit 704 determines a target speed for reading out the disc-stored audio data codes from the hard disc unit 414 as by step Sd4. The data readout speed deeply concerns the pitch of tones as follows.

Figure 34A:
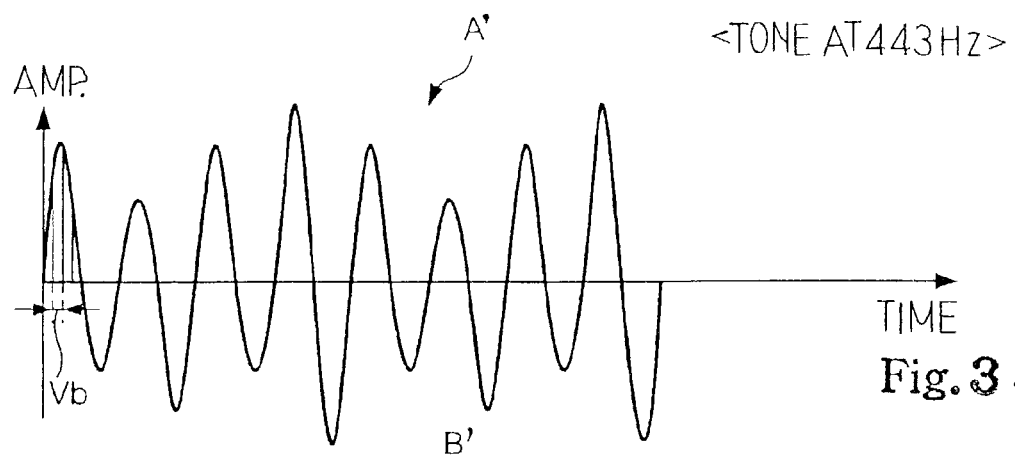
FIGS. 34A to 34C are graphs showing relation between a read-out speed and the pitch of electronic tones.
Figure 34B:
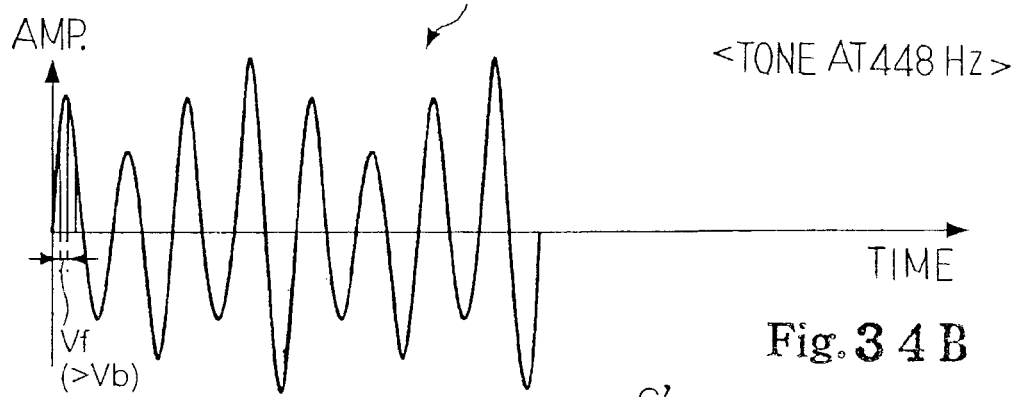
Figure 34C:
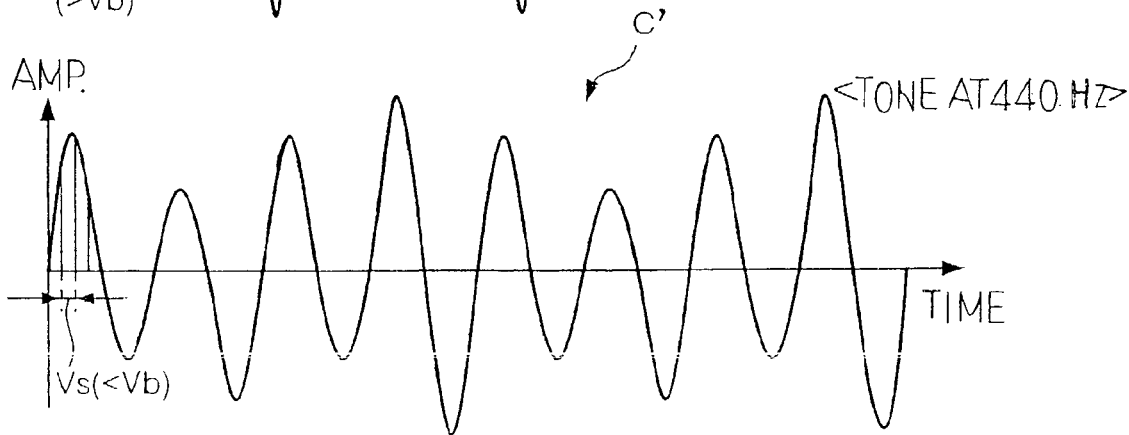

FIG. 34A to 34C show the relation between the target speed for reading out the disc-stored audio data codes and the pitch of the electronic tones. Even though the disc-stored audio data codes are not changed, the waveform of the audio signal representative of the electronic tone is varied depending upon the target speed for reading out the disc-stored audio data codes from the hard disc unit 414. When the audio data codes are read out from the hard disc unit 414 at the standard read-out speed Vb, the audio signal has a waveform form A' shown in FIG. 34A. If the data read-out is accelerated, i.e., Vf>Vb, the waveform A' is shrunk, and the audio signal has the waveform B' as shown in FIG. 34B. Accordingly, the tone is sharp pitched. The pitch is increased to 448 Hz. On the other hand, in case where the read-out speed is lowered, i.e., Vs<Vb, the waveform A' is expanded, and the audio signal has the waveform C' as shown in FIG. 34C. Accordingly, the pitch of the tone is lowered to 440 Hz.

In this instance, the pitch of the second electronic tone is lower than the pitch of the acoustic piano tone by 5 Hz. The data processing unit 704 instructs the hard disc unit 414 to increase the data read-out speed. If, on the contrary, the pitch of the second electronic tones is higher than the pitch of the acoustic piano tones, the data processing unit 704 instructs the hard disc unit 414 to decrease the data read-out speed.

When the target speed is determined, the data processing unit 704 instructs the hard disc unit 414, player 116 and floppy disc player 606 to start the synchronous playback under the pitch control as by step Sd5. The player 116 reads out the video data codes, tape-stored audio data codes and video time codes from the videotape cassette VT, the floppy disc player 606 reads out the delta-time codes and event codes from the floppy disc FD, and the hard disc unit 414 reads out the disc-stored audio data codes from the hard disc at the target speed as by step Sd6. The video data codes, video time codes and tape-stored audio data codes are supplied to the monitor display 112, code converter 126 and the data processing unit 704, respectively. The monitor display 112 reproduces a picture on the screen. The video time codes are converted to the MIDI time codes, and the data processing unit 704 regulates the lapse of time with the MIDI time codes–The data processing unit 704 further transfers the MIDI time codes to the floppy disc player 606 for regulating the lapse of time with the MIDI time codes. These functions are similar to those of the seventh embodiment, and no further description is incorporated hereinafter for avoiding repetition.

When the number N' of tempo clocks CT catches up the target number M, the floppy disc player 606 supplies the event codes through the data processing unit 704 to the MIDI controller 150, and the acoustic piano tones are generated in the acoustic piano 136. The data processing unit 704 converts the disc-stored audio data codes to the analog audio signal, and supplies the analog audio signal to the sound system 106 for producing the second electronic tones. Since the disc-stored audio data codes are read out at the target speed, the second electronic tones are sharp pitched, and are well harmonized with the acoustic piano tones. Thus, the picture, acoustic piano tones and electronic tones are reproduced as by step Sd7.

Subsequently, the data processing unit 704 checks the videotape cassette VT, hard disc unit 414 and floppy disc FD to see whether or not all the data codes have been already read out therefrom as by step Sd8. While the answer at step Sd8 is given negative "NO", the data processing unit 704 returns to step Sd5, and reiterates the loop consisting of steps Sd5 to Sd8 until the answer at step Sd8 is changed to affirmative "YES". When the last video data/video time/tape-stored audio data/MIDI data codes/disc-stored audio data codes are read out from the videotape cassette VT, hard disc 352 and floppy disc FD, the answer at step Sd8 is changed to affirmative, and the data processing unit 704 returns to the main routine.

As will be understood from the foregoing description, the multimedia platform 700 implementing the eighth embodiment achieves the pitch control between the second electronic tones and the acoustic piano tones as well as the synchronous playback. As a result, the electronic tones are well harmonized with the acoustic piano tones.

Although particular embodiments of the present invention have been shown and described, it will be apparent to those skilled in the art that various changes and modifications may be made without departing from the spirit and scope of the present invention.

In case where the multimedia platform 100 is expected to only record a performance synchronously with a picture, the automatic player piano 138 may be replaced with an electronic keyboard or a composite keyboard instrument equipped with the key/pedal sensors 154/156. Neither solenoid-operated key/pedal actuators 152/158 nor tone generators 134/140 are required for the composite keyboard instrument. Moreover, the MIDI controller 150 is simplified. Thus, the multimedia platform for the synchronous recording is much simpler than the multimedia platform 100.

In the first embodiment, the performance on the keyboard 142 is recorded synchronously with the playback of the picture. A first modification of the first embodiment records the performance on the keyboard 142 synchronously with shooting the scene with the video camera 102. The accompaniment on another musical instrument such as, for example a violin may be further recorded in the videotape VT. While the performance is being taken with the video camera 102, the video recorder 120 and sound recorder 122 writes the video data codes and audio data codes in the videotape VT together with the video time codes, and the video time codes are supplied to the code converter 126. The code converter 126 converts the video time codes to the MIDI time codes, and the data processing unit 128 supplies the MIDI time codes and MIDI event codes to the controller 172. The controller 172 behaves as similar to the synchronous recording described in conjunction with the first embodiment, and stores the MIDI event codes in the track chunk TT together with the delta-time codes. Thus, the first modification is suitable for a live concert and promotion disc.

The sound source 108 may have another sorts of musical instruments such as, for example, electronic stringed instruments and electronic window instruments. The electronic stringed instruments are equipped with pickup units for converting the vibrations of strings to electric signals, and music data codes are produced from the electric signals. The electronic wind instruments have key/piston monitors for converting the key actions/piston actions to electric signals, and music data codes are produced from the electric signals. The automatic player piano 136 is replaceable with those electronic musical instruments. A personal computer, in which a suitable music composing program is installed, is also available for the multimedia platform. The user produces MIDI event codes through a keyboard or mouth with the assistance of the software, and the personal computer supplies the MIDI event codes to the controller 110.

The floppy disc FD and videotape cassette VT do not set any limit on the present invention. Magneto optical discs, hard discs and memory sticks are available for the synchronous recording.

The controller 110, disc recorder/player 104, sound system 106 and tone generator for ensemble 134 may be built in the automatic player piano 132, and the video camera 102 may be connected to the built-in controller 110 through the cable. Thus, the multimedia platform 100 according to the present invention is offered in the form of an automatic player piano.

The disc player 308 may record the performance expressed by the MIDI data codes in the floppy disc FD synchronously with the recording the video data codes, audio data codes and video time codes in the videotape cassette VT. While the image pickup device and microphone are supplying the video signal and audio signal to the video recorder 120 and sound recorder 122, the time code generator 114 periodically supplies the video time codes to the videotape cassette VT and code converter 126. The code converter 126 converts the video time codes to the MIDI time codes, and the data processing unit 310 transfers the MIDI time codes to the disc player 308. The disc player 308 intermittently transfers the event codes m[k] through the data processing unit 310 to the automatic player piano 132, and corrects the delta-time codes upon reception of the MIDI time codes as similar to the synchronous playback.

The multimedia platform 300 may be sold as an automatic player piano with built-in video camera/controller/disc recorder/player 102/304/104. Of course, the video camera 102 is connected to the controller 304 through a suitable cable so that the user arbitrarily directs the image pickup device and microphone to an object.

In the fourth and eighth embodiments, the data processing units 356/704 find the standard pitch for the electronic tones. However, the user may hear the electronic tone for judging the standard pitch. In this instance, the user informs the data processing units 356/704 of the standard pitch through the manipulating panel 130.

In the fourth and eighth embodiments, the data processing units 356/704 make the manipulating panels 130 to transfer the message such as, for example, "please depress the key A" to the user. In a modification of the fourth and eighth embodiments, the data processing units 356/704 may supply a note-on event code for producing the tone "A" to the MIDI controller 150. The driving current is supplied form the driver circuit 312 to the solenoid-operated key actuator associated with the white key "A" so that the microphone picks up the tone "A".

The hard disc 352 may be replaced with another sort of memory such as a semiconductor random access memory. While the player 116 is reading out the video data codes and video time codes from the videotape cassette VT, the player 116 further reads out the audio data codes from the videotape cassette VT, and transfers the audio data codes to the semiconductor random access memory. The player 116 may intermittently supply the audio data codes to the semiconductor random access memory before the reproduction of the electronic tones. This results in reduction of memory capacity.

The controller 412 may check the music data code representative of the title of the music composition for the synchronous playback as well as the disc identification code.

In the first, second and fifth embodiments, the automatic player piano 132 may be replaced with a silent piano, i.e., a composite keyboard musical instrument including an acoustic piano, key sensors, pedal sensors, a tone generator for piano tones 140 and a hammer stopper and a MIDI controller. Although the silent piano is not equipped with the solenoid-operated key/pedal actuators, the MIDI controller analyzes the key position signals and pedal position signals for producing the event codes. The event codes are supplied from the data processing unit to the disc recorder so that the performance is recorded in a floppy disc synchronously with a picture/electronic tones or a picture/first electronic tones/second electronic tones.

In the fifth embodiment, the performance on the keyboard 142 is recorded and the second electronic tones are reproduced synchronously with the play-back of the picture and the reproduction of first electronic tones. A modification of the fifth embodiment records the performance on the keyboard 142 and reproduces the second electronic tones synchronously with shooting the scene with the video camera 102. While the image pickup device is shooting the scene, the video recorder 120 and sound recorder 122 stores the scenes and sound in the videotape cassette VT, and the time code generator 124 stores the video time codes in the videotape cassette VT and transfers the video time codes to the player 116. The video time codes are converted to the MIDI time codes, and the data processing unit 424 supplies the MIDI time codes to the floppy disc recorder 404. The data transfer from the compact disc CD to the hard disc 414, data read-out from the hard disc 414 and recording into the floppy disc FD are similar to those of the fifth embodiment so that detailed description is omitted. Thus, the modification of the fifth embodiment records the picture and performance in the videotape cassette VT and floppy disc FD and reproduces the second electronic tones synchronously with the shooting the scenes. The modification is suitable for a live concert, promotion disc and video contents for shows.

The sound source 108 incorporated in the multimedia platform 400 may have another sorts of musical instruments such as, for example, electronic stringed instruments and electronic window instruments. The electronic stringed instruments are equipped with pickup units for converting the vibrations of strings to electric signals, and music data codes are produced from the electric signals. The electronic wind instruments have key/piston monitors for converting the key actions/piston actions to electric signals, and music data codes are produced from the electric signals. Acoustic musical instruments may be equipped with music code generating systems for producing music data codes. The automatic player piano 132 is replaceable with those electronic musical instruments. A personal computer, in which a suitable music composing program is installed, is also available for the multimedia platform. The user produces MIDI event codes through a keyboard or mouth with the assistance of the software, and the personal computer supplies the MIDI event codes to the controller 110. Thus, the sound source 408 stands for all the device, unit and system for producing music data codes such as, for example, the MIDI data codes.

The floppy disc FD, compact disc CD, hard disc 414 and videotape cassette VT do not set any limit on the present invention. The hard disc 414 is, by way of example, replaceable with magneto optical discs, semiconductor memory devices or memory sticks. In case where the semiconductor random access memory is used for storing the disc-stored audio data codes, compact disc controller/driver 420 may stepwise transfer the disc-stored audio data codes to the data processing unit 424, and the data processing unit 424 intermittently writes the disc-stored audio data codes into and reads out them from the semiconductor random access memory. For this reason, a large memory capacity is not required for the semiconductor random access memory.

The controller 412, floppy disc recorder 404, sound system 406, compact disc unit 410 and tone generator for ensemble 134 may be built in the automatic player piano 132, and the video camera 102 may be connected to the built-in controller 412 through a suitable cable. Thus, the multimedia platform 400 according to the present invention is offered in the form of an automatic player piano.

A modification of the seventh embodiment may reproduce the acoustic piano tones and second electronic tones synchronously with recording the scenes in a videotape cassette VT. While the image pickup device is shooting the scenes, the video recorder 120 and sound recorder 122 stores the visual images and sound in the videotape cassette VT, and the time code generator 124 stores the video time codes in the videotape cassette VT and transfers the video time codes to the player 116. The video time codes are converted to the MIDI time codes, and the data processing unit 608 supplies the MIDI time codes to the floppy disc player 606. The data transfer from the compact disc CD to the hard disc 414, data read-out from the hard disc 414 and data read-out from the floppy disc FD are similar to those of the seventh embodiment so that detailed description is omitted. Thus, the modification of the fifth embodiment records the picture and performance in the videotape cassette VT and floppy disc FD and reproduces the second electronic tones synchronously with the shooting the scenes. The modification is suitable for a live concert, promotion disc and video contents for shows.

In the seventh embodiment, the disc-stored audio data codes have been stored in the hard disc 414 before the synchronous playback. Another modification of the seventh embodiment may automatically store the disc-stored audio data codes in the hard disc 414. In this instance, when a user instructs the video camera 402 to find the picture assigned the video identification code V-ID, the data processing unit 608 transfers the video identification code V-ID to the floppy disc player 606, and instructs the floppy disc layer 606 to search the header chunk HHI whether or not a set of MIDI data codes assigned the video identification code V-ID has been already stored in the floppy disc FD. If the floppy disc player 606 finds the set of MIDI data codes assigned the video identification code V-ID, the data processing unit 608 instructs the floppy disc player 606 to read out and transfer the associated disc identification code C-ID from the header chunk HTI. The data processing unit 608 transfers the disc identification code C-ID to the compact disc unit 410, and instructs the compact disc controller/driver 420 to read out and transfer the disc-stored audio data codes labeled with the disc identification code C-ID. The disc-stored audio data codes are transferred to the data processing unit 608, and the data processing unit 608 stores the disc-stored audio data codes in the hard disc unit 414. The modification behaves as similar to the seventh embodiment after the data write-in into the hard disc 414, and no further description is incorporated hereinafter.

The controller 604, floppy disc recorder/player 602, sound system 406, compact disc unit 410 and tone generator for ensemble 134 may be built in the automatic player piano 132, and the video camera 102 may be connected to the built-in controller 412 through a suitable cable. Thus, the multimedia platform 600 according to the present invention is offered in the form of an automatic player piano.

A modification of the eighth embodiment may further control the pitch of the first electronic tones. In this instance, another hard disc is further connected to the data processing unit 704, the tape-stored audio data codes are transferred to the other hard disc, and data processing unit 704 determines a target read-out speed for the tape-stored audio data codes as similar to that for the disc-stored audio data codes. While the MIDI data codes are being read out from the floppy disc FD, the tape-stored audio data codes and disc-stored audio data codes are read out from the hard disc units at the individual read-out speeds. This results in harmonization among the acoustic piano tones, first electronic tones and second electronic tones.

Figure 35:
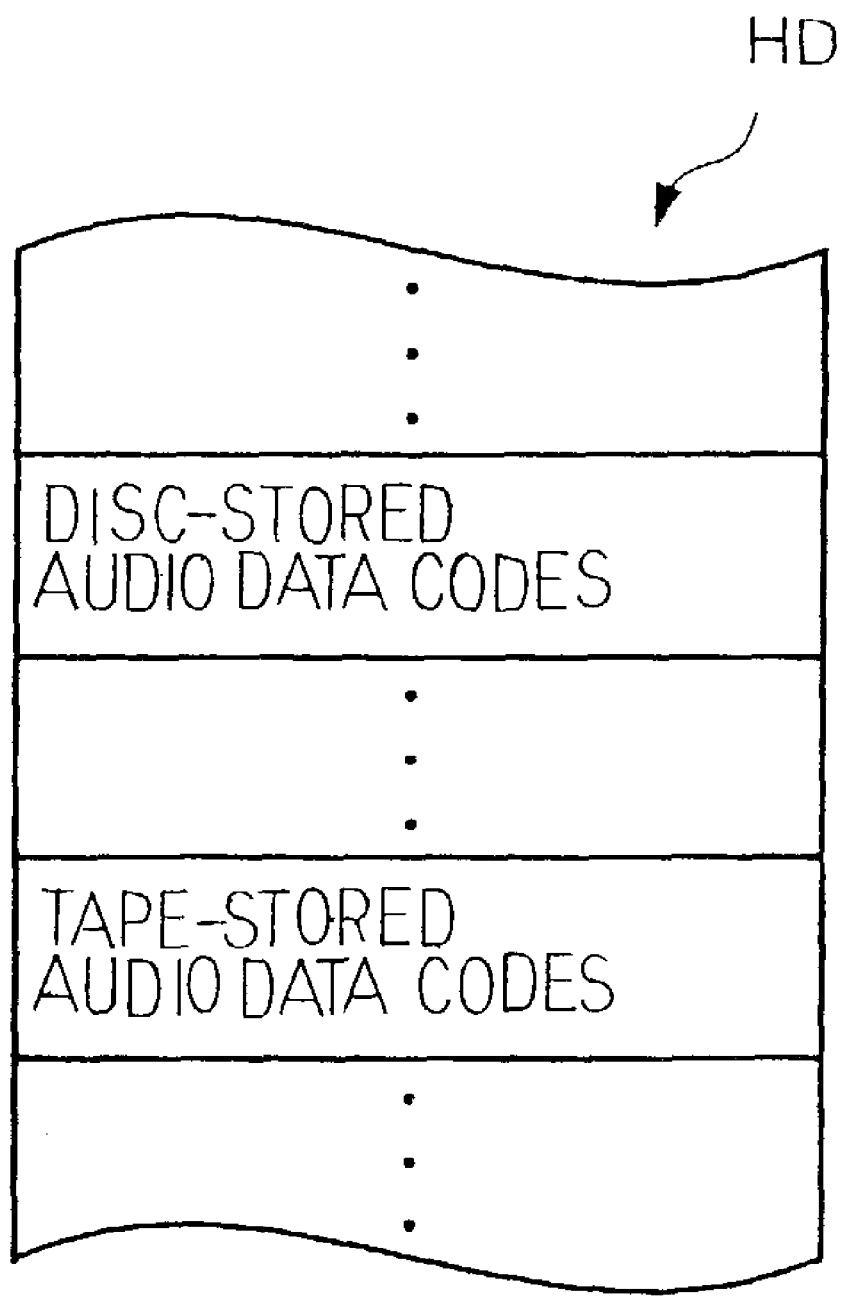
FIG. 35 is a view showing memory areas of a hard disc unit incorporated in a modification of the multimedia platform.

In another modification of the eighth embodiment, the hard disc unit 414 may be shared between the disc-stored audio data codes and the tape stored audio data codes as shown in FIG. 35. A memory area is assigned to the disc-stored audio data codes, and another memory area is assigned to the tapestored audio data codes. The target speed for the tape-stored audio data codes is determined independently of the target speed for the disc-stored audio data codes. While the player 116 is transferring the video data codes to the monitor display 112, the data processing unit 704 reads out the disc-stored audio data codes at the target speed and the tape-stored audio data codes at the other target speed, and the floppy disc player 606 transfers the event codes through the data processing unit 704 to the MIDI controller 150. Thus, the modification reproduces the acoustic piano tones and second electronic tones synchronously with the picture and first electronic tones, and makes the piano tones, first electronic tones and second electronic tones well harmonized with one another through the pitch control.

A multimedia platform according to the present invention may reproduce the second electronic tones through the pitch control synchronously with reproduction of a picture and first electronic tones and reproduction of acoustic piano tones.

What is claimed is:

1. A multimedia platform for recording at least first music sounds in an information storage medium synchronously with a picture, comprising:

a first data source producing a first sort of data containing pieces of first music data information representative of said first music sounds;

a second data source producing a second sort of data containing pieces of video data information representative of visual images of said picture, pieces of first time data information representative of a first time defined from a first viewpoint, and a first time signal representative of said pieces of first time data information;

a third data source having an information processing capability and connected to said second data source, said third data source executing a computer program so as to realize a plurality of functions, said third data source including a clock incrementing a second time defined from said first viewpoint and represented by pieces of second time data information and generating a second time signal representative of said pieces of second time data information, a comparator supplied with said first time signal and said second time signal that compares said pieces of second time data information with said pieces of first time data information to determine whether said second time is consistent with said first time, a modifier modifying said pieces of second time data information with the negative answer so as to eliminate a time difference between said first time and said second time, and a converter converting said pieces of second time data information to pieces of third time data information representative of a third time defined from a second viewpoint different from said first viewpoint;

a recorder connected to said first data source and said third data source so as to store said pieces of first music data information and said pieces of third time data information in said information storage medium; and an image generator connected to said second data source for producing said visual images, wherein said first data source includes a musical instrument on which said first music sounds are specified and a code generating system monitoring said musical instrument for generating said pieces of first music data information specified through said musical instrument, wherein said second data source includes a video camera, wherein said musical instrument is an acoustic piano, and said pieces of first music data information are produced through a fingering on a keyboard of said acoustic piano, and wherein said third data source, said recorder and said image generator form parts of an automatic player piano based on said acoustic piano, and said video camera is connected to said third data source and said image generator through a cable.

2. The multimedia platform as set forth in claim 1, in which said pieces of first time data information expresses a first lapse of time along which said pieces of video data information are supplied to said image generator, said pieces of second time data information expresses a second lapse of time from an initiation of the recording, and said pieces of third time data information expresses time intervals to be inserted among said pieces of first music data information.

3. The multimedia platform as set forth in claim 1, further comprising a sound generator connected to said second data source, in which said second sort of data further contains pieces of second music data information representative of third music sounds and supplied to said sound generator concurrently with said pieces of video data information so that said second music sounds are radiated from said sound generator synchronously with said picture.

4. The multimedia platform as set forth in claim 3, in which said pieces of first time data information expresses a first lapse of time along which said pieces of video data information are supplied to said image generator, said pieces of second time data information expresses a second lapse of time from an initiation of the recording, and said pieces of third time data information expresses time intervals to be inserted among said pieces of first music data information.

5. The multimedia platform as set forth in claim 1, further comprising a sound generator, in which said second sort of data further contains pieces of second music data information representative of second music sounds and supplied to said sound generator for producing said second music sounds.

6. The multimedia platform as set forth in claim 5, further comprising a temporary data storage connected to said first data source for storing said pieces of second music data information and a read-out speed controller associated with said temporary data storage and reading out said pieces of second music data information at a target speed for transferring said pieces of second music data information to said sound generator, said target speed being determined in such a manner as to eliminate a pitch difference from between said first music sounds and the corresponding second music sounds.

* * * * *